(12) United States Patent
Devam et al.

(10) Patent No.: US 11,195,340 B2
(45) Date of Patent: Dec. 7, 2021

(54) SYSTEMS AND METHODS FOR RENDERING IMMERSIVE ENVIRONMENTS

(71) Applicant: ARIS MD, Inc., Wilmington, DE (US)

(72) Inventors: Chandra Devam, Edmonton (CA); Zaki Adnan Taher, Edmonton (CA); William Scott Edgar, Sherwood Park (CA)

(73) Assignee: ARIS MD, Inc., Wilmington, DE (US)

( * ) Notice: Subject to any disclaimer, the term of this patent is extended or adjusted under 35 U.S.C. 154(b) by 0 days.

(21) Appl. No.: 16/950,797

(22) Filed: Nov. 17, 2020

(65) Prior Publication Data

US 2021/0327144 A1 Oct. 21, 2021

Related U.S. Application Data

(63) Continuation of application No. 16/081,685, filed as application No. PCT/US2017/020213 on Mar. 1, 2017, now abandoned.

(Continued)

(51) Int. Cl.
*G06T 19/00* (2011.01)
*G06T 15/02* (2011.01)
(Continued)

(52) U.S. Cl.
CPC ............ *G06T 19/006* (2013.01); *G06F 3/011* (2013.01); *G06F 3/016* (2013.01);
(Continued)

(58) Field of Classification Search
CPC .... A61H 9/005; A61H 9/0071; A61H 9/0078; G06K 9/00664–00704; G06T 19/00;
(Continued)

(56) References Cited

U.S. PATENT DOCUMENTS 5,961,541 A 10/1999 Ferrati
7,084,884 B1 8/2006 Nelson et al.
(Continued)

FOREIGN PATENT DOCUMENTS

DE 10008806 A1 12/2001
WO 02100256 A2 12/2002
(Continued)

OTHER PUBLICATIONS

International Search Report and Written Opinion in PCT Application No. PCT/US2017/020213 (filed Mar. 1, 2017), dated Jul. 3, 2017.
(Continued)

*Primary Examiner* — Todd Buttram
(74) *Attorney, Agent, or Firm* — Jacobsen IP Law; Krista S. Jacobsen

(57) ABSTRACT

Disclosed herein are systems for rendering an immersive environment, the systems comprising at least one electronic device configured to be coupled to a body part of a user, the at least one electronic device comprising a sensor, an actuator, or both; a processor capable of being communicatively coupled to the at least one electronic device; and a rendering device capable of being communicatively coupled to the processor. The processor is configured to execute machine-executable instructions that, when executed by the processor, cause the processor to obtain data from or provide data to the at least one electronic device. The rendering device is configured to receive rendering information from the processor, and render the immersive environment based at least in part on the rendering information from the processor.

20 Claims, 38 Drawing Sheets

Related U.S. Application Data

(60) Provisional application No. 62/302,163, filed on Mar. 1, 2016.

(51) Int. Cl.
  *G06F 3/01* (2006.01)
  *G06K 9/00* (2006.01)
  *A61H 9/00* (2006.01)

(52) U.S. Cl.
  CPC .......... *G06K 9/00671* (2013.01); *G06T 15/02* (2013.01); *G06T 19/00* (2013.01); *G06T 19/003* (2013.01)

(58) Field of Classification Search
  CPC ......... G06T 17/00; G06T 7/00; G06T 19/006; G06T 2215/16; A63F 13/10; H04N 2201/3245; H04N 5/272; G06F 3/011–015; G06F 2111/18; G06F 3/0481; G06F 3/04817; G06F 9/4443; G06F 3/04847; G06F 11/3664; G06F 3/012; G06F 3/0304
  See application file for complete search history.

(56) References Cited

U.S. PATENT DOCUMENTS

| | | | |
|---|---|---|---|
| 7,647,560 | B2 | 1/2010 | Macauley et al. |
| 8,294,557 | B1 | 10/2012 | Saddik et al. |
| 8,311,791 | B1 | 11/2012 | Avisar |
| 8,504,136 | B1 | 8/2013 | Sun et al. |
| 8,764,449 | B2 | 7/2014 | Rios et al. |
| 8,831,924 | B2 | 9/2014 | Avisar |
| 10,601,950 | B2 | 3/2020 | Devam et al. |
| 11,065,174 | B2 * | 7/2021 | Lach ............... A61H 39/007 |
| 2004/0070684 | A1 | 4/2004 | Horigome |
| 2004/0077978 | A1 * | 4/2004 | Nelson ............... A61H 23/0263 601/70 |
| 2005/0195587 | A1 | 9/2005 | Moctezuma de la Barrera et al. |
| 2009/0018808 | A1 | 1/2009 | Bronstein et al. |
| 2009/0128306 | A1 | 5/2009 | Luden et al. |
| 2009/0160770 | A1 | 6/2009 | Shahoian |
| 2009/0282331 | A1 | 11/2009 | Nagasaka |
| 2009/0311655 | A1 | 12/2009 | Karkanias et al. |
| 2010/0261526 | A1 | 10/2010 | Anderson et al. |
| 2012/0058457 | A1 | 3/2012 | Savitsky |
| 2012/0179075 | A1 | 7/2012 | Perry et al. |
| 2012/0188352 | A1 | 7/2012 | Wittenberg et al. |
| 2013/0009993 | A1 | 1/2013 | Horseman |
| 2013/0047103 | A1 | 2/2013 | Avisar |
| 2013/0230837 | A1 | 9/2013 | Meglan et al. |
| 2013/0237811 | A1 | 9/2013 | Mihailescu et al. |
| 2013/0267838 | A1 | 10/2013 | Fronk et al. |
| 2014/0057236 | A1 | 2/2014 | Meglan et al. |
| 2014/0343913 | A1 | 11/2014 | Avisar |
| 2015/0065931 | A1 * | 3/2015 | Alnabulsi ............ A61H 9/0078 601/152 |
| 2015/0127316 | A1 | 5/2015 | Avisar |
| 2015/0140535 | A1 | 5/2015 | Geri et al. |
| 2015/0254422 | A1 | 9/2015 | Avisar |
| 2015/0379774 | A1 | 12/2015 | Trainor |
| 2016/0008206 | A1 * | 1/2016 | Devanaboyina ....... A61H 1/001 601/136 |
| 2017/0035517 | A1 | 2/2017 | Geri et al. |
| 2019/0206134 | A1 * | 7/2019 | Devam .................. G06F 3/011 |

FOREIGN PATENT DOCUMENTS

| | | |
|---|---|---|
| WO | 2012135653 A1 | 10/2012 |
| WO | 2013177520 A1 | 11/2013 |
| WO | 2014134196 A1 | 9/2014 |
| WO | 2015154069 A1 | 10/2015 |

OTHER PUBLICATIONS

International Search Report and Written Opinion of the International Searching Authority, dated Jun. 1, 2016 in App. No. PCT/US2016/020302 (filed Mar. 1, 2016).

Jeffrey R. Korzan et al., "In Vivo Magnetic Resonance Imaging of the Human Cervical Spinal Cord at 3 Tesla," Journal of Magnetic Resonance Imaging 16:21-27 (2002).

* cited by examiner

FIG. 33
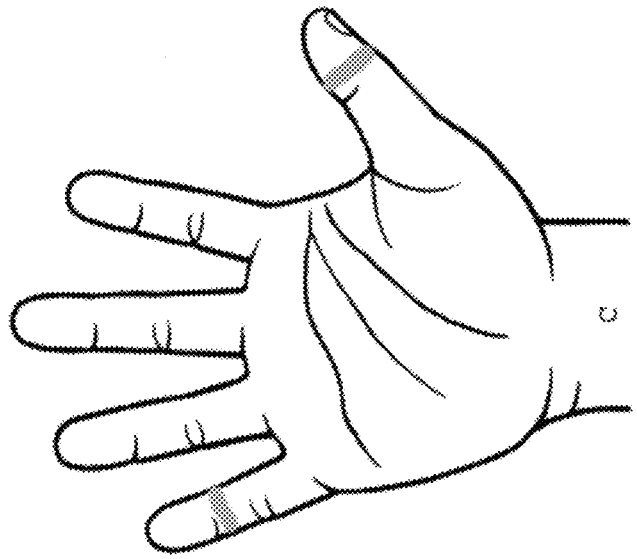
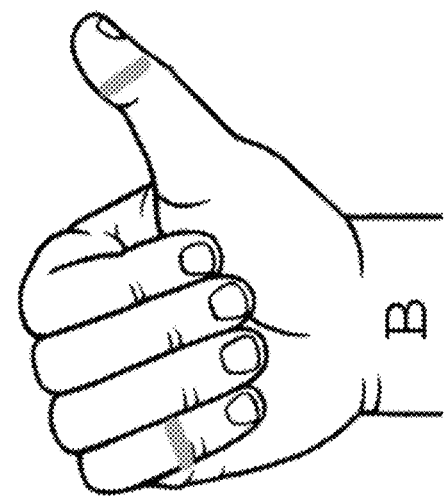
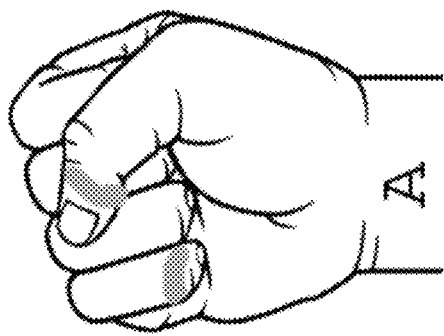

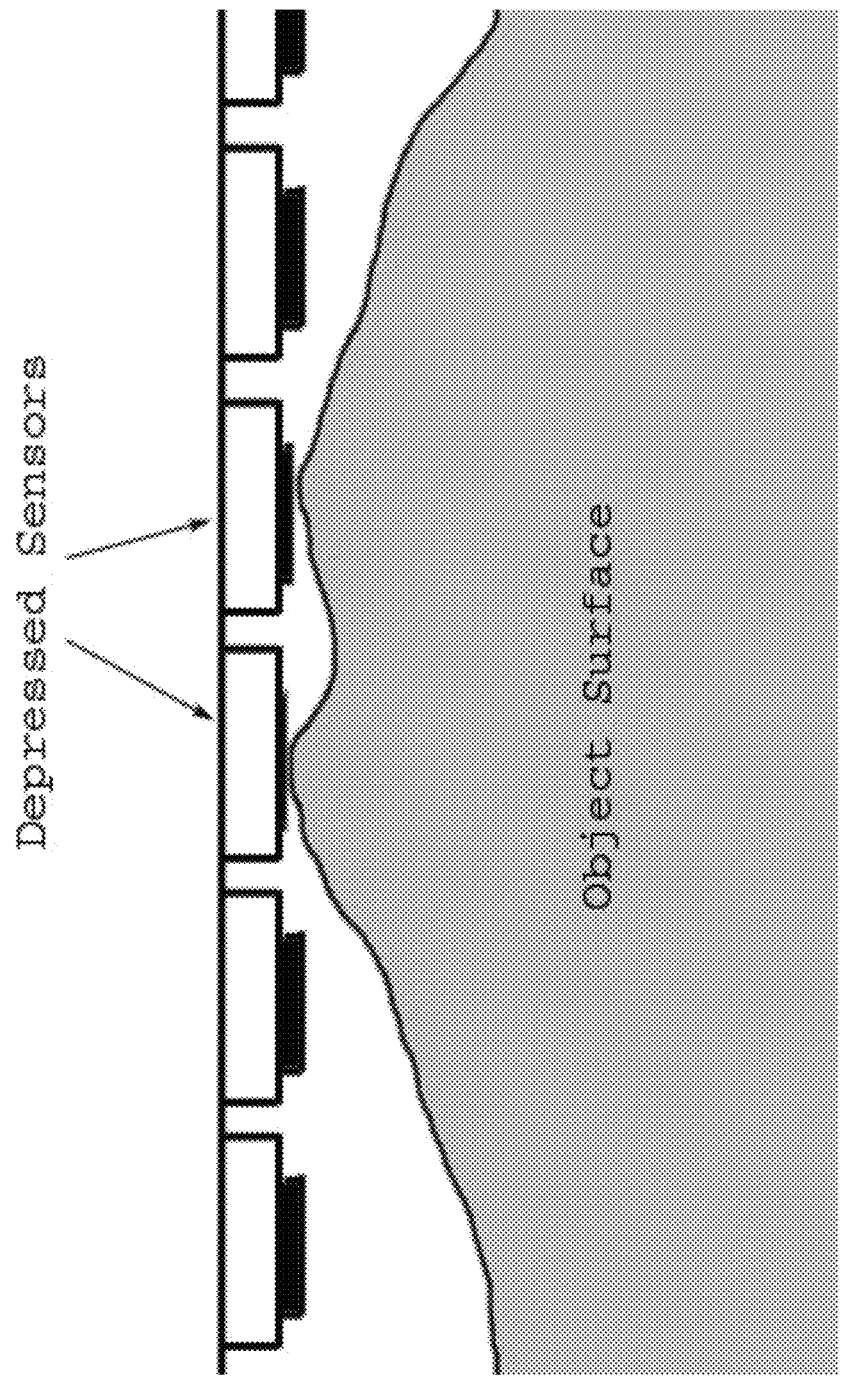

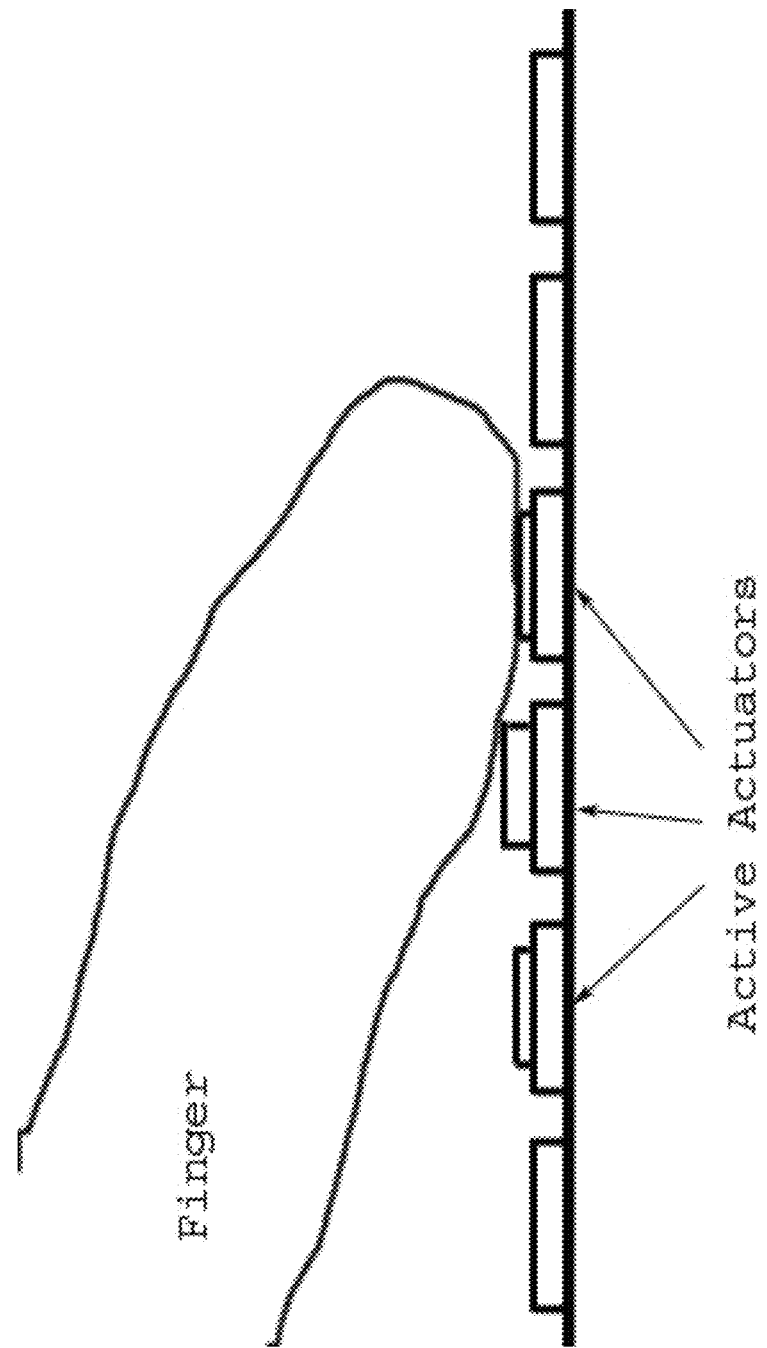

SYSTEMS AND METHODS FOR RENDERING IMMERSIVE ENVIRONMENTS

CROSS-REFERENCE TO RELATED APPLICATIONS

This application is a continuation of U.S. patent application Ser. No. 16/081,685, filed Aug. 31, 2018 and entitled "SYSTEMS AND METHODS FOR RENDERING IMMERSIVE ENVIRONMENTS", which entered the national phase in the United States from PCT Application No. US2017/020213, filed Mar. 1, 2017, which claims priority to U.S. Provisional Patent Application No. 62/302,163, filed Mar. 1, 2016 and entitled "PATIENT-CARE PROCEDURE AND TRAINING USING SYNTHESIZED IMAGERY." All of the above-referenced applications are hereby incorporated by reference in their entireties for all purposes.

TECHNICAL FIELD

The present disclosure relates to systems and methods for rendering, recording, and using immersive environments in medical, gaming, and other fields.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 33 illustrates a user's hands in different positions and corresponding sensor data in accordance with some embodiments;

FIG. 36 illustrates an exemplary close-up view and surface view of a sensor and interaction/recording therewith;

FIG. 37 illustrates an exemplary close-up view of an actuator, including surface emulation and playback;

DETAILED DESCRIPTION

Figure 1:
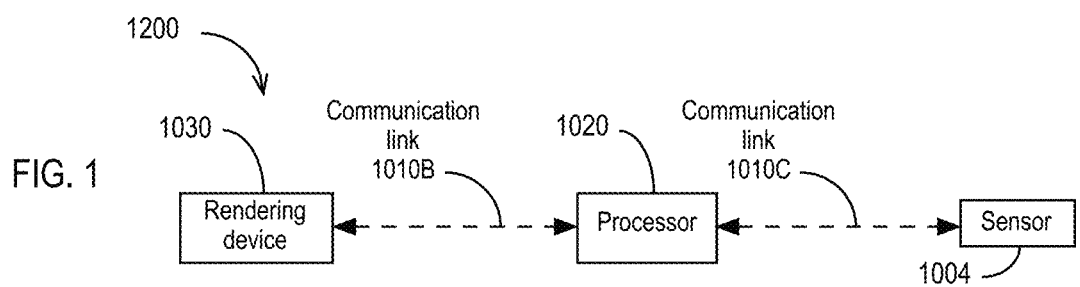
FIG. 1 is a block diagram of a system for tracking, in an immersive environment, a positional sensor ingested by, injected into, or inserted into a patient in accordance with some embodiments.

Methods, systems and system components are disclosed in various embodiments for viewing and accurately locating patient organs, arteries and other features prior to and during surgery, thereby reducing morbidity and mortality due to surgical error associated with variance in patient feature location. In a number of embodiments, imaging data is interpreted into an augmented reality (AR) or virtual reality (VR) view of a patient, to be shown to a doctor, surgeon, or other medical practitioner during a procedure in order to enhance the accuracy and efficacy of the procedure. Methods and apparatuses interpret imaging data into an AR or VR view of a subject for use by other users including, but not limited to, insurance auditors, non-surgical physicians, nurses and legal professionals.

Methods and apparatuses for providing a heads-up display (HUD) displaying both AR path data and camera imagery for laparoscopic cameras during medical procedures are also disclosed. In a number of embodiments, locations of the laparoscope camera and/or carrier tube are tracked during laparoscopy, with transmission of the camera image to a device, and overlay of the location and path data of the laparoscope in augmented reality.

Various techniques and apparatuses for training and testing of surgical and diagnostic skills using AR or VR and display of real patient data gathered by magnetic resonance imaging (MRI) are also disclosed. In a number of embodiments, real patient data (e.g., composed from an MRI, CT scan, x-ray, or any other patient data source) is displayed to a practitioner/trainee and further enhanced through AR or VR to simulate a variety of conditions for testing and training.

An AR device is any device comprised of a computer controlled display capable of displaying either a transparent image atop real world data, such as glasses with an embedded transparent display mechanism, or a device capable of displaying a composite image from a camera or other imaging source coupled with overlaid three-dimensional data. A VR device is any device comprised of a computer-controlled display that covers the user's vision and immerses the user in an immersive environment.

As used herein, the term "immersive environment" is a general term encompassing any or all of augmented-reality environments, virtual-reality environments, immersive-reality environments, and enhanced-reality environments.

I. Fluid Detection

Some embodiments disclosed herein relate to the detection of fluids. For example, some embodiments relate to a method and apparatus for sensing and displaying liposuction procedure data in virtual reality, augmented reality, or other immersive environment. In liposuction, a cannula is used to break up or melt fat, after which the fat is suctioned up. By adding a monitoring device to the cannula, the volume of material suctioned from the patient can be measured. This can be used to assist the practitioner in ensuring that even amounts of material are removed from symmetrical areas, as well as to ensure that too much material is not taken from the subject. The monitoring device consists of a digital flow meter attached to a standard cannula. The flow meter is connected to a display device to show the practitioner how much volume has flowed through the cannula. A button either on the cannula or device can be used to reset the flow meter.

Some embodiments relate to a method of sensing and displaying liposuction data, including but not limited to, volume of material removed from the patient, and mock-ups of post-surgical results. Cannulas for liposuction currently do not track the volume of material removed from a patient. By adding a flow meter to the cannula, an accurate reading for how much fat has been removed from a patient can be taken. This allows a practitioner to ensure that they take a consistent amount of material from symmetrical parts of a client, and to ensure that too much material is not taken, reducing potential harm to the subject.

Some embodiments relate to a method and apparatus for detecting fluid using a hygrometer attached to a cannula. As an example of a situation in which such an embodiment is useful, when draining fluid from behind the eardrum, it is common practice for a doctor to punch a hole through the eardrum and add a stent. This method creates a permanent hole in the membrane of the eardrum, and exposes the patient to additional risk of infection. The repair of the hole is a complicated surgery.

In some embodiments, a small hygrometer is attached to the end of a cannula, which can be used to detect fluid within internal cavities. The reading from the hygrometer is transmitted to a display visible to the practitioner. This display can be on a monitor such as an LCD or CRT monitor, in an immersive environment, or any other display method that is available to the practitioner.

To avoid creating a permanent hole in a patient's eardrum membrane, the device can be threaded through the Eustachian tube to the subject's aural cavity. If fluid is present, the hygrometer will indicate it to the practitioner. Using this method, the practitioner can ensure that all of the fluid is drained using the cannula to help ensure a successful procedure without the need to damage the membrane in the patient's ear.

In some embodiments, a system for fluid detection comprises a cannula, a monitoring device (e.g., a flow meter, hygrometer, etc.) coupled to the cannula, and a display device coupled to the monitoring device. The display device presents an indication of the volume of material (e.g., fluid) passing through the cannula. The monitoring device may be coupled to a button allowing a user to reset the monitoring device. For example, the button may be attached to the cannula, or it may be coupled to the display device. The display device may include a screen, an LCD monitor, CRT monitor, an audio device, or any other mechanism to provide information to a user about the volume of material passing through the cannula. The display device may be in an immersive environment (e.g., it may be visible in a heads-up display or visible/audible using another rendering device that presents an immersive environment).

II. Ingested-Positional-Sensor Tracking [AR/VR Assistance]

Some embodiments relate to a method and apparatus for tracking, in virtual reality, augmented reality, or other immersive environment, a positional sensor ingested by, inserted into, or injected into a patient. An ingested, injected, or inserted sensor can be used to track the digestive path of a subject to determine the path for an endoscope. The path can also be used to identify and locate blockages in the digestive system.

Some embodiments relate to a method for tracking a positional sensor ingested by, injected into, or inserted into a patient and tracked via augmented or virtual reality overlay. FIG. 1 illustrates a system 1200 for tracking, in an immersive environment, a positional sensor ingested by, injected into, or inserted into a patient. A sensor 1004 capable of broadcasting orientation, position, and/or speed data is encapsulated in a capsule. When a subject swallows the capsule, which is non-digestible, the capsule transmits data to a processor 1020 over a communication link 1010C. The transmission can be made in radio frequency, Bluetooth, Wi-Fi, or any other method of wireless communication. The path data for the capsule is taken in three dimensions, as well as the current position. The processor 1020 provides information to a rendering device 1030 over the communication link 1010B. The provided information allows the rendering device to overlay data over the patient in an immersive environment, allowing a practitioner to identify the path taken by the capsule. The path of the capsule can be used, for example, to determine the path for a gastroscopy procedure, or to identify blockages in the digestive system. For example, a patient with a blockage in the intestine can swallow a small sensor (e.g., a macro-, micro-, or nano-sensor). The location and path of the sensor are tracked by the sensor 1004 and presented to the physician by the rendering device 1030 in augmented reality, and the physician can look at the path of the sensor to determine at what point passage through the intestine stops. This helps the physician identify that a blockage exists, and to locate the blockage.

In embodiments in which a sensor is injected into a patient, a macro-scale, micro-scale, or nano-scale sensor may be suspended in a solution for injection and tracked using receivers and software to accurately track the location in three dimensions.

In some embodiments, a method for tracking a sensor within a patient comprises receiving, from a positional sensor (e.g., a macro-, micro-, or nano-sensor) in the patient, a signal indicating the position and/or speed of the positional sensor, and then, based on the signal, generating data representing the path of the positional sensor through the patient. A three-dimensional view of the patient overlaid by a virtual image of the path of the positional sensor through the patient may then be rendered using the data. The positional sensor may be injected into the patient, ingested by the patient, or inserted into the patient. The signal from the positional sensor may be received over a wireless channel or link (e.g., a radio-frequency, Wi-Fi, or Bluetooth link).

In some embodiments, a system comprises a positional sensor (e.g., a macro-, micro-, or nano-sensor) that is configured to be ingested by, inserted in, or injected into a patient. If injected, the sensor may be suspended in a solution as described above. The positional sensor includes a transmitter. The system also includes a receiver configured to receive a signal (e.g., a wireless signal, such as radio-frequency, Wi-Fi, or Bluetooth) from the positional sensor, where the signal indicates a position and/or speed of the positional sensor within the patient, and a processor coupled to the receiver. The processor obtains the signal (or information gleaned from the signal) from the receiver and, based thereon, executes computer instructions (e.g., a computer program) to determine a path of the positional sensor within the patient. The system also includes a projector that is coupled to the processor. The projector obtains from the processor information that the projector then uses to render a three-dimensional view of the patient overlaid by a virtual image of the path of the positional sensor within the patient.

III. Adaptive Radiation Shielding, Including Dynamic Aperture Formation

Some embodiments relate to a method and an apparatus for adaptive radiation shielding comprising a membrane or other container filled with a lead suspension solution. Additional membranes can be added to the apparatus containing solutions such as a ferromagnetic solution. The lead suspension fluid shields the covered areas from radiation. An aperture can be created by magnetizing the membrane and exposing it to a reverse magnetic field. The reversed polarity will push away the magnetized particles, creating an aperture proportional in size to the strength of the reversed field. The secondary membrane, such as a ferromagnetic membrane, can be used for cooling to ensure that the membrane does not get too hot and damage the membrane.

Some embodiments relate to a method and apparatus for adaptive radiation shielding in radiation therapy. In radiation therapy, the non-targeted areas of a patient are covered using shielding to prevent damage to healthy tissue. The targeted area, however, is not visible and the areas that are covered or exposed are therefore determined using the best judgment of the person performing the procedure. Using augmented reality, the location of the target area can be displayed on the patient in three-dimensional space, allowing for accurate placement of the radiation shielding. Additionally, using an adaptive radiation shield, a computer can automatically determine and place the shielding without the need for user interaction, allowing for a high degree of precision in the placement of the shielding.

Some embodiments relate to a method and apparatus for adaptive radiation shielding for radiation therapy using augmented reality to direct the location and size of the exposure aperture. In some embodiments, a system comprises an AR device, a camera or other imaging device, a standard radiation therapy setup, and optionally an audio capture device for recording and voice command input. An AR display of the radiation target is overlaid on the patient using methods described above. Using the visible target, the practitioner is able to accurately position radiation shielding such that only the target area of the patient is exposed to radiation.

In an automatic embodiment, the radiation shielding is placed by a computer using robotic manipulators or a shield that can be moved through automated means. A camera attached to the radiation source monitors the path from the source to the target, and maneuvers the shielding into position. When the best location for the shielding, exposing the minimal non-target area possible, has been located, the shielding is fixed in place for the procedure.

In an interactive embodiment, the clinician is equipped with an augmented-reality-enabled device allowing them to see radiation targets in a patient in three-dimensional space. By aligning the adaptive radiation shielding to cover all areas except the target area, the clinician can ensure that only the target area is hit by radiation, thus reducing the morbidity of adjacent areas.

In an automated embodiment, a computer is equipped with a camera to identify the location of the patient, and is also able to control the location of the shielding. The computer then uses actuators to adjust the size and position of the shielding to cover the non-targeted areas, allowing for a high degree of accuracy in radiation treatment.

For example, a patient being treated with radiation for breast cancer lies on the table used for radiation treatment. The practitioner, wearing a set of augmented reality glasses, is shown a visualization of the target tumor overlaid on the patient's body. Using the visualization, the practitioner can accurately place the radiation shielding such that when viewed through the irradiating mechanism's camera, only the tumor is visible. This reduces or eliminates damage to healthy tissue during radiation therapy.

Some embodiments relate to an apparatus for adaptive radiation shielding comprising a membrane or other container filled with a lead suspension solution. Additional membranes can be added to the apparatus containing solutions such as a ferromagnetic solution. The lead suspension fluid shields the covered areas from radiation. An aperture can be created by magnetizing the membrane and exposing it to a reverse magnetic field. The reversed polarity will push away the magnetized particles, creating an aperture proportional in size to the strength of the reversed field. Multiple magnetic fields can be used to shape the aperture. The secondary membrane, such as a ferromagnetic membrane, can be used for cooling to ensure that the membrane does not get too hot and damage the membrane. The magnets can be positioned either automatically or by a practitioner, or any combination in between.

For example, a patient being treated for an intestinal tumor lies on the treatment table. The apparatus is placed over the patient's chest, abdomen, and thighs. Using an augmented reality overlay, a computer is able to visualize the tumor through a camera connected to the irradiating device. The apparatus is charged magnetically with a positive magnetic field. A magnet with a negative magnetic field is placed over the site of the tumor, and the strength of the negative field is adjusted by the computer to create an aperture large enough to see the entire tumor. The tumor is then irradiated, with the healthy tissue surrounding the tumor protected by the apparatus.

Some embodiments include an apparatus for shielding radiation in a radiation therapy procedure. For example, a mold can be made using silicone or another material to create a customized protective shield using any combination of lead, cadmium, indium, tin, antimony, cesium, barium, cerium, gadolinium, tungsten, bismuth, or other protective material. This mold can also have an aperture sized and located specifically for the target area.

In another example, radiation shielding is composed of many different segments, held to a supporting structure by Velcro or other adhesive method. The individual segments contain any combination of lead, cadmium, indium, tin, antimony, cesium, barium, cerium, gadolinium, tungsten, bismuth or other protective material. The segments can be added or removed from the support structure to allow or block the flow of radiation to a given area. The support structure can be a rigid structure designed to fit over a patient. The support structure can also be a flexible material that drapes over a patient. The support structure can also be a garment to be worn by a patient.

In some embodiments, a system for use in radiation therapy of a patient includes a radiation shield. The radiation shield may comprise a mold (e.g., silicone, lead, cadmium, indium, tin, antimony, cesium, barium, cerium, gadolinium, tungsten, bismuth, etc.). The radiation shield may comprise a support structure and at least one segment (e.g., made of lead, cadmium, indium, tin, antimony, cesium, barium, cerium, gadolinium, tungsten, bismuth, etc.) coupled to the support structure, where the at least one segment may be permanent or removable from the support structure. The support structure may be rigid or flexible, or it may be a garment to be worn by the patient.

The radiation shield comprises a membrane, which comprises a lead suspension solution. The radiation shield is intended to be placed over at least a portion of the patient. The system also includes a magnetization system coupled to the radiation shield and configured to magnetize the membrane, and expose the membrane to a reverse magnetic field to create an aperture in the radiation shield. The size of the aperture in the radiation shield may be dependent on the strength of the reverse magnetic field. The system also includes a rendering device (e.g., an augmented reality device) configured to render a three-dimensional virtual image of the aperture in the radiation shield overlaid on the patient. Optionally, the system may also include an audio capture device configured to capture voice commands. Optionally, the system may also include a radiation therapy system configured to provide the radiation therapy to the patient through the aperture.

The system may optionally also include at least one processor coupled to the magnetization system and the rendering device, wherein the at least one processor is configured to execute one or more instructions that, when executed, cause the at least one processor to obtain the size of the aperture (e.g., by calculating, retrieving, or receiving the size, either from a user or without user involvement), obtain a setting of the magnetization system (e.g., determine the setting without user input or based on a user input) suitable to create an aperture of that size in the radiation shield, cause the magnetization system to create the aperture of that size in the radiation shield, and cause the rendering device to render the three-dimensional virtual image of the aperture in the radiation shield overlaid on the patient.

In some embodiments, the membrane is a first membrane, and the radiation shield further comprises a second membrane configured to cool the first membrane. In such embodiments, the second membrane may comprise a ferromagnetic membrane.

The system may optionally also include means (e.g., a computer system) for positioning the radiation shield over the patient. For example, the system may include a camera coupled to a radiation delivery source, where the camera is configured to monitor a path from the radiation delivery source to the patient, and a robotic manipulator coupled to the camera and configured to place the radiation shield over the patient.

In some embodiments, a method of radiation therapy comprises placing a radiation shield over a patient, the radiation shield comprising a membrane, the membrane comprising a lead suspension solution, magnetizing the membrane, exposing the membrane to a reverse magnetic field to create an aperture in the radiation shield, through a rendering device, rendering a virtual image of the aperture overlaid on the patient, using on the virtual image of the aperture overlaid on the patient, positioning a radiation therapy system to deliver radiation therapy to the patient through the aperture, and exposing the patient to radiation therapy through the aperture in the radiation shield.

IV. 3D Prosthetic Printing

Some embodiments relate to a method and apparatus for the creation and three-dimensional (3D) printing of prosthetics. Using augmented or virtual reality, a three-dimensional model for a prosthetic can be created. This prosthetic model can then be exported in a format that can be printed by three-dimensional printers.

Some embodiments relate to a method for creation and printing of three-dimensional models for prosthetics. Prosthetics can be created in an immersive environment through user interaction with gestures, voice commands and other user input methods. A virtual subject is created through common means of three-dimensional modeling, or by reconstruction from medical imaging. The subject can be a partial or complete entity, for example an entire person, or a portion of a person's anatomy. The prosthetic is then created to match the shape and size required, and saved to a storage medium. For example, a broken bone can often be shattered. By using a scanned image of the bone, a comparable bone (left tibia vs. right tibia), or a generated shape, a three-dimensional model can be created. This model can be printed using three-dimensional printing methods, and a suitable replacement bone or bone segment can be used to repair the break.

The data saved to a storage medium can be used in three-dimensional printing in order to create a prosthetic from the virtual model. For example, a subject requiring a prosthetic foot is attended by a practitioner using a set of augmented reality glasses. The practitioner analyzes the patient's existing foot, and selects the foot in augmented reality. Using (for example) voice commands, the practitioner creates a mirrored copy of the subject's foot. The foot is then overlaid in place using gestures to check the fit. The subject can also wear augmented reality glasses to share in the immersive environment and see the process and fit for themselves. If the fit is not quite correct, the practitioner may use a combination of voice and/or gesture controls to adjust the virtual foot until it appears correct. The practitioner can then send the metrics, such as, but not limited to, shape and size to a three-dimensional printer for manufacture.

In some embodiments, a method of designing a prosthetic device for a recipient (e.g., a person, an animal, etc.) comprises presenting, in an immersive environment provided by a rendering device, a model representing at least a portion of the recipient, based on the model representing the at least a portion of the recipient, creating a model of the prosthetic device in the immersive environment provided by the rendering device, and storing information representing the model of the prosthetic device in a storage medium. In some embodiments, the method further comprises obtaining a user input, and wherein presenting the model comprises determining the model based at least in part on the user input. Creating the model of the prosthetic device may comprise obtaining a user input (e.g., a gesture, voice command, keystroke, etc.) and creating the model based on that user input. Creating the model may involve giving the prosthetic model a size or shape configured to fit the at least a portion of the recipient. The prosthetic device may be manufactured (e.g., using an additive manufacturing process such as three-dimensional printing) based on the stored information representing the model of the prosthetic device.

V. Multi-Coil/Customized-Coil Magnetic Resonance Imaging

Some embodiments include a method and apparatus for MRI using multiple radio-frequency (RF) coils. In a traditional MRI, there is a single RF coil used to generate the excitation of targeted atoms. By using multiple RF coils instead of a single RF coil, operating independently or in synchronicity, a higher quality magnetic resonance image can be recorded.

Some embodiments relate to a method and apparatus for customization of RF coils in MRI to create images with higher SNRs and better image contrast. RF coils in an MRI machine are fixed-position objects, either as part of the machine or as additional coils for specific sensing uses. When an MRI of the knee is being done, for example, the knee can be fitted into a mold for the knee that contains an RF coil. In order to get a better SNR and image contrast, RF coils molded to the particular subject's body (e.g., a custom-built, anatomically molded radio frequency (RF) surface coil) can be used. These molded coils will provide both more natural positioning of the patient and a better final magnetic resonance (MR) image.

Some embodiments relate to a method and apparatus for MRI comprising a standard MRI machine with the RF frequency coil replaced by multiple coils operated independently or in a synchronized fashion in order to generate an improved MR image.

Some embodiments include a method for using customized RF coils in MR imaging in order to create images with higher signal-to-noise ratio (SNR) and higher contrast. The RF coil used for excitation of atoms in an MR imaging sequence can be shaped to the subject area. Using a shaped RF coil (e.g., a custom-built, anatomically molded radio frequency (RF) surface coil) allows for a more accurate signal and better SNR.

Figure 2:
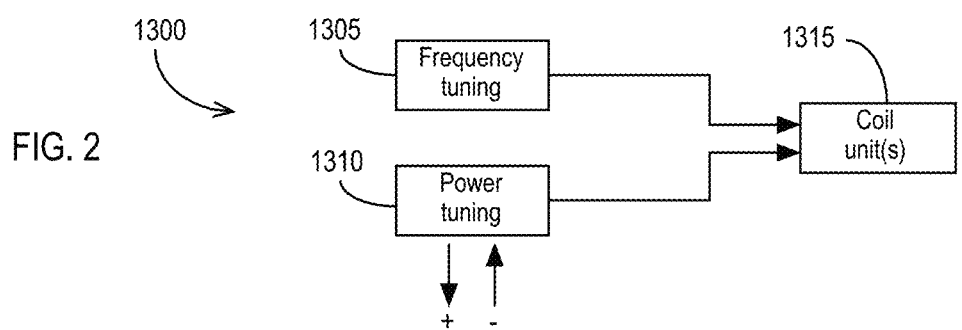
FIG. 2 is a block diagram of a system in which a coil unit is selectively tuned in frequency and power in accordance with some embodiments.

In some embodiments, the shaped or customized RF coil can be selectively tuned (e.g., in frequency and/or power) to allow for a clearer MR image. Selective tuning of available parameters (e.g., frequency, power, etc.) allows greater control over the image contrast and signal strength. FIG. 2 illustrates a system 1300 in which a coil unit 1315, which comprises one or more RF coils, is selectively tuned in frequency and power. A frequency tuning unit 1305 controls the frequency provided to the coil unit 1315, and a power tuning unit 1310 controls the power provided to the coil unit 1315. The frequency tuning unit 1305 and power tuning unit 1310 may be coupled to a computer (not shown) that may be programmed to automate the tuning process to adjust image quality. Alternatively, a user may manually adjust power and frequency.

In some embodiments, a magnetic resonance imaging system comprises a first radio-frequency (RF) coil and a second RF coil, where one or both of the first and second RF coils are customized. One or both of the RF coils may be molded to a portion of a patient's body. A mold may include the first and/or second RF coil.

In some embodiments, a method of performing magnetic resonance imaging (MRI) on a portion of a body of a patient comprises customizing (e.g., shaping) a RF coil based on the portion of the patient's body and imaging the portion of the patient's body using the RF coil. The RF coil may also be tuned (e.g., the applied power or frequency of the coil may be adjusted either automatically, without human intervention, or in response to an input or instruction from a user). In some embodiments, the RF coil is included in a mold, and further comprising fitting the portion of the patient's body into the mold.

Imaging the portion of the patient's body using the RF coil may comprise obtaining a first MR image, obtaining a second MR image while or after the patient moves, and comparing the first and second MR images.

VI. User/Patient Activity Monitoring and Feedback

Some embodiments relate to a method and apparatus for analysis of MR images taken while a patient is moving. By comparing different MR images from a moving patient, a practitioner can determine how the parts of an injured limb or joint move. This detail allows for better diagnosis and treatment of an injury. Moving MRI can be taken using a customized coil as discussed herein.

Some embodiments relate to a method for interacting with an immersive environment using cerebral activity monitoring. In some embodiments, readings taken from a user's brain activity, by means such as, but not limited to, alpha wave readings, beta wave readings, delta wave readings, gamma wave readings, and theta wave readings, electroencephalography (EEG), magnetoencephalography (MEG), or cerebral implant are used to control a user interface in an immersive environment. Readings of frequency and amplitude may be used to control elements of the user interface, either in concert or separately. Brain waves may be used to measure and monitor changes in brain activity to determine the efficacy of a treatment of neurological issues, epilepsy, etc.

In some embodiments, a method of monitoring user or patient movement comprises at a first time, generating a first magnetic resonance (MR) image of a moving patient (e.g., using the magnetic resonance imaging system described above in the preceding section); at a second, later time, generating a second MR image of the moving patient; and comparing the second MR image to the first MR image.

In some embodiments, a method comprises obtaining a reading of a user's brain activity (e.g., an alpha, beta, delta, gamma, or theta wave reading taken using an EEG, MEG, or a cerebral implant), and using the reading, controlling, selecting, or modifying an element (e.g., a key, a display, an object, a brightness, etc.) of a user interface (e.g., a virtual keyboard, menu, peripheral, display, etc.) in an immersive environment. The reading may be characterized by a frequency or an amplitude.

VII. Magneto-Stabilization of Patient Anatomy

Some embodiments relate to a method for magneto-stabilization of patient anatomy. A ferromagnetic fluid is injected into the area of a patient desired to be stabilized. A magnetic device or material is then adhered or otherwise anchored to the patient in place at the location of the stabilization point. The magnetic field holds the ferromagnetic fluid in place, stabilizing the targeted area. For example, a patient who has had a rhinoplasty could have the nasal area injected with ferromagnetic fluid, and a magnetic bandage attached to the exterior of their nose. As the wound heals and swelling reduces, the interior anatomy is kept stabilized by the magnetic field.

In some embodiments, a method of magneto-stabilization of a patient comprises injecting a ferromagnetic solution into an area of the patient to be stabilized and coupling a magnetic device or material to the area.

VIII. Tissue Separation

Some embodiments relate to a method for separating healthy tissue from cancerous tissue. When surgery is performed to remove a cancerous growth, healthy tissue is removed with the cancerous tissue in order to ensure that all of the cancerous tissue is removed. This procedure can result in significantly more tissue being removed than is necessary for the success of the surgery.

A ferrofluid or other magnetically responsive material is injected into the area surrounding the cancerous tissue. The area is then exposed to a strong magnetic field, and the difference in absorption of the fluid between the healthy and cancerous tissue allows for magnetic separation of the two types of tissue.

IX. Identification of Microscopic Features Using High-Definition Camera

Some embodiments also relate to a method for identifying microscopic skin conditions using a high-definition camera, such as a stand-alone camera or a camera integrated into or attached to a pair of glasses, a headset, a helmet, or another wearable article. High-definition cameras have a much greater resolution than the human eye. By using a high-definition camera, a practitioner can identify microscopic organisms and other such skin conditions in a subject either automatically or with user interaction. In the case of automatic detection, algorithms and pattern recognition are used to determine whether microscopic organisms or skin conditions exist. In the case of user interaction, the user can optionally zoom in on an area to get a magnified view. With user interaction, automatic recognition can also be used to draw attention to details within the image and assist in diagnosis. Additionally, in some embodiments, using movement detection, practitioners are able to detect specific parasites such as lice or mites. For example, a patient with scabies (a mite that causes a rash in humans) is viewed by a dermatologist. Using the enhanced high-definition camera, the dermatologist is able to see the mites, which would otherwise be invisible to the naked eye. This allows for certainty in diagnosing the patient with scabies and prescribing the appropriate medication.

In some embodiments, a practitioner or technician places a sample on a slide, and an analysis system including a high-definition camera assists in the analysis of a specimen. For example, the analysis system may assist in the detection of a feature, a color, a movement, or any other characteristic. The analysis system assists in analysis and interpretation of the data. In some embodiments, the analysis system accepts user inputs. In other embodiments, the analysis system performs its tasks automatically, without user input.

In some embodiments, a method of identifying a skin condition comprises directing a high-definition camera toward an area of a patient's skin and identifying (e.g., using a computer to perform pattern recognition (either automated or with user input), detecting movement on the patient's skin, etc.) the skin condition based on a view provided by the high-definition camera.

X. Cardiographic Analysis and Interpretation

Some embodiments relate to an apparatus for auditory cardiographic analysis. Currently, physicians and other practitioners use a stethoscope as the primary means of cardiographic auditory analysis. A stethoscope allows a practitioner to listen to the rhythm of a heart, however the analysis of the heartbeat is completely subjective, and the diagnostic outcome is entirely dependent on the skill of the practitioner.

Figure 3:
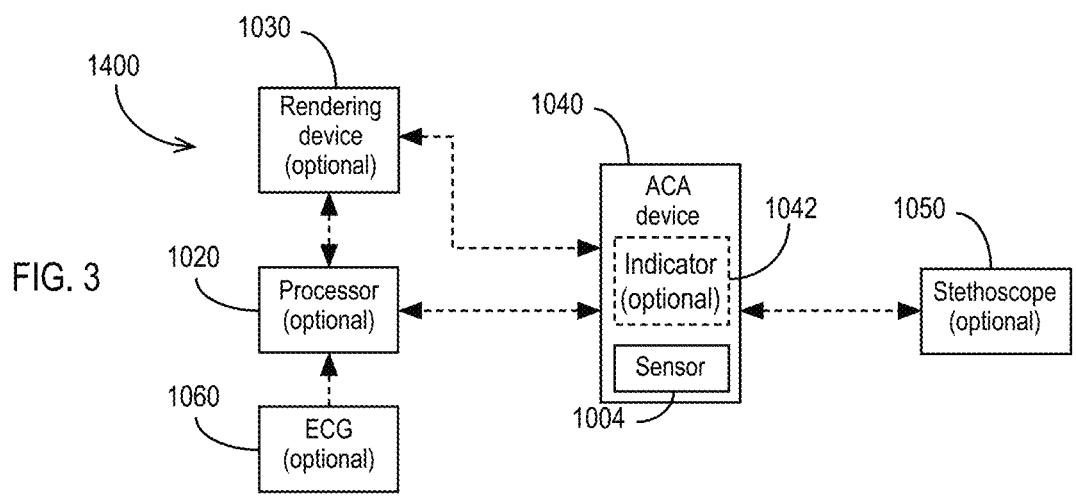
FIG. 3 is a block diagram of a system for auditory cardiographic analysis in accordance with some embodiments.

FIG. 3 illustrates a system 1400 for auditory cardiographic analysis. In some embodiments, an apparatus for auditory cardiographic analysis (ACA) device 1040 comprises a sensor 1004, which is pressed against the chest of the subject in a location where the heartbeat can be heard. Optionally, an indicator 1042 on or of the ACA device 1040 informs the user whether a sufficiently strong signal is present at the target location. Alternatively or in addition, a stethoscope 1050 may optionally be coupled to the ACA device 1050 to allow the practitioner to listen and locate a strong signal. The signal from the heartbeat is then digitized into a waveform and normalized, either by the ACA device 1050 itself or, optionally, by a processor 1020 coupled to the ACA device 1040. The normalized data is then compared with a databank of normative heart rhythms, allowing for a rapid diagnosis of conditions. Optionally, the ACA device 1040 or the processor 1020 (if present) provides rendering instructions to a rendering device 1030, which renders information associated with the heartbeat signal, the compared data, and/or the result of the comparison. The rendering device 1030 may be, for example, a device that provides an immersive environment (as discussed elsewhere herein), or it may be a display (e.g., an LCD screen) or other device that conveys information (e.g., a speaker, a computer, a tablet, a mobile phone, etc.).

In another embodiment, a microphone (e.g., a parabolic microphone) is used instead of or in conjunction with the sensor 1004 on the subject's chest. The microphone is able to amplify and record sounds inaudible to the human ear without amplification. The signal is then digitized into a waveform and normalized as explained above. In some embodiments, the ACA device includes a piezoelectric transducer that is capable of detecting the sounds of a subject's heart.

In some embodiments, the ACA device 1040 comprises a receiver, which may be, for example, a microphone. In such embodiments, the receiver may be coupled to the subject by a coupling fluid (e.g., water, ultrasound gel, etc.), or it may be suspended in a fluid or other medium, optionally surrounded by a membrane that may additionally act as a coupling medium or acoustic filter.

In some embodiments, physicians may be trained to listen for specific conditions using pre-recorded data and guided in learning with a computer program assessing whether the physicians are correctly diagnosing problems presented by the pre-recorded data. For example, the computer program may monitor a physician's performance in real time or near real time as the physician is making diagnoses, and can provide feedback, hints, or help to ensure that a correct diagnosis is made and to improve the physician's training.

Some embodiments relate to an apparatus for rapid tracing and interpretation of cardiographic rhythm anomalies.

Cardiographic tracing and interpretation is currently done using multiple instruments, the echo-cardiogram (ECG) and stethoscope being the most commonly used devices. The interpretation and analysis of the signals is done subjectively by a practitioner, and the resultant outcome is dependent on the skill of the practitioner. Some embodiments include an extension of the ACA device 1040 described above. As shown in FIG. 3, in some embodiments, in addition to the ACA device 1040, an ECG 1060 is optionally added to the system 1400. The ECG 1060 is coupled to the processor 1020. The processor 1020 obtains data from the ECG 1060 in concert with the data from the ACA device 1040 and compares the normalized data from both the ECG 1060 and the sensor 1040 to a set of normative data. The data is fitted to the best match, and the result is returned to the practitioner (e.g., through the rendering device 1030) for diagnostic purposes.

In some embodiments, a system for cardiographic analysis and interpretation comprises a sensor configured to detect a heartbeat of a patient and a processor coupled to the sensor. The sensor may provide a digital signal representing the patient's heartbeat to the processor, or it may provide an analog signal to an analog-to-digital converter (ADC), which digitizes the signal before providing it to the processor. The processor executes machine-executable instructions that cause the processor to normalize the digital signal, retrieve a reference signal from memory, and compare at least an aspect of the digital signal to at least an aspect of the reference signal. The processor may also provide information indicating the result of the comparison (e.g., whether the normalized digital signal comports with the reference signal in some way (amplitude, period, waveform shape or characteristics, etc.). The sensor may include an indicator (e.g., a light source, a display, a speaker, etc.) for indicating a level of the detected heartbeat of the patient. The sensor may include a microphone (e.g., a parabolic microphone). The system may also include an electrocardiograph coupled to the processor, and the processor may be programmed to obtain a signal generated by the electrocardiograph and compare an aspect of the signal generated by the electrocardiograph (e.g., amplitude, period, waveform shape or characteristics, etc.) to that same aspect of the reference signal.

XI. Automated Diagnoses and Guided Treatment

Some embodiments relate to automated or user-guided devices and methods for performing diagnostic procedures, including, but not limited to, assessing, diagnosing and assisting in patient care in a triage or other emergency setting. A practitioner using an augmented reality device can analyze a patient to assess health based on signs and symptoms exhibited by the patient. A diagnosis can be made using a databank of conditions and symptoms. Directions can then be given by the device to assist the practitioner in treatment of the patient.

As one example, in a triage situation a nurse wearing augmented reality glasses can connect a patient to vitals monitoring. The patient shows as tachycardic. The nurse is able to contact a doctor using the augmented reality glasses, and share with the doctor the vitals and view of the patient. The doctor is then able to quickly assess whether the patient needs immediate attention, and direct the nurse as to next steps. Alternately or in addition, video and vitals can be recorded by the augmented reality glasses and transmitted to the doctor for review. The doctor can then contact the nurse, either via the glasses or through other means, to indicate if escalation is required for a particular case.

Some embodiments relate to an automated or user-guided device for performing diagnostic procedures. This device can be, but is not limited to, a probe, robot, automaton or other user or self-guided device. Using artificial intelligence, the device is able to analyze symptoms and identify conditions present in a subject. The subject symptoms are evaluated as well as other metrics, which may include, but are not limited to, location, age, sex, environmental conditions, and nationality. For example, if a patient is thought to have a highly infectious disease, a robot is given direction to assess and analyze the patient, performing a diagnosis. User input is given to direct the robot to look specifically for the suspected disease. This allows for correct diagnosis of the patient without risking communication of the disease to a physician or other practitioner.

In some embodiments, a method for performing a diagnostic procedure comprises viewing a patient using an augmented reality device (e.g., a pair of glasses, a helmet, a headgear, etc.) and, using the augmented reality device, sharing information (e.g., a vital sign, a video, etc.) about the patient with a remote practitioner. The method may also include receiving an instruction from the remote practitioner through the augmented reality device. The method may also include recording a video of the patient through the augmented reality device and sharing that video with the remote practitioner. The augmented reality device may be attached to or included as part of an automated or user-guided device, such as a probe, a robot, an automaton, etc. The automated or user-guided device may be capable of analyzing a symptom exhibited by the patient and identifying a condition based on the exhibited symptom.

XII. Audio Analysis, Translation, and Diagnostic Assistance

Some embodiments relate to a voice recognition system used to translate speech between patients and practitioners in order to facilitate communication. Some embodiments relate to a system used to analyze speech in a practitioner and patient environment to assist in diagnosis and verify plausibility of identified diagnoses. In some embodiments, the system is connected to a database of symptoms, diagnoses, and treatment options. As the user and patient speak, their speech is analyzed to identify symptoms and other relevant data. The data is processed, and a ranked or unranked list of possible diagnoses is presented. The diagnoses also include treatment options, such as medications and surgeries, for each particular diagnosis. When multiple diagnoses are possible, a list is provided to identify symptoms and signs that could distinguish the conditions. The user can then optionally gather more information from the patient to refine the diagnoses. Some embodiments can also optionally provide information for referrals to specialists.

In some embodiments, a method comprises capturing speech from a patient, extracting at least one characteristic from the captured speech, comparing the at least one characteristic from the captured speech to a reference, and based on the comparison, providing at least one candidate diagnosis. For example, the at least one candidate diagnosis may include first and second candidate diagnoses that are provided in an order to indicate their respective likelihoods. The method may optionally also include providing at least one treatment option corresponding to the at least one candidate diagnosis. The method may optionally also include providing additional information (e.g., an instruction, a referral to a specialist, etc.) based on the at least one candidate diagnosis.

XIII. High Resolution Imaging Device

Some embodiments relate to a method and apparatus for capturing images. Images are captured using photodiodes coupled to an object (e.g., a sphere, a cuboid, a half-dome, a strip, etc.). The object rotates at a rapid rate, changing which photodiodes are able to capture an image through the forward-facing aperture at any given time. The photodiodes are slightly offset in position surrounding the object (i.e., in their placements on the object). Due to the offset in position of the photodiodes, and the speed of rotation, a very high-resolution image is able to be composited. A colour filter used to filter light into the photodiodes rotates so that each photodiode alternates between the different colours being filtered, such as red, green, and blue. Photodiodes used can be sensitive to any wavelength of electromagnetic radiation, including but not limited to infrared, infrared, ultraviolet, and x-ray spectrums.

Figure 4:
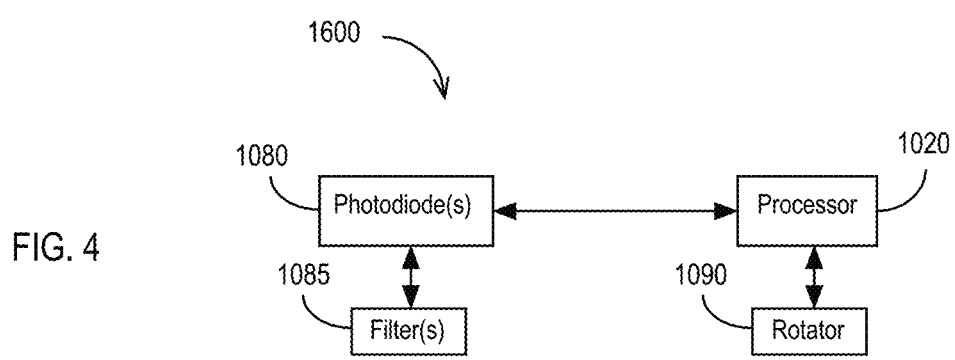
FIG. 4 is a block diagram of a system in which a processor causes a rotator to rotate an object in accordance with some embodiments.

FIG. 4 illustrates a system 1600 in which a processor 1020 causes a rotator 1090 to rotate an object as described above. The processor 1020 is also coupled to the photodiodes 1080, which are coupled to at least one filter 1085. The filter 1085 is a color filter used to filter light into the photodiodes 1080 as they rotate so that each photodiode 1080 alternates between the different colors being filtered, such as red, green, and blue. The photodiodes 1080 can be sensitive to any wavelength of electromagnetic radiation, including, but not limited to, infrared, infrared, ultraviolet, and x-ray spectrums.

In some embodiments, an imaging apparatus comprises an object (e.g., a geometric object such as a sphere, a half dome, a strip, etc.) that has a plurality of photodiodes attached to its outer surface, means for rotating the object (e.g., a motor), and a processor for constructing an image based on signals generated by the plurality of photodiodes. The imaging apparatus may also include at least one filter coupled to and disposed between the photodiodes and the processor, the at least one filter for filtering the signals generated by the photodiodes.

XIV. Visual AR/VR Medical Overlay
Surgical Overlay

One embodiment relates to a method for displaying surgical targets and other pertinent medical and/or anatomical data in an augmented or virtual reality surgical environment. When performing a surgery, there exists a target location and/or anatomical part of the patient. By displaying a three-dimensional rendered image, the efficacy of the surgery can be increased, while reducing patient morbidity and mortality. The practitioner can optionally control the rendered image as described below.

In augmented reality, the rendered image is seen by the user or users as a three-dimensional model of the patient's morphology overlaid atop the physical patient. In the case of virtual reality, the patient morphology becomes the three-dimensional model for the patient, and is treated as the patient for the intended applications of some embodiments. In a projection environment, the rendered image data is projected onto the subject using a projector or projectors mounted with a view of the patient. Multiple projectors are used to prevent the user or users from interrupting the image, as well as to allow for a three-dimensional image to be presented.

The system is minimally comprised of a display device, the medical overlay software, patient morphology data, and a camera. In this minimal embodiment, the display device shows the image from the camera, and the software interprets the image and places the patient morphological data in the correct location. Using the image from the camera, the software updates the rendered image as described below.

Figure 5:
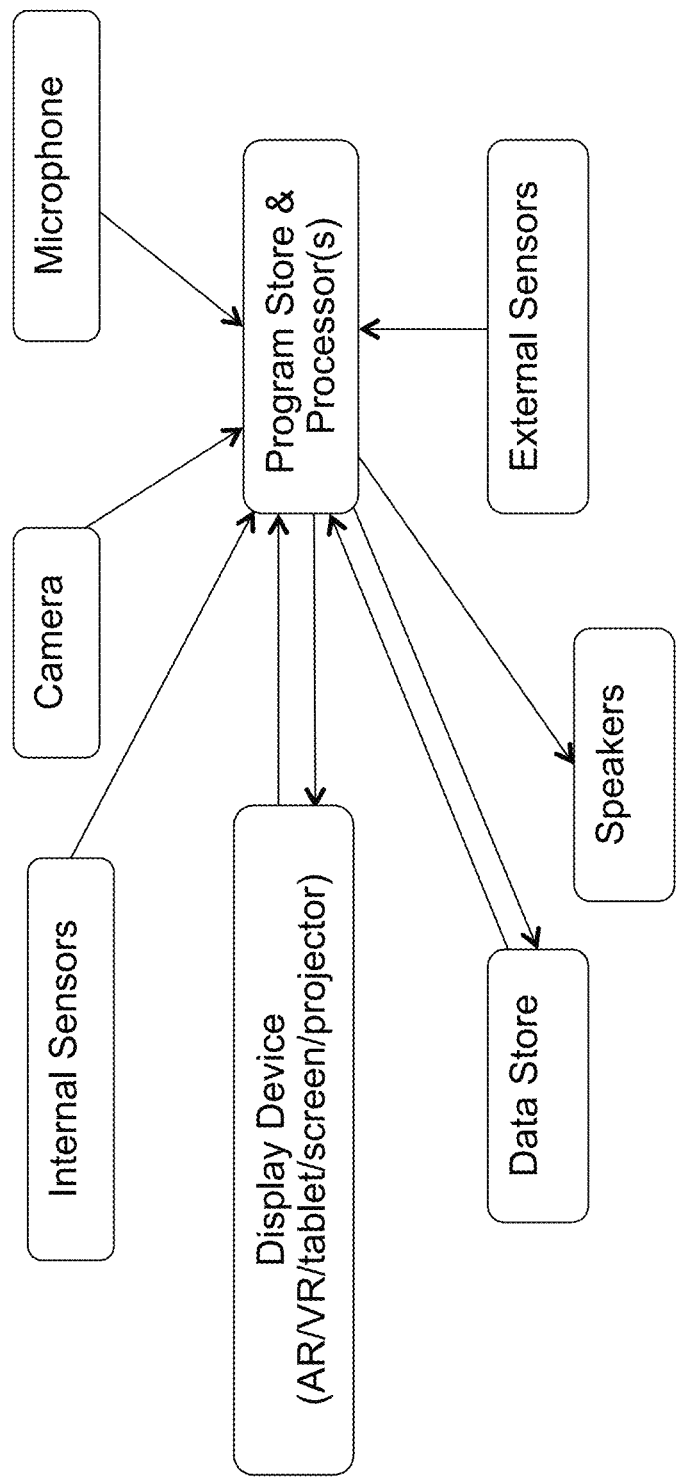
FIG. 5 illustrates an exemplary surgical overlay system diagram.

In another embodiment [FIG. 5], the system is comprised of a pair of augmented reality glasses, tablet, display screen, virtual reality glasses or head-mounted display, sensors for tracking movement of the AR or VR device, the medical overlay software, a camera, an audio capture device, sensors for positional tracking of specific objects such as scalpels, hands or other instruments, optionally speakers, and/or a data store for the patient morphology, which can be either pre-loaded onto the device or transferred by network on demand. A projector can be used in place of the AR or VR display. When the system is initialized [FIG. 6, 101], the user first selects the procedure to be performed. The list of selectable procedures comes from a database of currently prepared patient procedures. The data retrieved from the database is herein referenced as "procedural data," which can include, but is not limited to, the patient morphological data, patient information, procedural instructions, procedure time/date, and/or procedure location. The procedural data is then loaded from the database and stored in the program store being used for the execution of the system [FIG. 6, 102]. This can be, but is not limited to, random access memory (RAM), a solid state drive (SSD), a secure digital card (SD card), and/or a hard disk drive (HDD) accessible to the system.

Figure 6:
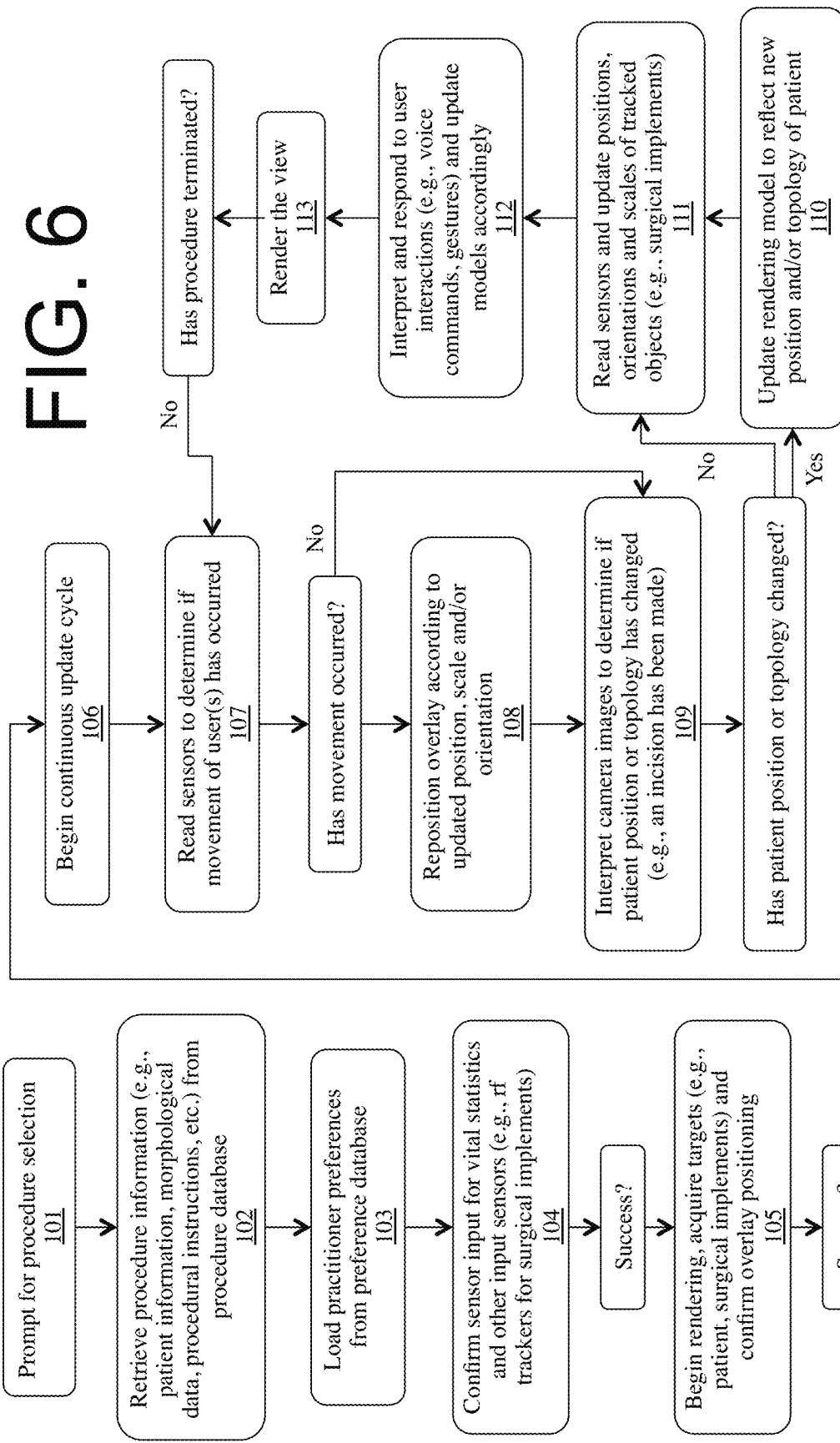
FIG. 6 illustrates the surgical overlay program flow in accordance with some embodiments.

Optionally, the preferences of the current user or users are then retrieved from a database of user preferences [FIG. 6, 103]. The preferences loaded are herein referred to as "practitioner preferences" and can include, but are not limited to, display brightness, HUD transparency, HUD element location preferences, audio volume, and/or preferred input method.

The system is then connected to sensor inputs to be monitored and/or tracked during execution. These sensors can be, but are not limited to, pulse monitors, blood pressure monitors, oxygen saturation monitors, and/or wireless sensor such as, but not limited to, RF positional indicators. Sensor inputs are then verified to ensure that they are being correctly read [FIG. 6, 104]. The system displays to the user(s) the currently read value from each sensor in turn, and the user(s) then confirm that the value is correct. System execution is halted if the verification fails, unless user(s) specifically override the verification process. Following verification, visual targets are then acquired by the system, the patient identity is confirmed, and the rendered image position, orientation, and/or scale are verified [FIG. 6, 105].

In order to visually track surgical instruments and other objects in the augmented reality space, the user can hold the instrument in a location visible to the camera and request that the software identify the instrument. Through user interaction it is determined whether the software has correctly identified the implement. When the user is satisfied that the implement is being correctly identified, they then indicate through a command—vocal or other user interface method—to track the identified instrument. Alternatively, or in addition, a tracking marker can be attached to the instrument to be tracked and shown to the camera, then indicated to the software through a user interface to begin tracking the marker. Alternatively or additionally, one or more RF-based tracking elements may be attached to or built into the instrument and engaged (e.g., Bluetooth pairing or other one-way or two-way communication link), at which point the software will begin tracking the tracking element(s).

Confirmation of the patient is done in two ways. Firstly, the patient's information is encoded in the morphology data. The user compares the information in the morphology to the information associated with the patient, whether on a hospital bracelet, clipboard, and/or other standard method of identifying patients. The morphology will also match only the correct patient, and therefore the rendered image will appear only when the correct patient is visible to the system.

The rendered image as a whole is anchored to the location of the patient. Herein, rendered image anchoring refers to positioning features of the rendered image, such as, but not limited to, detected features and/or perimeter location, and thus the rendered image as a whole such that the rendered image features are fixed in position relative to the positioning features. Feature detection, perimeter detection, and/or point cloud mapping are used in conjunction to determine an accurate three-dimensional location, scale and orientation of the patient. These metrics are updated continuously as the program executes, to ensure that the rendered image is always anchored correctly. Markers can also be used, such as surgical tattoos or other visual markers, to ensure the correct anchoring of the morphological model.

Prior to commencing the procedure, the user or users do a walk around of the patient to ensure that the rendered image is properly sized and aligned to the patient. If the alignment is incorrect, the user(s) can correct the alignment using any method of user input available on the device.

The three-dimensional rendered image is rendered on the device, which in the case of AR glasses may be a transparent screen embedded in the glasses themselves. In the case of virtual reality, the rendered image may be rendered on the non-transparent VR display. In the case of a projection system, the rendered image may be projected onto the patient from any number of projectors mounted for that purpose. Multiple projectors allow the projection to be unobstructed by movement of the user or users.

During the procedure, the rendered image is continually updated to display the current morphology of the patient [FIG. 6, 106]. As a surgeon makes incisions and opens portions of anatomy, the rendered image is updated in real time to present a progressively deeper view and rendered image with respect to the patient morphology. This depth-tracking operation of the display can also be overridden by the user or users using gestures, voice commands or any other form of user input. The user(s) are also able to individually select and manipulate portions of the displayed morphology, such as removing an organ from the model to view behind or below the organ or to view the organ from various perspectives and proximities (orbiting, panning, zooming). For example, the user(s) can also rotate and reorient the portion that has been removed to see it from different angles, as well as adjusting the display depth to see inside the segment. All of these viewing controls may be effected through user input such as gestures, voice commands, swipes, taps, mouse motion, keyboard control, etc. The user(s) are also able to zoom in on the model in any portion, whether it be a portion that has been removed from the primary morphology or a portion of the primary morphology or all of the morphology itself.

Relative movement between the patient and system user(s)—and thus actual or perceived movement of the markers used to anchor the rendered image—may be detected in several ways [FIG. 6, 107]. One such method is the frame offset method described below. Supplementary information is also provided using the positional sensors in the augmented or virtual reality device (e.g., in the AR/VR goggles, display-shield or other rendering device). In the case of a projection system, the projector is in a fixed position and therefore supplementary information is unavailable. As the user moves, his or her location in three-dimensional space is updated in the software, which in turn updates the visible rendered image model or virtual model [FIG. 6, 108]. The model is also adjusted based on positional changes in the patient [FIG. 6, 109]. Transformation of the location, orientation, and/or scale of the morphological data is done using quaternion and/or matrix operations to transform, translate, and/or rotate the points in the data set [FIG. 6, 110]. As the patient moves, the morphological data is transformed to match the adjusted positions of the patient, as explained in an example below.

The positions of any tracked objects are then determined in three-dimensional space, and their locations for the purpose of the rendering image are updated and stored [FIG. 6, 111]. User input, as described above, is then processed [FIG. 6, 112]. Once input has been processed and the rendered image has been updated, the view is rendered [FIG. 6, 113]. While using a surgical overlay, audio, and/or visual cues are given to the surgeon if they are approaching an area that has either been noted as an area to avoid or use caution. For example, if a surgeon is performing surgery on the intestinal tract and the scalpel is getting close to the patient's bowel, a visual and/or auditory proximity warning may be rendered to inform the surgeon that they have come too close. The warning could, for example, be a red area displayed in augmented reality. A recorded warning or warning sound could also be played.

Anatomical Overlay

Another embodiment also relates to a method and apparatus for providing an anatomical display in virtual reality, augmented reality or other immersive environment. Anatomical diagrams, anatomical models, and cadaver dissection are the de facto standard for teaching anatomy to medical students. By providing anatomical data in an immersive environment, anatomy can be learned in three dimensions. This anatomical model can also include notes to be displayed to the user or users. The model is not limited to humans, and can also be used for veterinary purposes using anatomical models of animals and other living organisms. The model can also be interacted with by the user or users, allowing for dissection and manipulation of individual components of the model. Selection of specific parts of the model can be made by any method of user input, including but not limited to voice, gesture, and/or device input. More details of a selected model can be made available to the user(s) visually or aurally.

In augmented or virtual reality, three-dimensional anatomical models are displayed in a location where no actual model exists. In augmented reality, the model can optionally be overlaid over a marker or other positional indicator, or even at a fixed location relative to the user or users that may contain physical objects. The model is presented in three dimensions, and the display of the model can also be manipulated as outlined below.

An anatomical model is displayed in augmented reality using a system comprising an augmented reality device such as a tablet, glasses, projector(s), or other display medium; a camera; sensors for tracking positional movement of the camera and/or user(s); optionally speakers and/or an audio capture device for audio feedback and input, respectively; and a data store for the patient morphology, which can be either pre-loaded onto the device or transferred by network on demand.

Annotations are also optionally displayed to the user or users, along with the ability to open detailed descriptions of individual anatomical components. While examining or dissecting the anatomical model, the user or users are able to manipulate anatomical components and move them away from the main model, examining them in detail in three dimensions. The user or users are also able to zoom in on particular sections or on the entire model to have a closer look. The user or users are also able to rotate and reorient the model, as well as individual sections of the model.

Users are able to dissect the virtual anatomical model using user input controls. The model can also be dissected using surgical instruments, either real or virtual. Virtual instruments are pre-created and instantiated within the immersive environment using any common user input method. Real instruments can be tracked and used as described above. As the user or users dissect the virtual model they see each individual component of anatomy, and are able to dissect the individual components. Users are also able to reverse their actions using any method of user input to undo their actions sequentially. The model can also be reset to the original position at any time using a command issued by user input.

The user or users are able to move around the virtual model in three dimensions. The model is fixed to a point in three-dimensional space, selected when the model is first initialized. The model can be moved from this space with user interaction, but is otherwise anchored in place. The location is determined using a combination of the frame offset methodology described below, as well as positional information given by the device and/or camera. In augmented reality, the user or users are able to navigate around the model by moving their body in relation to the virtual model. In virtual reality, the user or users are able to move through the immersive environment using commands issued by user input, in conjunction with head tracking and any other available positional tracking information.

Laparoscopic Overlay

Another embodiment relates to a method and apparatus for providing a visual display of laparoscopic information in virtual reality, augmented reality, or other immersive environment.

Laparoscopic procedures involve a surgical camera (laparoscope) and surgical tools. By displaying radiological images overlaid over a patient in augmented or virtual reality, surgical targets, such as cancerous growths, can be more accurately targeted and located by a practitioner. The location of the laparoscope and surgical tools can also be displayed. The historical location of the laparoscope and surgical tools can also be shown as path data. A practitioner could also take notes, either vocally or using pre-determined commands, gestures or other pre-determined user interface options.

In a laparoscopic surgery, the surgeon is unable to see the actual location of the laparoscopic devices. The augmented reality device displays the current location of the laparoscopic heads, the historical locations (path) of the laparoscopic heads, and/or a HUD [see below] that displays the laparoscopic camera view. The device also displays (optionally) morphological data as explained above.

Figure 7:
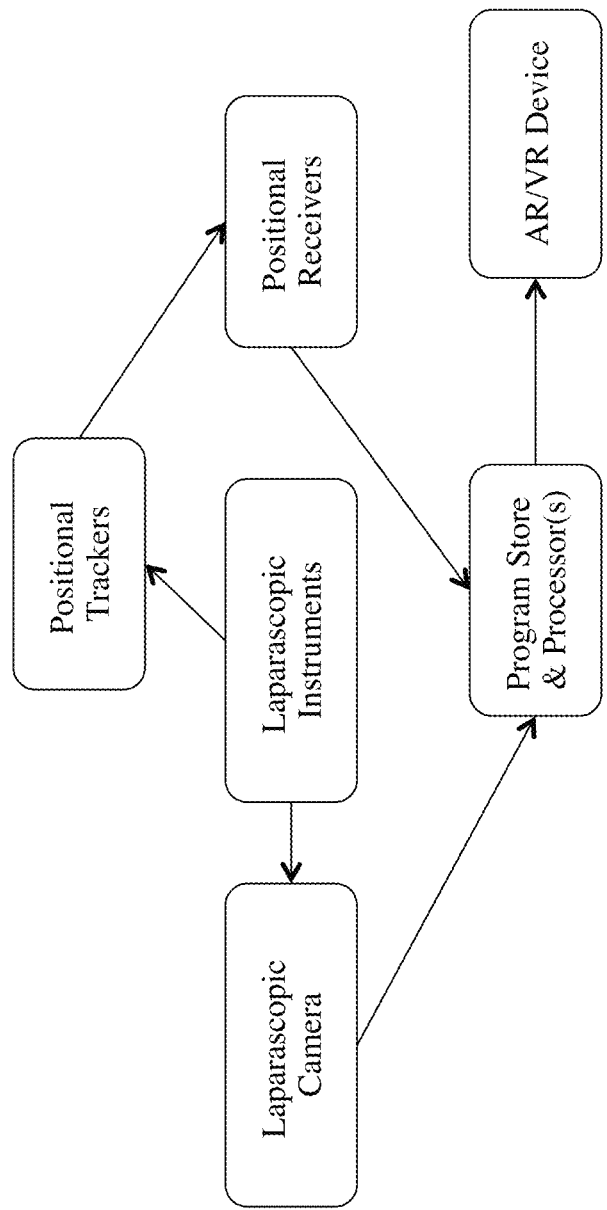
FIG. 7 illustrates an exemplary laparoscopic system.

The laparoscopic overlay [FIG. 7] is comprised of a laparoscopic surgical setup, augmented reality or virtual reality device (including camera and positional tracking), software, positional trackers, positional receivers and an interface between the receiver and augmented reality device. The positional trackers are paired with the receiver(s), and attached to the ends of the laparoscopic instruments. The receivers are connected, preferably wirelessly, to the augmented reality device. The laparoscopic camera is connected (preferably wirelessly) to the augmented reality device.

Figure 8:
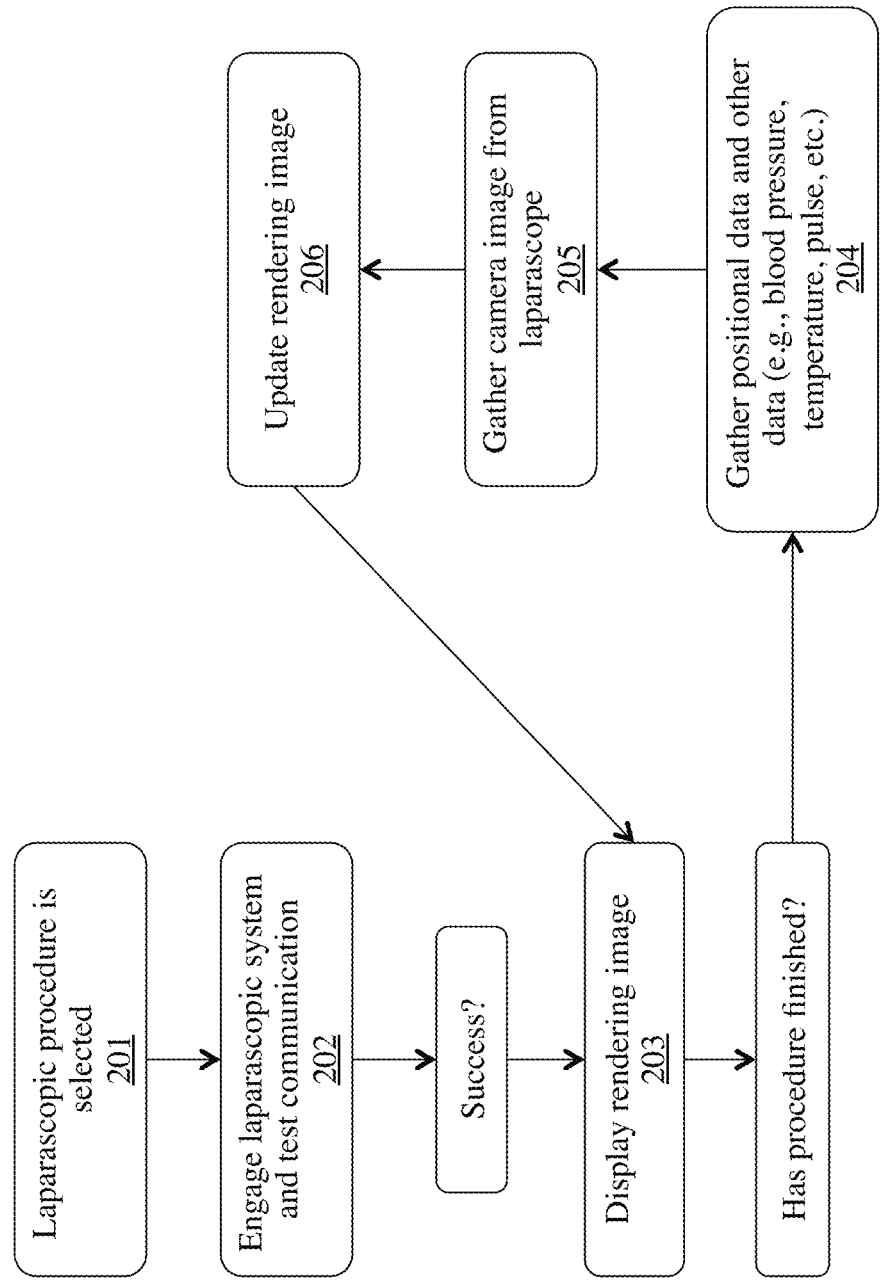
FIG. 8 illustrates the laparoscopic program flow in accordance with some embodiments.

When the laparoscopic procedure has started, the system is engaged [FIG. 8, 201]. The transmitters are then tested to verify that communications are correct between the transmitters, receivers and software [FIG. 8, 202]. A rendering image is then displayed showing the initial positions of the transmitters, as well as the initial camera view from the laparoscope [FIG. 8, 203].

The positions of the laparoscopic heads are transmitted at regular intervals, as quickly as the slowest component in the system is able to handle [FIG. 8, 204]. In order to maintain accurate and current positional locations for the trackers, the tracker and receiver operate at as rapid of a frequency as they are able. The augmented reality device then requests from the receiver an updated position as often as it is able to display it. Only the most recent positional data is returned to the augmented reality device for display. The image from the laparoscopic camera is also requested [FIG. 8, 205].

The rendering image is updated using the current and historical positions of the laparascope trackers, as well as the camera image [FIG. 8, 206]. The current positions are displayed to the user or users in augmented reality, as well as the historical positions. This allows the user(s) to see both the current location and the track taken to arrive at the current location. The camera view is also displayed in a HUD (see below). This process repeats [FIG. 8, 202] until the procedure has finished.

For example, laser eye resurfacing is a process of improving a patient's vision by resurfacing the cornea of an eye to more accurately focus light on the patient's retina.

Another embodiment is comprised of an augmented reality display, camera or other imaging device, laser, and/or a cutting tool [laser, mechanical, etc.]. The surface of the cornea is scanned, and a model is created in AR. This AR model is used to assist in guiding the surgeon while using a laser to alter the surface of the cornea. The AR model is displayed either as an overlay over the actual cornea, or as a display in a HUD (see below).

Real-Time/Heads-Up Display

During medical procedures, patient vital statistics, imaging, and other patient data are often required for consultation. A real-time updating display of the aforementioned data allows a practitioner to focus on the patient or task at hand without having to consult devices or paper sources to monitor or retrieve information. A range can also be set to trigger an alarm should a vital leave the acceptable range.

For example, a surgeon performing an appendectomy with a HUD could have a display of patient vital statistics shown in augmented reality, allowing the surgeon to focus on the surgical procedure without having to look away in order to ensure that the patient's blood pressure remained stable.

The HUD is comprised of an AR device or other display medium and source inputs, such as vital signs monitors. The HUD is configured automatically, in advance, or by user interaction to select the type of source data to be displayed. The data is then displayed in a location determined automatically, in advance, or by user interaction. The transparency (alpha channel value) of the HUD elements can also be adjusted to allow for better visibility of the HUD item or underlying detail.

Once the source inputs have been connected to the HUD, the values are read at regular intervals and the HUD elements are updated with the new values.

Another embodiment relates to a method and apparatus for displaying a HUD composed of two and/or three-dimensional images superimposed on the environment.

A HUD can be used for a large variety of purposes. In an immersive environment, a HUD gives a viewer consistent information that remains visible regardless of the viewing context. This data can be configured to show different information based on pre-set conditions, user preferences, environmental factors, and/or contextual data.

For example, a doctor seeing patients could have a HUD displaying patient information triggered by facial recognition of the patients. Additionally, for each patient, the doctor could configure which data would be most valuable to see, and have that specific data displayed in the HUD either for a single visit or on a long-term basis.

Various embodiments disclosed herein relate to a method for providing an augmented or virtual reality surgical overlay, comprised of elements including, but not limited to, HUD, medical imaging display, vital statistics display, patient information display, procedural information and other data.

The HUD is created using two or three-dimensional images or models, with adaptive portions related to the data to be displayed. In the case of vital statistics, the data is streamed from a medical device connected to the subject. The data is then fed into the software where it's interpreted based on the information to be displayed, and displayed as appropriate. For a patient's 02 saturation, for example, the raw data expressed as a percentage can be converted to an integral percentage number for display in the HUD.

In another embodiment, the HUD can be replaced with another viewing medium such as, but not limited to, an LCD or CRT screen. This view does not necessarily, but may, include an immersive environment.

Figure 9:
FIG. 9 illustrates an exemplary head-up display (HUD) with two- and three-dimensional elements in accordance with some embodiments.

FIG. 9 shows a sample HUD configuration. The four vital signs being monitored, temperature, oxygen saturation, pulse rate and blood pressure are shown in the top left, top right, bottom left, and bottom right corners respectively. These displays are transparent and are in fixed positions such that as the user or users turn their heads, the vital signs remain in a constant position relative to the camera.

Similarly, medical images in formats recognized by the software, including, but not limited to, DICOM, JPEG, png, bitmap, raw, and other similar formats, can be overlaid as a part of the HUD to allow the practitioner to see them in an immersive environment at all times.

Patient information and vital statistics can also be displayed in a similar manner, having been loaded from a medical database or other pre-existing source. Data can also be manually entered.

Procedural directions and information are also available from pre-created sources. These procedures and methods can be stepped through using various forms of user interaction such as voice control, gesture control or other control method.

Figure 10:
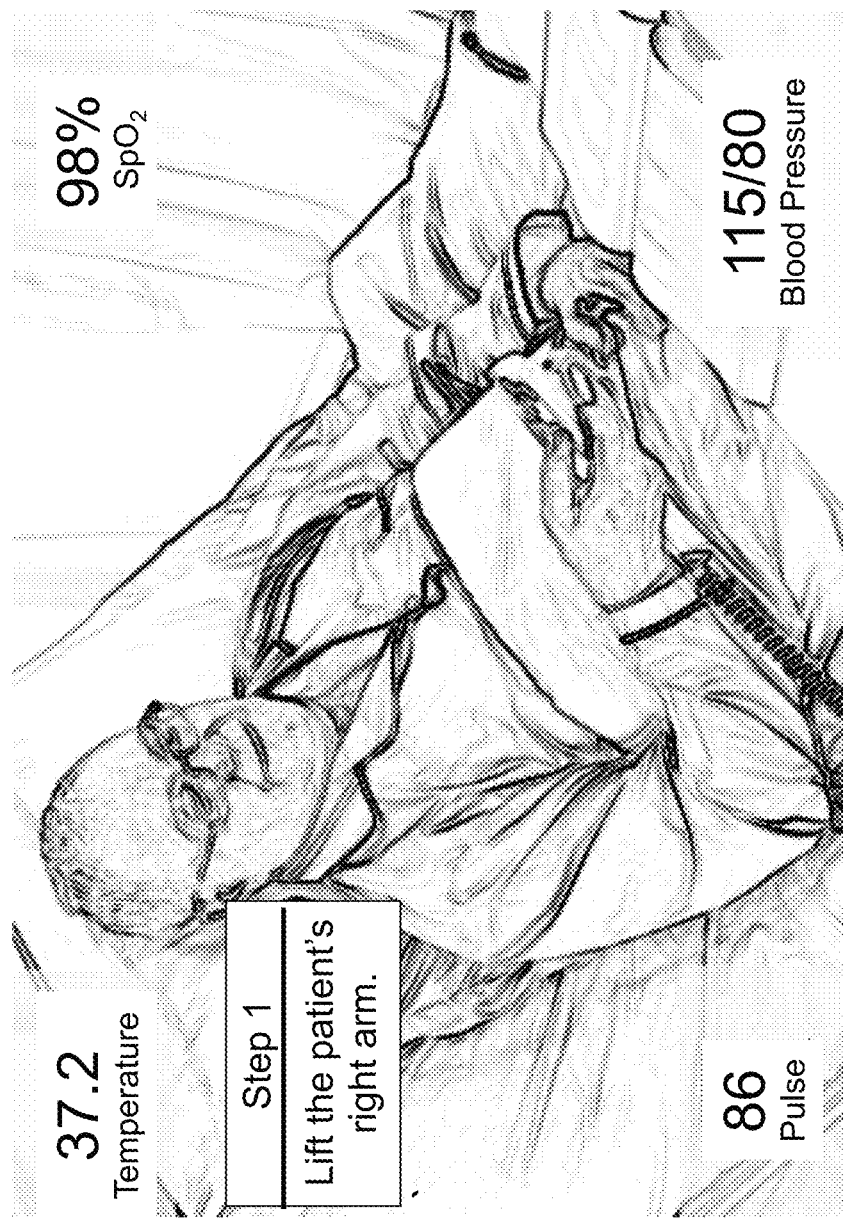
FIG. 10 illustrates concurrent HUD display of an exemplary image and procedural step in accordance with some embodiments.

FIG. 10 shows a HUD identical to FIG. 9, however on the left below the temperature stats a guide can be shown giving instructions to the user on how to perform a procedure. As each step is completed, the guide is updated either automatically or with user interaction.

Another embodiment relates to a method for displaying surgical targets and other pertinent medical and/or anatomical data in an augmented or virtual reality environment.

The target area can be selected through a three-dimensional immersive environment. Target areas can also be selected by a practitioner on a patient using an overlay. Target areas can also be selected using a pen, finger or other positional device. The targets can also be displayed on a conventional display, such as but not limited to, an LCD or CRT screen. Positional tracking information sent from a surgical implement or other tracking method can be used to identify to the practitioner where the implement or tracker is relative to the targeted location on the CRT screen.

Figure 11:
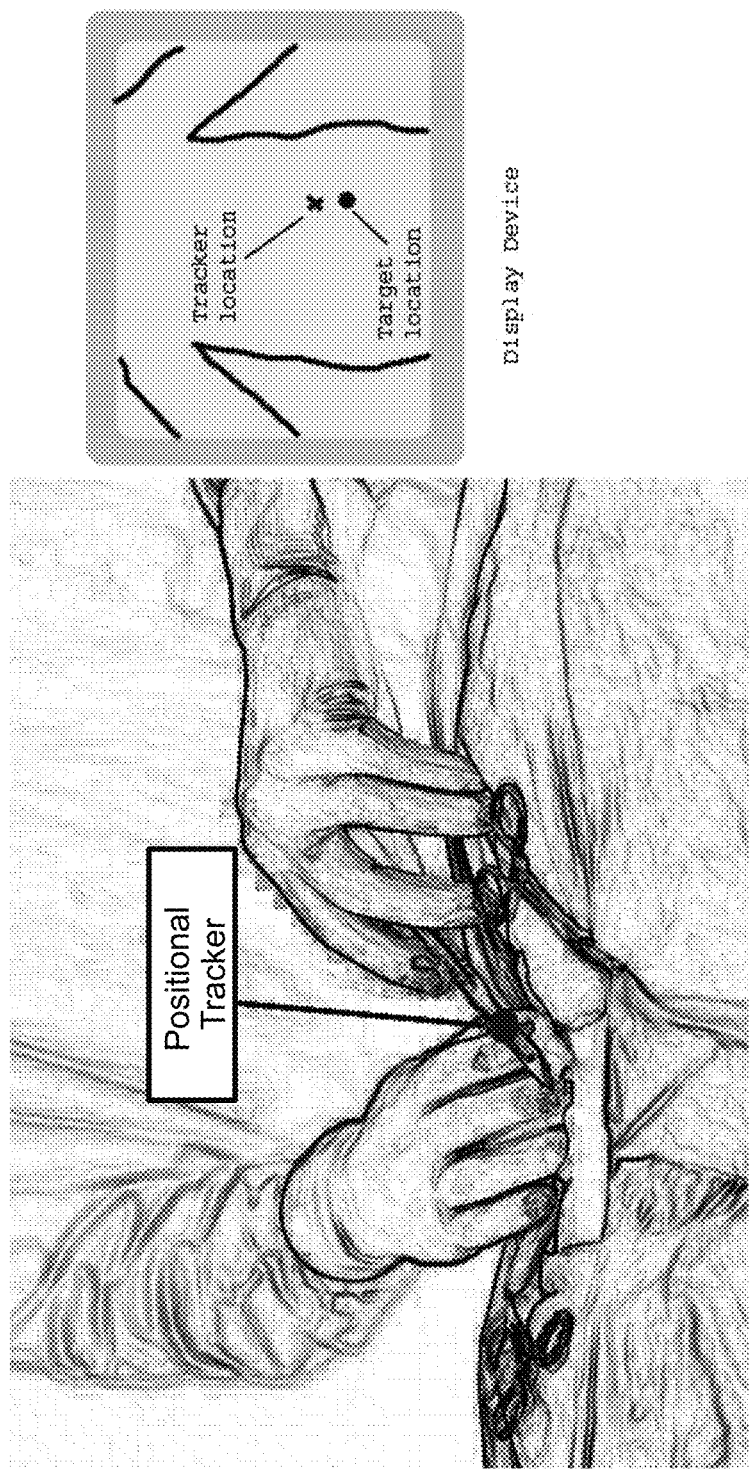
FIG. 11 illustrates an example of a doctor using a scalpel with a tracker and a monitor in accordance with some embodiments.

FIG. 11 shows a scalpel equipped with a positional tracker (left) being used by a surgeon. On the right, a display device is shown with a mock up of a patient's morphology. The X on the display device represents the current location of the scalpel, while the circle represents the surgical target location. By looking at the display device, the surgeon can determine when they've reached the correct location to begin their incision.

For example, a surgeon reviews an MR image of a patient's abdomen. The target location for an abdominal surgery is identified from the image. Using a diagram of the patient, the surgeon marks the target area. During surgery, the diagram is displayed on a monitor next to the patient. A positional tracker attached to a scalpel displays the position of the scalpel relative to the patient on the monitor as well. When the position of the scalpel matches the position of the target, the surgeon is able to see on the monitor that the positions are the same. This indicates to the surgeon that the right location has been found to begin the surgery.

In another example, a surgeon performing surgery to remove a tumor on a patient's heart can separate the patient's heart from the body in augmented reality, move the heart away from the patient, and inspect the heart and associated tumor in three-dimensional space. This allows the surgeon to better assess the location of the tumor, as well as to plan the best route of access for its removal. This will allow for more surgical accuracy tailored to individuals. This view can also be shared via network with other users for consultation or other uses.

In another example, an instructor uses a positional tracker attached to a pen or other implement to test students' knowledge. The instructor has previously identified a target for a surgical procedure, and the students are asked to locate the target using the implement. The instructor, wearing a pair of augmented reality glasses, can view the proximity of the students' answer to the actual target. In another version of this example, the student could be shown a radiological image and asked to identify the correct target location from the image.

In another example, a physiotherapist uses morphological images to display a spinal injury. Using this overlay, the physiotherapist is able to accurately assist the patient without causing further injury or damage to the spine.

In another example, a patient bends their right arm during a procedure for which a rendered image is used. The morphological source data is then updated to reflect the new position of the bent arm. The camera image is analyzed to determine the direction and degree of the bend in the arm at various points. Using this direction and degree, the morphological data is updated to reflect new positions for each point that has moved using standard quaternion and/or matrix based transformation methods.

Another embodiment relates to a method for providing an augmented or virtual reality surgical overlay for laparoscopic procedures, comprised of elements including, but not limited to, mapping of laparoscopic device path, display of laparoscopic device position, display of laparoscopic imaging data, and/or system for taking notes generally and related to specific points.

Laparoscopes are currently equipped with a camera for viewing the inside of a patient or other area in order to perform surgery non-invasively. By mounting a transmitter on the end of the laparoscope, and used in conjunction with a receiver connected to software, the location and historical path of the laparoscope can be tracked and displayed in an immersive environment. The transmitter can be using any frequency allowable within a surgical environment, such as, but not limited to, RF, Bluetooth, or Wi-Fi.

The data from the camera can also be read and displayed in real time in an immersive environment, either as a primary display or a HUD. Having a display in view during the entire procedure allows for reduced morbidity and mortality during the procedure.

Figure 12:
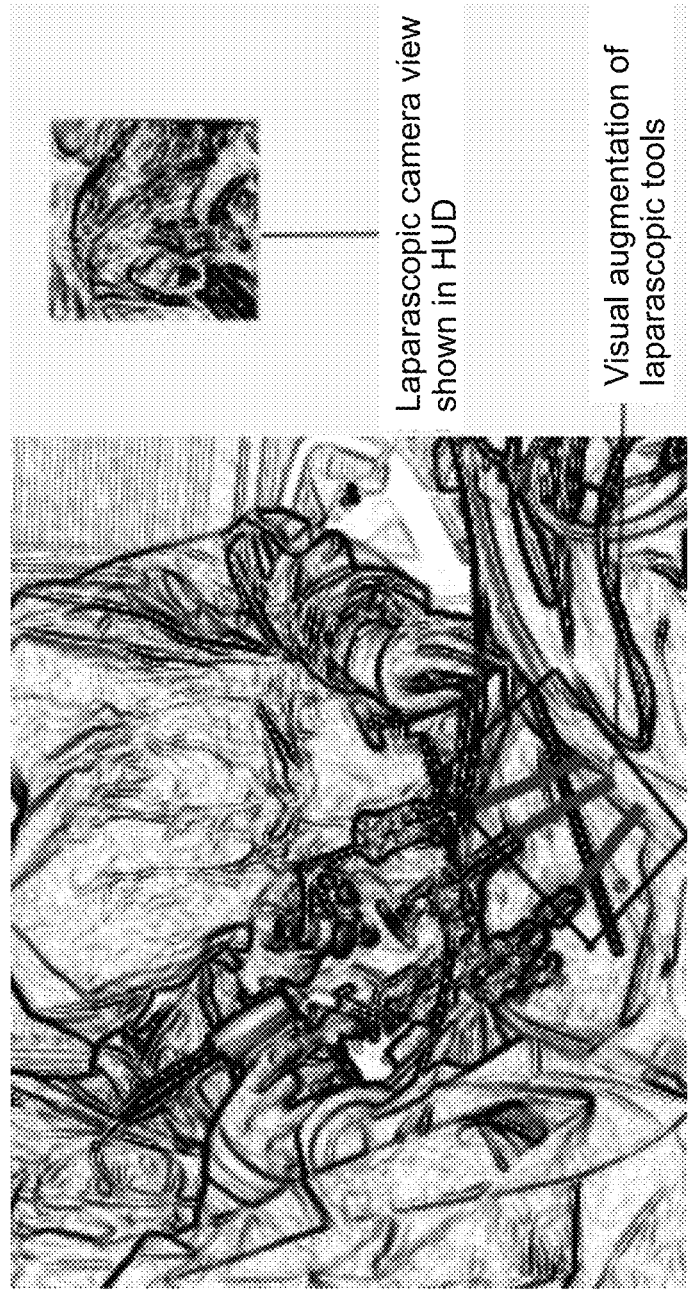
FIG. 12 illustrates an exemplary laparoscope path display and HUD camera.

FIG. 12 shows a laparoscopic procedure in progress. On the left the augmented reality paths and tips of the laparoscopic instruments can be seen. On the right the camera view from the laparoscope is shown, which would be visible in the HUD of the surgeon or other user.

Additionally, the practitioner can make notes using a user interface comprised of voice recognition, gesture recognition, and/or other forms of inputs. A practitioner can use a predetermined gesture to identify the location where they would like to annotate. Once the gesture has been recognized, they can then speak the note they wish to take, which will be interpreted by well-known methods of voice recognition and converted to text to be displayed in the HUD. These notes are also recorded for future reference.

For example, when planning for an appendectomy, a surgeon reviews the patient's model. While inspecting the model and planning a route for the surgery, the surgeon notices that the patient has a postilieal appendix. Due to the position of the appendix, the surgeon makes a note on the model to be cautious of the ileum, with the hope of reducing the risk of accidental damage to the ileum.

For example, in laparoscopic cholecystectomy (surgical removal of the gall bladder), a laparoscope is used to locate the gall bladder for removal. The display from the laparoscope is traditionally shown on a screen next to the surgical area, and the surgeon is unable to see the laparoscope's location or path. Further, the surgeon is unable to focus on the laparoscope output while looking at the patient. Using augmented reality, the laparoscope position and its path through the patient's body can be displayed directly on the patient's body. The camera view from the laparoscope can also be shown in the HUD, allowing the surgeon to see both the patient and the camera simultaneously.

Another embodiment relates to a method for displaying a HUD in augmented or virtual reality composed of two or three-dimensional images superimposed on or integrated into the environment being viewed.

A HUD is used to display data to a user in an immersive environment. The elements of the HUD can be either fixed positionally to the view of the user, to locations in the real or immersive environment, or a combination of both. For example, in displaying patient data to a user, some elements of the HUD could be fixed to the location of the patient (such as heart rate, blood pressure), while other elements could be fixed to the view of the practitioner, such as radiological images, patient information, or procedural notes.

Figure 13:
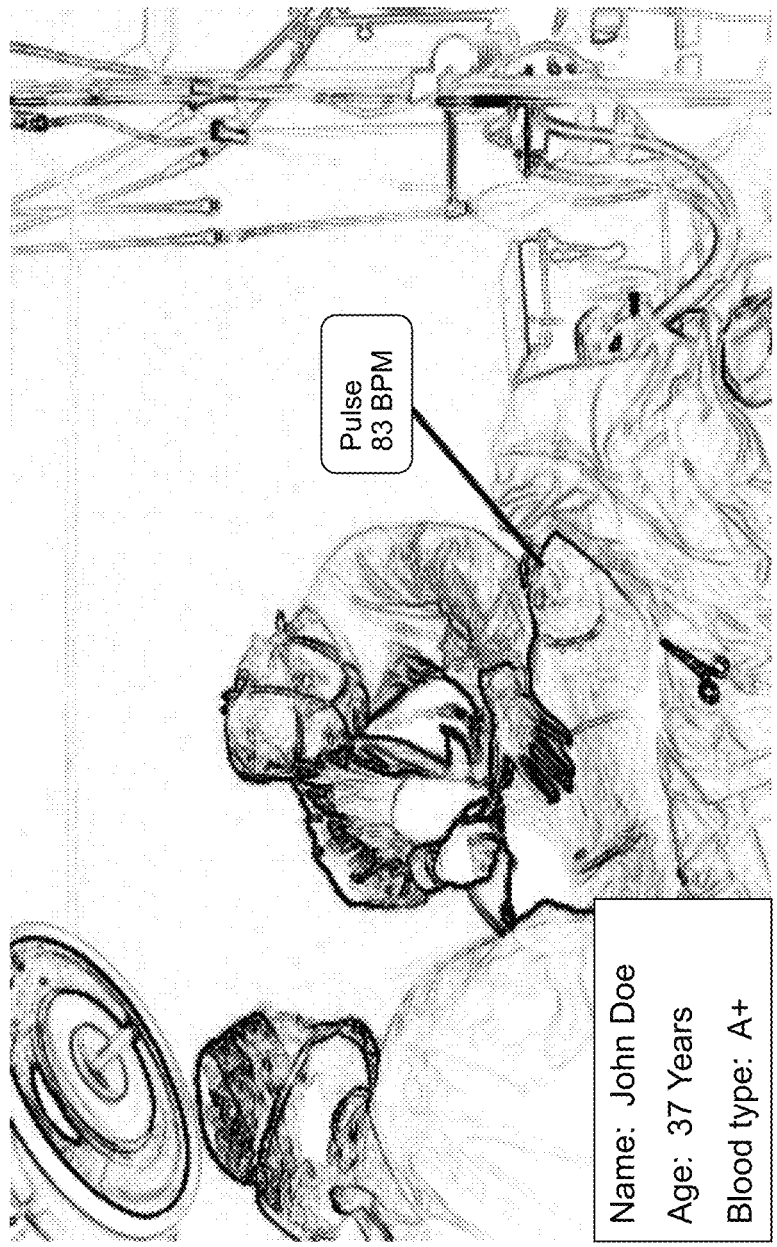
FIG. 13 illustrates exemplary HUD elements attached to a patient and an exemplary view presented in the HUD.

FIG. 13 shows two separate HUD elements. One, a pulse rate for the patient, is anchored to the patient's location and remains in the same place in three-dimensional space as the user moves about. The second, which includes the patient's name, age and blood type, is fixed to the bottom left corner of the view.

For example, a doctor doing rounds between hospital rooms can have a HUD for display of patient vital signs. As the doctor passes from one patient room to another, the HUD updates with the patient the doctor is currently visiting.

In another example, during anaesthesia, a patient must be monitored constantly to ensure that their vital signs remain stable and in an acceptable range. Using an augmented reality device connected to vital sign monitors, the person monitoring the patient can keep the vital signs in view at all times using an augmented HUD. This allows the monitor to perform other tasks while continuing to monitor the patient under anesthetic. Multiple patient vital signs can also be connected to a single augmented reality device, allowing a single monitor to watch over multiple patients under anesthetic.

In another embodiment, first responders (e.g., EMT) can use an immersive environment device programmed with early life saving processes. A patient's vitals can be streamed to the device, and based on symptoms a protocol is initiated to provide step by step life saving steps to the first responder.

In another embodiment, a nurse or resident on call has an immersive environment device connected to patients' emergency buttons. When the emergency button is pressed, the patient's vitals and location are connected to the device. The device can also be connected to the physician in charge of the patient, who may be present in hospital or on call. The nurse, resident or physician can then communicate with the patient and each other to determine the correct steps to ensure the safety of the patient.

For example, a nurse watching a ward floor at night is at a desk outside the patients' rooms. A HUD displayed in augmented reality is shown to the nurse while filling out paperwork. A patient presses the emergency button. The vitals for the patient are immediately displayed in the HUD, and the nurse sees that the patient is tachycardic. The patient history in the HUD shows no history of tachycardia or related conditions, so the nurse initiates a call to the doctor on call through the augmented reality device. The doctor, who is at home, is able to view the situation through the camera on the nurse's augmented reality device and walk the nurse through the steps of stabilizing the patient while travelling to the hospital.

Another embodiment relates to a method for using augmented reality in laser eye surgery.

By using an augmented reality overlay in a laser eye surgery procedures, better accuracy can be given to the surgeon. The eye can be scanned and the surgical target overlaid over the eye. This target can also be manipulated as described below, including the ability to move it to another location, zoom, rotate, and otherwise manipulate it for closer inspection and note taking.

For example, the cornea of a user can be scanned by high definition camera or other means in a LASIK surgery. The desired shape of the cornea is compared to the scanned cornea's surface. An augmented reality overlay of the differences is shown on the cornea of the subject during resurfacing, with the virtual object being updated as the surgeon reshapes the cornea. This allows the surgeon to be certain of correctly resurfacing all portions of the cornea during the procedure, reducing surgical error.

In another example, the back of a patient's eye is scanned and mapped to find a tear in the retina. A small tear is located and processed into an augmented reality morphology model. This morphological model is superimposed over the patient's eye, showing the practitioner accurately the location of the retinal tear. The tear can then be repaired easily and safely using an argon laser.

Another embodiment relates to a method for analyzing radiological images with a moving patient for diagnostic purposes.

Using radiological images taken at different points of motion can show changes in joint position and possible fluid buildups, for example. This can also be used to diagnose conditions such as arthritis.

XV. AR/VR-Assisted Medical Training/Learning/Simulation/Testing

Another embodiment relates to a method for combining gross anatomy with problem based learning (PBL).

Gross anatomy and PBL are two different methods used in the teaching of anatomy. By combining both methods, an enhanced understanding can be had by the student.

Another embodiment relates to a method and apparatus for providing medical simulations in virtual reality, augmented reality, or other immersive environment.

Medical and diagnostic training is primarily provided through classroom learning, followed by a period of residency where a student learns by seeing real patients. The ability to train in surgical and diagnostic procedures, however, is currently lacking. Using simulations in an immersive environment, a student can receive hands-on practice without risk to patients, and with the ability for an instructor or peer to monitor, grade and assist. Group simulations can also be done, allowing multiple students and/or instructors to view and perform in concert. These simulations can also be used for examination of students in order to determine suitability for practice in the field.

Often in practice, surgeons do not use the most up-to-date methods. Surgical knowledge is typically passed on through schooling and residency. When a surgeon is taught how to perform a particular procedure, they will learn the method used by the instructor. The instructor in turn will be teaching the method they are most familiar with, which may not be a current method. Using augmented or virtual reality as a training mechanism, practitioners can be kept up to date with the latest techniques in performing procedures. Through interactive simulations, a surgeon can train in the most current methods of performing a particular procedure. Software can also be updated regularly to ensure that the most up-to-date methods are available for training, reducing morbidity and mortality in patients.

Another embodiment relates to a method and apparatus for teaching and testing using artificial intelligence coupled with virtual and/or augmented reality.

Using an immersive environment to visually present materials to a student, artificial intelligence algorithms can be applied in order to test whether the material has been learned by the user, and to adjust the rate and style of teaching to match the needs and preferences of the user.

Another embodiment relates to a method and apparatus for using recorded sensor data for training. In some embodiments, recorded sensor data is used in simulations to train users in diagnostic medicine. Sensor data is recorded for specific diagnostic procedures, such as a prostate exam, and replayed during a simulated diagnostic procedure to teach the user or users what a healthy or unhealthy diagnosis feels like. For example, sensor data may be recorded for the feeling of a normal vs. enlarged spleen in the detection of mononucleosis. The recorded data may then be played back during training to allow students to feel the difference between the two states, allowing for better diagnosis in practice. In some embodiments, the recorded data is also compared to new data acquired by sensors, allowing for a diagnosis using the device.

Another embodiment relates to a method and apparatus for first aid training using augmented reality, virtual reality, or another immersive environment.

First aid training is a common form of medical training available to a large portion of the population. Traditional first aid training, however, doesn't allow the user or users to experience real situations in which first aid could be necessary. By using an immersive environment, first aid situations can be simulated, and the user(s) can be given guidance and training in the necessary steps to perform the required aid. The simulation can also be used to evaluate the performance of the user(s) and determine whether they should be deemed competent in taking action in a first aid situation.

Another embodiment includes a method and apparatus for intelligence quotient (IQ) testing using augmented reality, virtual reality, or other immersive environment.

IQ testing is done using a variety of tests involving different aspects of intelligence. These tests can be administered in an immersive environment, and the results evaluated automatically, or with any degree of evaluator interaction. Normally an examiner monitors the subject during the test to evaluate performance. This is frequently a cause of anxiety for the subject being tested, which can lead to less than optimal performance. Using an immersive environment test removes the need for an examiner to monitor the subject.

Another embodiment is a method for teaching students using augmented or virtual reality combined with artificial intelligence.

Another embodiment is a game in which the user or users are instructed which simulated organ to remove from a virtual patient. If the user successfully removes the organ, they receive a point. If they do not, they are rewarded with a sound or other feedback mechanism. Turns are taken by multiple users to reach the highest score and determine a winner.

Another embodiment relates to a method for providing an augmented or virtual reality anatomical display, comprised of elements including, but not limited to, anatomical diagramming and labelling, veterinary anatomy, and dissection simulations.

Anatomical display can be done in augmented or virtual reality using pre-created and optionally annotated models. These models are displayed in three dimensions, and can be interacted with by the user or users. By using voice, gesture and other user controls, the user or users can manipulate individual parts of the body. The user(s) can also specify which layers and portions of the anatomy to be displayed. Individual parts, for example organs, can be separated from the main model for closer inspection and to provide greater detail about the selected feature.

Figure 14:
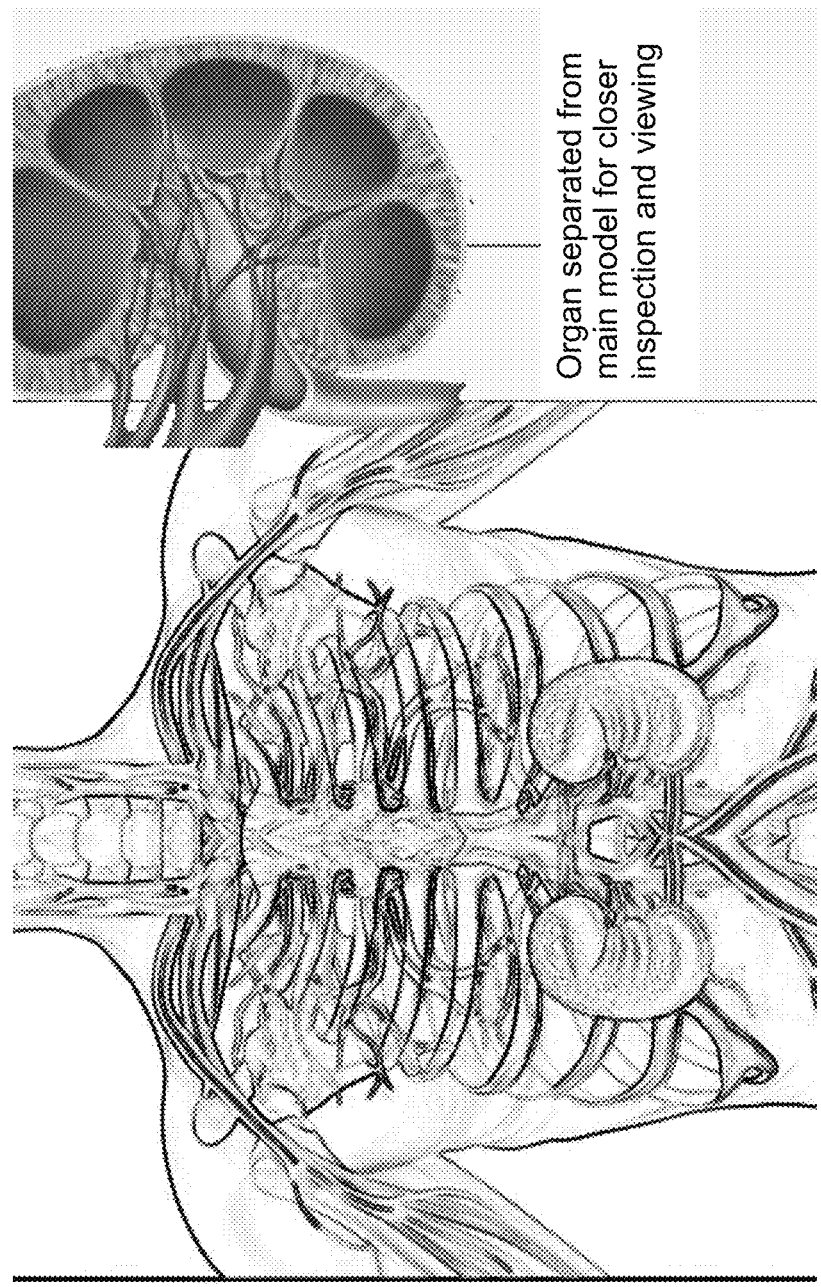
FIG. 14 illustrates an exemplary patient anatomy display with an element of the anatomy virtually removed to permit visibility to otherwise obstructed portions of the anatomy.

FIG. 14 shows an augmented reality anatomical model with a kidney removed for closer inspection. The kidney has been modified to display a cross section.

These diagrams can be of humans, animals or any living organism. Simulations can also be prepared for dissection, allowing a student to interact using a controller, gestures, or other means of user interface in order to attempt to perform a dissection, with feedback given to tell the user if they've made a mistake.

Figure 15:
FIG. 15 illustrates an exemplary active dissection.

FIG. 15 shows a user dissecting a virtual cadaver, removing a section of the epidermis to reveal the tissue underneath.

For example, in a classroom environment, this cuts out the need for gross anatomy, which has fallen out of favour due to health regulations. Instructors and students can explore anatomy in a virtual body, rather than having to deal with the costs and regulatory issues surrounding the use of cadavers, and in a more hands-on fashion than that afforded by traditional textbook based learning. Another advantage is the ability to reverse steps, which would obviously not be possible in the case of a cadaver.

In another example, during examination of a horse, an augmented reality display of equine anatomy can be displayed in the veterinarian's HUD, giving quick access to anatomical data and improving efficacy of examination and treatment.

Another embodiment relates to a method for combining gross anatomy with problem based learning (PBL).

Gross anatomy is the study of anatomy through the use of cadavers or other anatomical teaching methodologies, while PBL is a pedagogy in which students learn about a subject through open-ended problems. The two methods can be combined in order to create a learning paradigm in which open-ended problems are combined with anatomical dissection in order to teach a more thorough understanding.

For example, an instructor could pose a problem involving a patient who has passed away. In the hours prior to death, the patient repeated the same question over and over, despite receiving an answer to the question each time. Students can then use a virtual body for dissection to determine the cause of death, in this case an insulin-secreting tumour of the pancreas.

Another embodiment relates to a method for providing an augmented or virtual reality medical simulation, comprised of elements including, but not limited to, diagnostic simulations, surgical simulations, procedural simulations, previewing surgeries based on patient imaging, and group simulations for purposes such as teaching.

Medical simulations are useful for training and testing practitioners without risk to patients. Using data acquired from a real patient, or constructed using a three-dimensional modelling program or through other computer-generated means, a patient is created in an immersive environment.

A virtual patient can have a condition as selected either automatically by the software, or with user interaction for example by an instructor. The user or users can interact with the virtual patient in order to diagnose the condition. Virtual diagnostic tests can be run on the patient, giving results accurate to the condition the patient is displaying.

Figure 16:
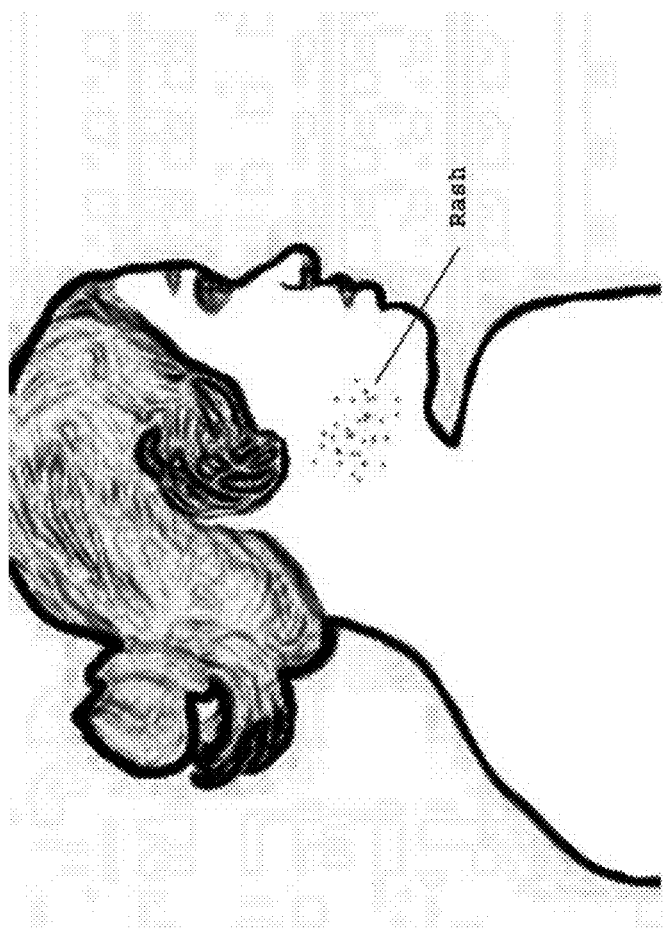
FIG. 16 illustrates an example of a virtual patient having an evident symptom (e.g., a rash or other topical ailment)

FIG. 16 shows a virtual patient with a visible rash. The patient is to be examined and diagnosed by the user.

A user can also perform a surgery or procedure, either as part of a simulation involving a diagnosis or separately. The virtual patient responds as would a real patient, and complications can optionally be introduced either automatically or interactively.

Surgical previews can also be performed using imaging data from real patients. These images are transformed into a model usable by the simulation, and a surgical procedure is simulated using the anatomy of an actual patient.

For example, a simulation could begin with a virtual patient in a doctor's office. The user must question the virtual patient and determine the appropriate diagnostic tests for a diagnosis. In this example, the patient has pain in the lower back due to kidney stones. In order to diagnose this, the physician orders an abdominal MRI. In the simulation, the results of the test are made available immediately. Using the MRI, the user correctly diagnoses the kidney stones and is able to schedule the patient for surgery. The simulation then moves to a surgical environment, and the user is able to perform the simulated surgery to treat the patient.

In another example, a surgeon preparing to install a pacemaker in a patient reviews the patient's radiological data in virtual reality. A model of the patient is constructed and placed on a virtual surgical table. The surgeon is able to use virtual surgical tools to install the pacemaker in the patient, using the real patient radiological data, in advance of performing the actual surgery. This allows the surgeon to prepare for any abnormalities in the patient physiology as well as practice the procedure for efficacy.

Another embodiment is a means of creating three-dimensionally printed cadaver models for anatomical use, surgical practice and other means. Using three-dimensional models created using the explained method from radiological data, a model suitable for three-dimensional printing is generated. This model is of sufficient detail and accuracy to be used in place of a cadaver for purposes of anatomical study, surgical practice and other common uses. This also allows for printing of defective organs prior to surgical repair, which can be used for practice and study of techniques. This also allows for problem based learning combined with gross anatomy in both real and virtual settings.

Three-dimensional models of animals and other organisms can also be created, allowing for veterinary and other disciplines to perform dissection and anatomical study on species that are either uncommon or otherwise difficult to study. An additional benefit of this method is that the subject does not actually need to be killed. This is particularly useful with endangered species, where a dissection is not possible, but collection of radiographical imaging may be possible.

For example, radiological data from patients with tumours are used to create three-dimensional cadaver models for a classroom. Each cadaver is then associated with a set of symptoms and radiological reports. Students must then correctly identify the issue, and perform the surgical procedure on the cadaver to remove the tumour.

In another example, a man dies of unknown causes. The family does not wish an autopsy performed, however the police have questions regarding the mans death. By scanning the body in an MRI, a three-dimensional cadaver model can be created, which can then be autopsied without violating the family's wishes.

Another embodiment relates to a method of using augmented or virtual reality combined with artificial intelligence for the purpose of testing and teaching materials to students.

Students learn in many different ways. Using artificial intelligence and an immersive environment, pre-programmed material can be presented to a student in an engaging fashion. By continuously testing the students' knowledge of the subject material, the methods that are most effective for the particular student can be determined, and teaching can be accelerated.

Figure 17:
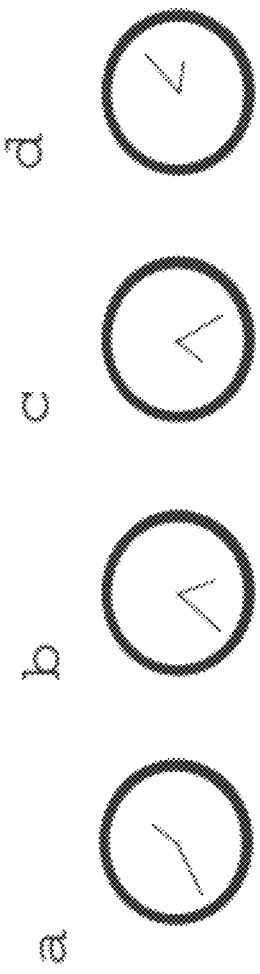
FIG. 17 illustrates an example of student learning in augmented reality.

FIG. 17 shows a multiple choice question displayed in augmented reality for a student.

The immersive environment can also be used for testing of the pre-programmed material. A student is asked to respond to questions, or to perform tasks, or otherwise interact with the immersive environment as defined in the program. Based on the success or failure of the responses, a grade can be assigned and areas of improvement can be identified.

For example, a child with a learning disorder is introduced to a virtual- or augmented-reality learning environment. Information about dogs, cats and fish are presented in different fashions. Dogs are taught using visual cues. Cats are taught using audio methods. Fish are taught using an interactive display that can be touched and manipulated. The child is then tested to determine which portions of the material were learned best. This is repeated over multiple topics, both to improve accuracy and to account for cases in which the child has foreknowledge of the subject area, and a learning profile is created and adapted for the specific child. New material is then presented using the adapted methodology, and testing is used to continuously update the learning model.

In another example, dyslexia can be diagnosed using a series of words designed to test pronunciation and reading. Each word is presented in augmented or virtual reality, and the user is asked to read the word out loud. Speech recognition is used to determine whether the word has been repeated correctly. Based on the number of words repeated correctly, an assessment can be made as to whether additional screening for dyslexia is required. The test can also be monitored remotely by another user with a different device. This allows for testing without the subject being anxious about being monitored during the test, helping them to perform better.

In another example, a student is given a test consisting of twenty-one questions. Seven questions are given to the student verbally. Seven questions are given to the student visually. Seven of the questions require the student to interact with virtual objects. The results of the test are analyzed both for an overall grade, and for grades in each individual learning type. A profile for the student is built, determining if the student scores higher on questions posed in a particular style. When a preferred style is determined, material will be presented more often in the preferred format to assist the student in learning.

In another example, a child with a learning disorder is introduced to a virtual or augmented reality learning environment. Information about dogs, cats and fish are presented in different fashions. Dogs are taught using visual cues. Cats are taught using audio methods. Fish are taught using an interactive display that can be touched and manipulated. The child is then tested to determine which portions of the material were learned best. This is repeated over multiple topics, both to improve accuracy and to account for cases in which the child has foreknowledge of the subject area, and a learning profile is created and adapted for the specific child. New material is then presented using the adapted methodology, and testing is used to continuously update the learning model.

Another embodiment is a means of performing a hearing test using an augmented or virtual reality device. The test is performed by first instructing the user to indicate when they hear a sound. Sounds are then played in increments, starting at a frequency well below normal human hearing range, until the user indicates they can hear the sound. Once the sound is heard, the increment is reduced and the frequency is reduced until a sound is played and the user does not indicate hearing it. This is repeated until the lowest frequency heard by the user is found. The user is then tested in the high frequency range, beginning at a frequency well above normal human hearing range. The frequency is decremented until the user indicates that they can hear the sound. The increment is then reduced, and the frequency is increased until the user no longer hears the sound. This is repeated until the highest frequency heard by the user is found.

For example, a child who is thought to be deaf is exposed to an immersive environment and connected to vitals monitoring. The child is then exposed to various sounds, and the vital signs monitored. A response by the child to the sounds indicates that they are able to hear the sounds, and can be used to assist in diagnosis of conditions such as non-verbal autism.

In another example, an aging woman is thought to perhaps be hard of hearing. By having her perform the test, her auditory range can be verified and it can be determined whether she has a need for a hearing device.

Another embodiment relates to a method for augmented or virtual reality simulation for the purpose of training a user or users in first aid.

First aid training can be done in an immersive environment using pre-programmed simulations. A user interacts with three-dimensional models in an immersive environment, following instructions given either by the computer running the simulation, or by a live instructor. The instructor, and other users, can optionally view the immersive environment at the same time as the training user. Feedback is provided by the simulation. The simulation can also be used for testing and grading of users.

Figure 18:
FIG. 18 illustrates an example of a first-aid procedure.

FIG. 18 shows an augmented reality demonstration of a patient receiving a tourniquet. The demonstration is given by a virtual instructor, following which the user is invited to repeat the procedure.

For example, a group of students is learning to apply a tourniquet in a first aid situation. A virtual reality program, complete with virtual instructor, gives the group a demonstration of how the tourniquet is tied. After the demonstration has been completed, each student is able to attempt a tourniquet on their own virtual patient. When a student is having trouble, they can request assistance from the program. When students complete their tourniquet, the program evaluates their level of competency and assigns a grade towards their first aid course.

Another embodiment relates to a method for doing intelligence quotient testing using augmented or virtual reality.

IQ testing is frequently done in the presence of an examiner, which can make some subjects nervous and affect performance. By administering the test in an immersive environment, the user can take the test free of the distraction of being watched. The administrator of the test could optionally watch the process in an immersive environment without being visible to the user.

The test is administered using the same test questions that would be used in a written/physical test, however all material is asked and answered in an immersive environment. This also allows for more advanced testing in areas such as spatial reasoning.

Figure 19:
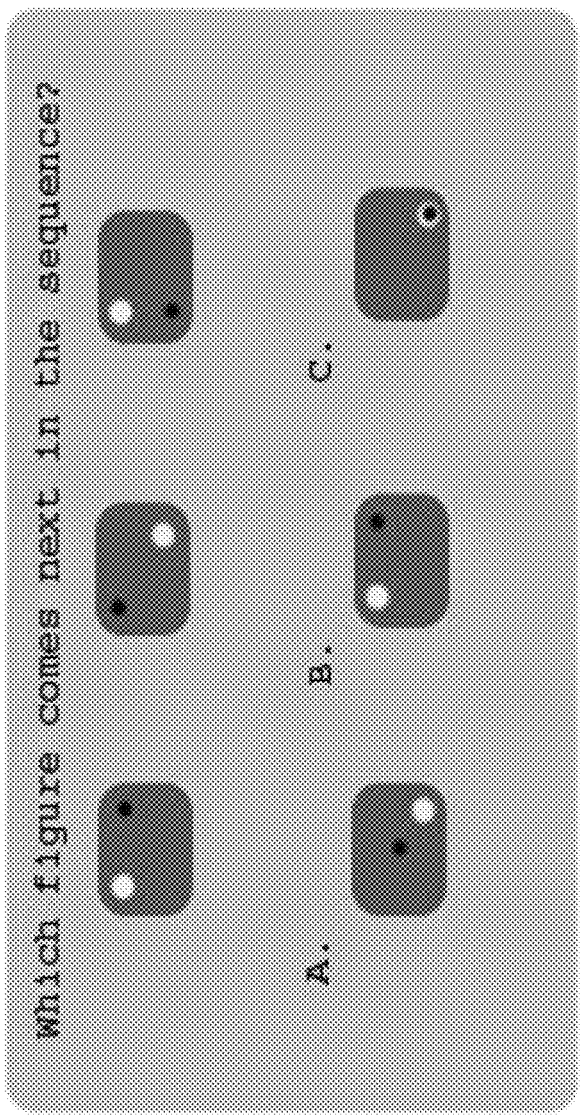
FIG. 19 illustrates an exemplary IQ-test question presented in augmented reality.

FIG. 19 shows a question posed for an IQ test in augmented reality.

For example, a test for spatial reasoning may involve a question of which of a series of shapes will correctly fill a three-dimensional hole. In augmented reality, the user is able to examine the shapes in three dimensions, manipulating their orientation and size. This allows the user to better analyze the possible solutions to the problem before making their selection.

Another embodiment relates to a method for teaching students using augmented or virtual reality combined with artificial intelligence.

By combining augmented or virtual reality and artificial intelligence, an enhanced learning system can be created for teaching of subject matter. Different people learn in different ways, with aural, tactile and visual being the three primary methods. By using artificial intelligence and a databank of information to be taught, the optimal learning style of a student can be gauged and utilized to ensure better understanding of the teaching material.

By periodically assessing the student, the areas in which the student has not fully learned the material can be determined, and additional teaching and focus can be provided on those areas. Using a combination of teaching using different balances of the aforementioned methods, the students' best learning styles can be established either in whole or in different areas, and by adapting the teaching methods to the student, learning and retention are enhanced.

For example, a student who learns very well from written instruction is being taught how to perform a science experiment. Different parts of the experimental method are imparted to the student using different teaching methods: aural, tactile and visual. The program notes that the student is best able to follow the instructions when they are presented visually, and therefore begins to present a higher proportion of the instructions in a visual manner.

In some embodiments, a method comprises collecting first data from at least one sensor used during a procedure, storing the data in memory, and replaying the data at a later time. Optionally, the method additionally comprises obtaining second data from the at least one sensor and comparing the second data to the first data. Optionally, the method additionally comprises presenting an indication of the result of the comparison (e.g., to indicate whether the second data matches or is consistent with the first data).

XVI. AR/VR-Assisted Neurological/Psychological Analysis and Treatment

Another embodiment relates to a method and apparatus for psychological desensitization of phobias. Using an immersive environment, coupled with sensors to monitor vital signs, a patient's level of stress and fear is monitored through a simulation. By exposing the patient to gradually increasing, yet tolerable, levels of phobic materials, the patient's tolerance is gradually increased. For example, a patient with a fear of spiders is exposed to spiders in an immersive environment. This could start with simply showing a spider crossing the floor, and progress as far as spiders climbing on the patient if the patient's vital signs indicate that the patient is not too stressed or fearful of the experience.

As another example, a patient with agoraphobia may be exposed in an immersive environment to the experience of going out in public, starting with leaving their house. Interactions with other people and other stimuli are increased or decreased, depending on the monitored vital signs.

Another embodiment relates to a method and apparatus for psychological treatment using a virtual person. In therapy, the concept of writing a letter to a person and not sending it is often used. By creating a virtual version of another person in an immersive environment such as augmented or virtual reality, the user is able to talk or express feelings towards a person without them being present. This allows the user to work out his or her feelings in a safe and comfortable environment, as outlined in an example below.

Another embodiment includes a method and apparatus for assisting psychiatric and psychological patients using a reactive simulation in augmented reality, virtual reality or other immersive environment. For example, a child who is thought to be deaf is exposed to an immersive environment and connected to vitals monitoring. The child is then exposed to various sounds, and the child's vital signs are monitored. A response by the child to the sounds indicates that the child is able to hear the sounds, and can be used to assist in diagnosis of conditions such as non-verbal autism.

Another embodiment includes a method and apparatus for diagnosing psychoses and phobias in patients using vital signs tracking combined with augmented reality, virtual reality, or another immersive environment. Using stimuli in immersive environments while tracking the vital signs of a patient, phobias and/or psychoses can be evaluated. In the case of phobias, introducing a patient to situations involving common phobias, such as heights or spiders, will cause elevated stress measurable in the patient's vital signs. In the case of psychoses, a practitioner can identify if a patient is reactive to virtual or augmented stimuli, and to determine whether the patient believes the stimuli are real.

Another embodiment includes a method and apparatus for diagnosing trauma victims using vital signs measurements combined with augmented reality, virtual reality or another immersive environment. In therapy, a common need is to diagnose trauma suffered by a patient. Using virtual stimuli and vital signs measurements, situations that lead to elevated stress and fear in a patient can be discovered and analyzed by a practitioner. These situations will assist the practitioner in determining the source of trauma in patients. This is especially helpful with younger patients who may be afraid to communicate their traumatic experiences, and with patients who have no recollection of the events causing their traumas. For example, to determine whether a child has been abused, simulated images that may mimic situations similar to those experienced by the child and monitoring the child's vital signs may be used. When the child's vital signs indicate that the child is uncomfortable, stressed, or afraid, the practitioner can use the information to help guide therapy for the traumatic experiences.

Another embodiment includes a method and apparatus for diagnosing epilepsy using EEG or MEG and vitals sensing, light events, and/or other stimuli in an augmented reality, virtual reality, or other immersive environment.

Another embodiment includes a method and apparatus for determining responses to virtual stimuli, detecting fabrications in stories, and other vital signs detection. When a person lies, their pupils dilate or they look in specific directions. Using a camera or other monitoring device to watch a subject's eyes, a lie can be detected. Responses to stimuli can also be determined from vital signs monitoring. Elevated heart rate, blood pressure, pupil dilation, eye movement, eye direction, and/or other vital signs can be used to determine how a subject feels about a given stimulus. Virtual stimuli can be shown to a subject in an immersive environment, and the resulting vital signs analyzed to determine the subject's feelings regarding the stimuli.

Figure 20:
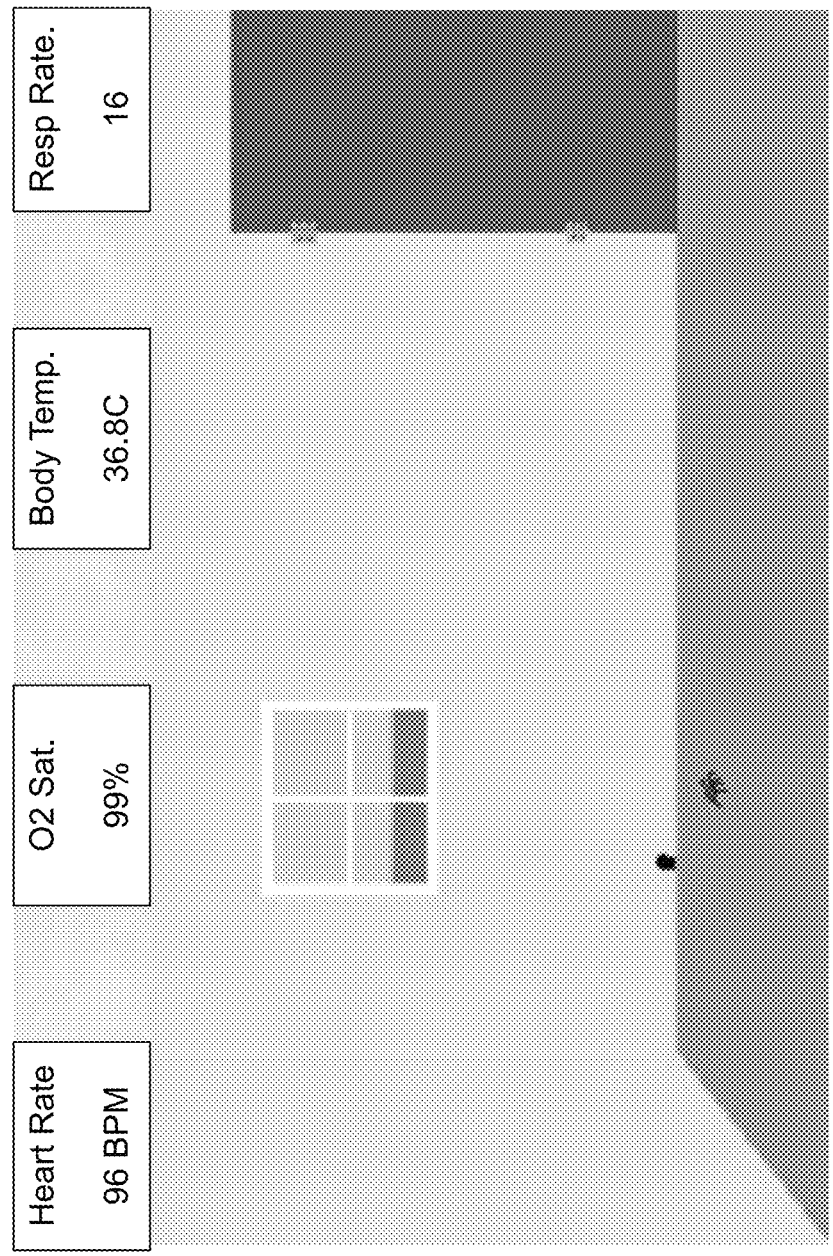
FIG. 20 illustrates an example of a virtual spider and vital-sign monitoring.

Another embodiment relates to a method for using augmented or virtual reality for psychological desensitization of phobias. As one example, the vital signs of a user who has a phobia (e.g., a fear of spiders) can be monitored to determine the user's level of stress and either increase or decrease exposure to a trigger (e.g., spiders) in an immersive environment to help the user overcome the phobia. FIG. 20 shows a virtual spider coming out of a hole in the wall, as well as the vitals of the user in the HUD.

In some embodiments, an immersive environment is used to simulate aspects of a user's phobias. Virtual models or situations simulating the phobia to be used are pre-generated for use in the immersive environment. The user is connected both to a viewing medium for the immersive environment, and to monitors for vital signs. The user's pulse, blood pressure, and/or other key vital signs are monitored for changes. When the user is exposed to a phobia, the change in vitals is measured. If the change is larger than a given threshold, then the exposure to the phobia source is reduced. If the vitals remain within an acceptable range, the exposure is gradually increased. Over time with exposure, this will assist the user in dealing with the phobia in question.

For example, a user who is scared of heights wears a set of virtual reality glasses. A safe environment is shown to the user to gather baseline vital signs as well as to allow the user to adjust to the immersive environment. Once the baseline reading has been gathered and the user has adjusted to the immersive environment, the user indicates he or she is ready to begin. The user is shown a view from the top of a hill. The vital signs show that the user is slightly uncomfortable, but within an acceptable range of discomfort. The user is given time to look around the immersive environment at this height, and to adjust to the height being shown. As the vital signs return towards the baseline, the environment is shifted to one at a greater height. This time, the user is too uncomfortable with the height, as indicated by the user's vital signs. The environment is shifted back to the previous height, allowing the user to calm down. If this height is insufficient to calm the user, a lower height or safe environment can be used and the process started over again using a more gradual increase in heights. As the user continues the program, his or her tolerance to greater heights increases, helping the user to deal with the phobia.

Another embodiment relates to a method and apparatus for psychological treatment using a virtual person. The virtual person is an avatar. In some embodiments, the virtual person is programmed to respond to the user. For example, a user who has trouble with a supervisor at work can create a virtual supervisor to whom the user can talk about the user's problems. In another example, a user can speak with the avatar of a loved one who has passed away, allowing the user to find closure.

Another embodiment relates to a method for assisting psychiatric and psychological patients using a reactive augmented or virtual reality. For example, a patient with alcoholism has successfully completed a rehabilitation program. After leaving a treatment facility, the patient needs psychological help in order to reintegrate with normal society. Using a virtual reality environment, the patient is exposed to real world situations, the patient's reactions are gauged, and assistance and guidance given, either automatically or with assistance from another user. The patient learns through experience how to relate and behave with normal societal circumstances, but is able to do so while remaining in a safe and controlled environment.

In another example, a patient suspected of having schizophrenia can be tested by presenting the patient with an augmented reality environment shared with a therapist. Frequently, schizophrenic patients will lie about hearing and/or seeing things that are not there, which can make diagnosis difficult. The therapist can initiate sounds and sights in the augmented reality environment, and ask the patient questions about what the patient sees and/or hears. The patient's responses are analyzed by the therapist, helping the therapist to determine whether the patient is schizophrenic.

Another embodiment includes a method for determining psychosis and phobias in patients using vital signs tracking combined with augmented or virtual reality stimuli. Phobias can be identified in simulation from a database of common phobias. In an immersive environment, a user is attached to vital signs monitoring. The vital signs are in turn fed into the simulating computer, which controls the immersive environment to expose the user to a variety of potential phobias. By monitoring the respondent vital signs, a user's level of comfort with each potential scenario is determined. This data can be compiled into a phobia profile for use by a therapist or other professional.

Figure 21:
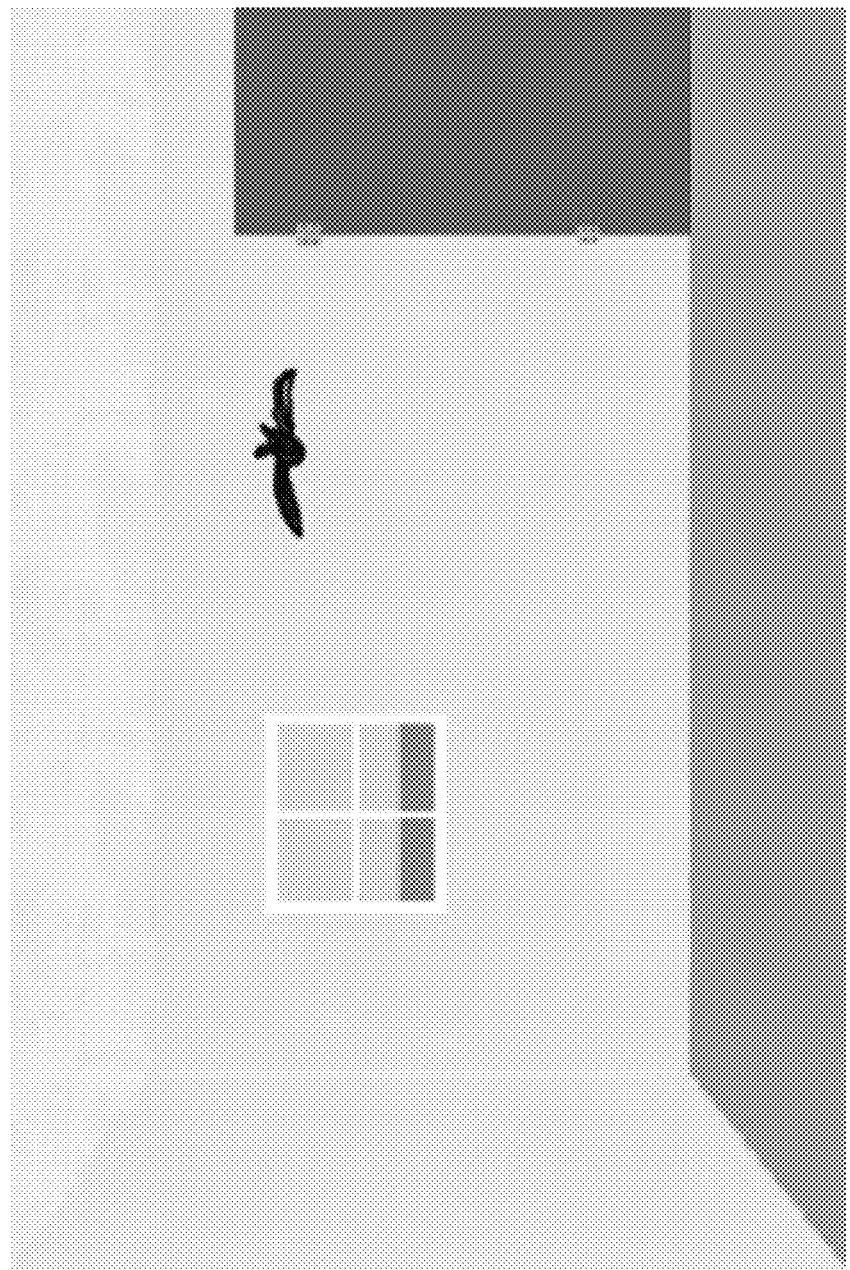
FIG. 21 illustrates an example of a potential phobia.

For example, a user connected to a vital signs monitoring system begins testing by wearing a set of virtual reality glasses. The simulation begins with a safe place, such as a simple nondescript room. Baseline readings are taken for the user's vital signs. To test whether the user has various fears or phobias, different stimuli are added to the immersive environment, and changes to the user's vital signs are detected and/or recorded. For example, to test whether the user is afraid of mice, while the user looks around the room, a mouse emerges from a hole in the wall of the immersive environment. The user's vital signs are monitored for a reaction to the mouse and recorded. If the user's vital signs remain unchanged, that indicates the user likely has no fear of mice. In this case, the mouse may return to the hole and disappear. To test whether the user has a fear of spiders, a spider emerges from the hole, and again the user's vital signs are monitored for a reaction. Assume for the sake of example that the user's vital signs change in a way that indicates mild distress. The vital signs are recorded, and the spider returns to the hole. To test whether the user has a fear of bats, a bat is introduced to the scene, flying in through a window. Assume for the sake of example that in response to the bat, the user's vital signs rise sharply, indicating acute distress. FIG. 21 shows a simulated bat, and elevated vitals related to a user's fear of bats. The readings are recorded, and the bat is immediately removed from the scene. The readings resulting from the introduction of stimuli representing any number of phobias can be recorded for later inspection, printing, display, or electronic transmission.

Another embodiment includes a method for diagnosing trauma victims using augmented or virtual reality combined with vital signs measurements in order to determine sources of potential past or current traumas. In some embodiments, a user in an immersive environment simulation of a variety of events can be connected to vital signs monitoring, which is in turn connected to the computer system running the simulation. By monitoring the vital signs of the user, it can be determined what situations make the user anxious or uncomfortable. The simulation scenarios are pre-programmed and can form a database of possible scenarios. The scenarios can either be selected automatically, or with user input by someone like a psychologist or other professional. The measured vital signs and interpreted reactions can be recorded to a storage medium for further consultation.

Figure 22:
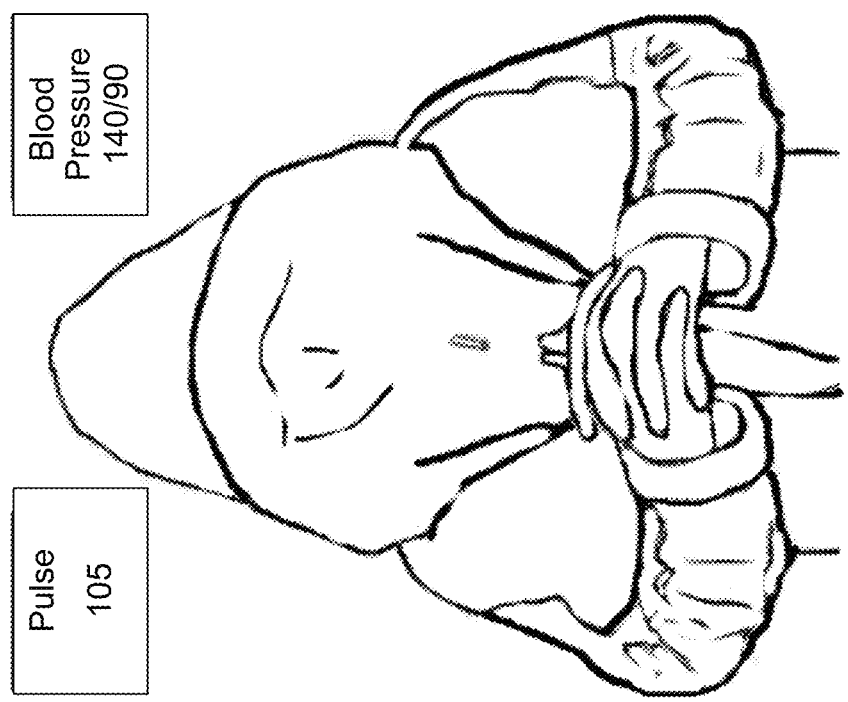
FIG. 22 illustrates an example of vital-sign elevation in the presence of a particular visage.

As just one example, FIG. 22 shows the view of a user whose vital signs have been elevated due to the presence of a stranger. As another example, children are inclined to lie about abuse, be it physical, sexual or emotional when they have been threatened or have been abused by someone they care about. A child who may have been abused by his or her father may be connected to vital signs monitoring and don a set of virtual reality glasses. A simulation begins with a safe, nondescript room to allow a baseline reading of vital signs to be gathered and recorded. The child is then shown virtual images of people with whom the child lives. First, the child's sister is shown. The simulated sister may be shown exhibiting a variety of emotions, such as sadness, happiness, anger, and fear. The child's reaction to each is noted and recorded. This process is repeated for each member in the child's household. When the child is shown an angry simulation of the father, the vitals may indicate extreme fear and distress if the child has in fact been abused by the father. The results of the test are recorded and stored for review by a qualified professional.

Another embodiment includes a method for diagnosing epilepsy using EEG or MEG and vitals sensing, light events and other such stimuli in virtual or augmented reality to monitor responses.

Figure 23:
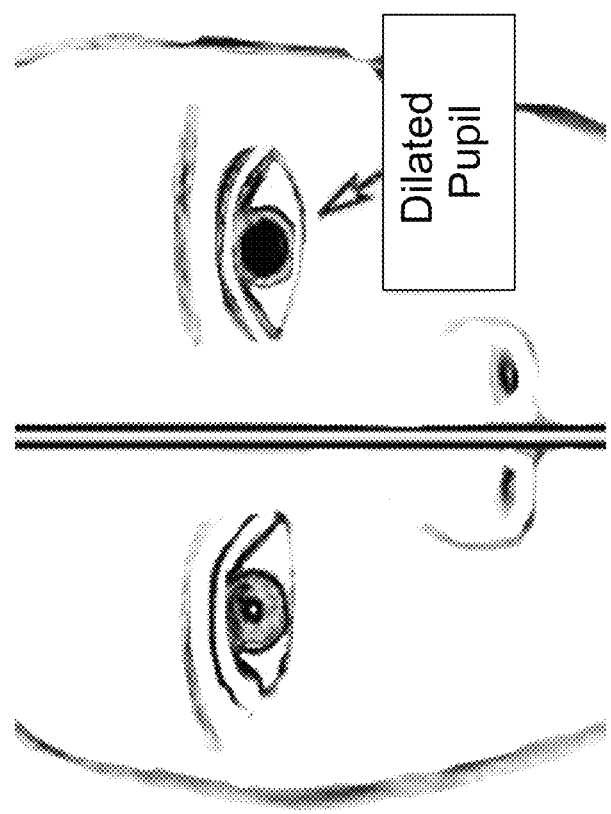
FIG. 23 illustrates an exemplary pupil dilation and subsequent detection thereof, including light variance and detection.

Another embodiment includes a method for using pupil dilation, eye movement and eye direction for determination of response to stimuli, detecting fabrication in stories, and/or other such vital signs detection. A camera or other sensor targeting the face of a subject is used to detect dilatory changes in the pupil size, position, and movement. FIG. 23 shows a visible difference in pupil dilation. The sensor data is analyzed to determine whether dilations are a result of changes in the environment, or a result of changes in the subject's state of mind. For example, ambient light levels, particularly those directly around the eyes of the subject, are used to determine environmental lighting factors.

As an example, a suspect is being interrogated by a police officer following an armed robbery. The police officer is wearing a set of augmented reality glasses that are programmed to analyze the suspect's face as described above. As the suspect tells a story of having been nowhere near the location of the robbery, the software indicates the suspect's pupils dilate abnormally, as well as eye movement, body posture, and/or sweating indicative of dishonesty. This gives the police officer a strong indicator that the suspect is lying, and leads to more direct questioning regarding the circumstances of the crime.

In another example, a practitioner using a set of augmented reality glasses can examine a subject for neurological conditions, such as stroke or other neurological symptoms. Additionally, audio can be recorded and/or interpreted to determine if the subject has a slur or other auditory symptom.

In some embodiments, a method comprises creating an environment in augmented or virtual reality for a user, monitoring at least one vital sign (e.g., a heart rate, a blood pressure, a pupil dilation, an eye movement, an eye direction, etc.) of the user while the user is immersed in the environment, and adjusting an aspect (e.g., changing an aspect related to phobia of the user, changing a perceived distance between the user and a virtual object within the environment, adding a virtual object to the environment, removing a virtual object from the environment, etc.) of the environment based at least in part on the monitored at least one vital sign. For example, the adjustment may be made in response to a change in the monitored vital sign. When the adjustment is to add a virtual object to the environment or remove a virtual object from the environment, the virtual object may be a virtual version of a person that may be capable of interacting with the user. The method may further comprise providing guidance to the user while the user is immersed in the environment. The method may further comprise recording the at least one vital sign. The method may further comprise recording a response of the user to a change in the environment while the user is immersed in the environment. The method may further comprise generating a profile based at least in part on the monitored at least one vital sign of the user while the user is immersed in the environment. The method may further comprise connecting the user to a monitoring device (e.g., a heart rate monitor, a blood pressure monitor, an imaging device, etc.), and monitoring the at least one vital sign by obtaining information from the monitoring device.

In some embodiments, the method further comprises storing, in memory, an indication of an effect of the adjusting the aspect of the environment on the monitored at least one vital sign. The method may further comprise identifying a phobia or psychosis based on the indication, and/or comparing the indication of the effect to information stored in a database (e.g., information identifying a phobia or a psychosis).

It is to be understood that in addition to diagnostic activities, the embodiments disclosed herein are also useful for training, education, and consulting activities.

XVII. AR/VR-Assisted Visualization

Another embodiment relates to a method and apparatus for providing a visual display for cosmetic surgical use in augmented reality, virtual reality or other immersive environment. The display can also be used to create models suitable for printing in two and three dimensions.

Cosmetic surgeons use various techniques to show patients and potential patients the possible results of cosmetic procedures. Using an immersive environment, a cosmetic surgeon can show a subject how the results of the procedure will look in real-time, on the actual patient rather than a mock up or image. The virtual model can also be used to verify that a surgery is done correctly. The model can also be used during surgery to help the surgeon ensure a correct result. The model can also be used to show the subject that the results are as expected.

In AR, the cosmetic surgery overlay is comprised of an augmented reality device or similar display, a camera or other imaging device, and optionally an audio capture device or other audio input device. In VR, the overlay is comprised of a VR device and optionally an audio capture device or other audio input device.

In AR, the surgeon begins by selecting a region of the patient to be cosmetically altered. The selection is made by gesture, voice command or other user input method. The selection can be fine-tuned using similar input methods in order to ensure that the correct area is selected. The surgeon can then finalize the selection, and begin creating a new model for replacement. The surgeon uses the existing selection as a basis for the new model, or optionally uses a pre-generated three-dimensional model of the appropriate body part from which to model the desired result. This model is also optionally created from morphology data as described below.

In VR, a model of the patient is used as a basis for selecting and modifying the model. The model is adjusted and shaped in situ, instead of as an overlay over the physical patient.

Modeling is done through a series of user inputs, allowing the surgeon to adjust the appearance of the three-dimensional model in order to arrive at the desired shape. The three-dimensional model is comprised of points, which can be selected and manipulated individually or in groups. The selected area, is then adjusted in size and shape until it has an appearance satisfactory to the patient and surgeon. The augmented or virtual reality environment is also optionally shared between the surgeon and patient, each equipped with their own AR or VR device.

The use of a three-dimensional model generated in this way is used during surgery using the same methodology outlined in section I for surgical overlays. This allows the surgeon to verify the correctness of the outcome against the expected model agreed upon with the patient, thereby reducing surgical error, helping avoid malpractice issues, and improving patient satisfaction.

Post surgery, the surgeon can use augmented reality to show the patient that the surgical outcome matches the expected model by once again showing the patient the model overlaid over their features. This demonstrates to the patient that the surgery has been completed correctly.

An example of surgical assistance is in breast augmentation. Many women have breasts of two different sizes, which requires the surgeon to guess at the correct adjustment to the implant sizes. Using a virtual overlay, the surgeon can ensure that the correct adjustment is made in real-time, and visually verify the results.

Another embodiment relates to a method and apparatus for displaying orthodontic images in virtual reality, augmented reality or other immersive environment.

Current practice in orthodontics involves taking x-rays and moulds of a patient's teeth, as well as jaw and bite measurements, and sending the data to a lab to interpret the data and create dental appliances.

A virtual overlay can be used in orthodontics to show patients and potential patients the results of orthodontic work. A virtual overlay can also be used to determine the shape and sizing of a dental device. The overlay can also be exported in a format suitable for three-dimensional printing of a dental appliance.

AR creation of dental models is comprised of an augmented reality device equipped with a camera or other imaging device, and optionally an audio capture device for voice input and/or recording.

Creating the dental model is done by first initializing the system, using a voice activation or other form of user input. Once initialized, the system creates a point cloud of the observed data, in this case the patient's teeth. The user or users look at the teeth from as many angles as possible to ensure completeness of the point cloud. The user(s) also have the patient close their mouth in order to view track the alignment of the teeth as they bite together. The recorded point cloud is then used to create a three-dimensional model of the teeth and jaw, which can be either sent to a laboratory for manufacture of dental devices, or used by the user or users themselves to generate a dental appliance for three-dimensional printing.

In the case of a three-dimensionally printed dental appliance, a standard appliance model is fitted over the model of the teeth. The model is then adjusted by the user or users, using voice, gesture or other means of user input, to create a model that provides the appropriate correction to the alignment of the teeth. Once the desired shape has been created, the appliance model is saved for three-dimensional printing or sent directly to a three-dimensional printer for manufacture.

Another embodiment relates to a method for providing an augmented or virtual reality view for cosmetic surgical usage, comprised of elements including, but not limited to, patient previews, verification of results, and assistance during surgery.

In cosmetic surgery, expected results are typically generated using software designed specifically for that use. Using an immersive environment, projected patient results can be manipulated and displayed in real time allowing a practitioner to show a subject how a particular surgical alteration will appear when completed directly on their own body. This could be done using augmented reality and a mirror, using virtual reality and a model of the patient taken by any known method for acquiring said image, or other immersive environment allowing superimposition or alteration of the appearance of the subject.

Figure 24:
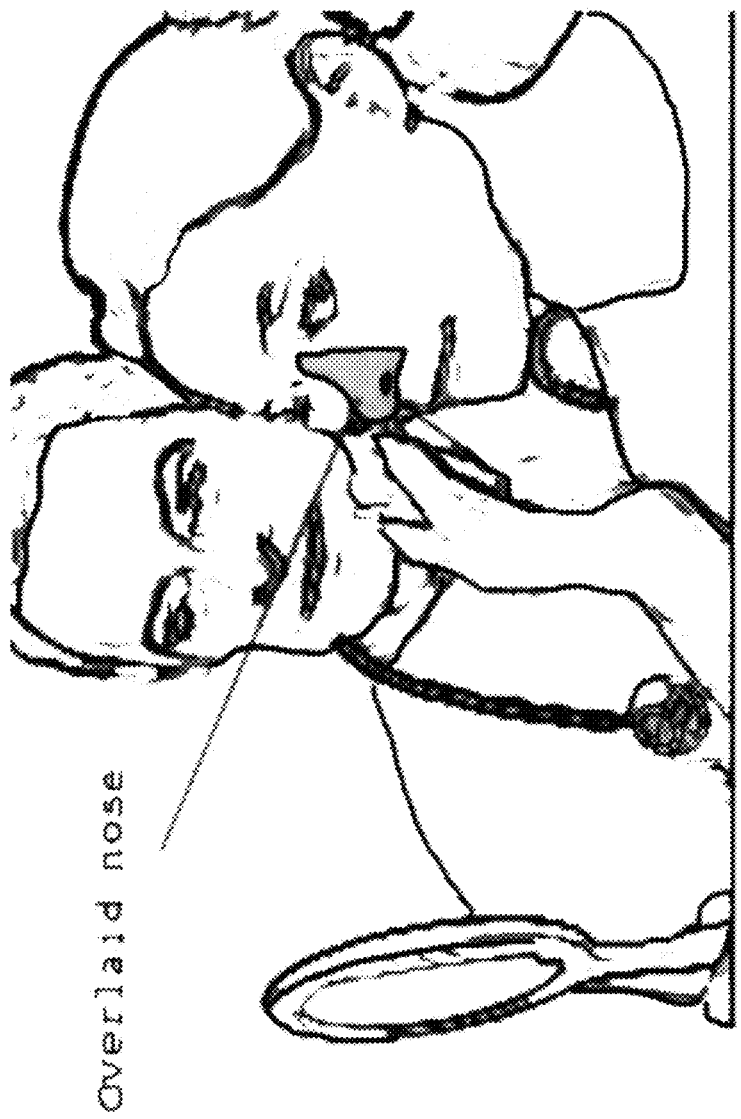
FIG. 24 illustrates an exemplary mirrored reflection of a patient and doctor viewing sample plastic surgery outcomes (e.g., nose)

FIG. 24 shows a doctor and patient looking at a possible new nose, overlaid in augmented reality. The new nose overlay is semi-transparent, allowing the old nose to be seen through it.

Using gestures, voice or other means of control, a practitioner can modify the surgical results in an immersive environment. For example, with a rhinoplasty, the surgeon could control the simulation to show the subject how they would look with different noses.

Figure 25:
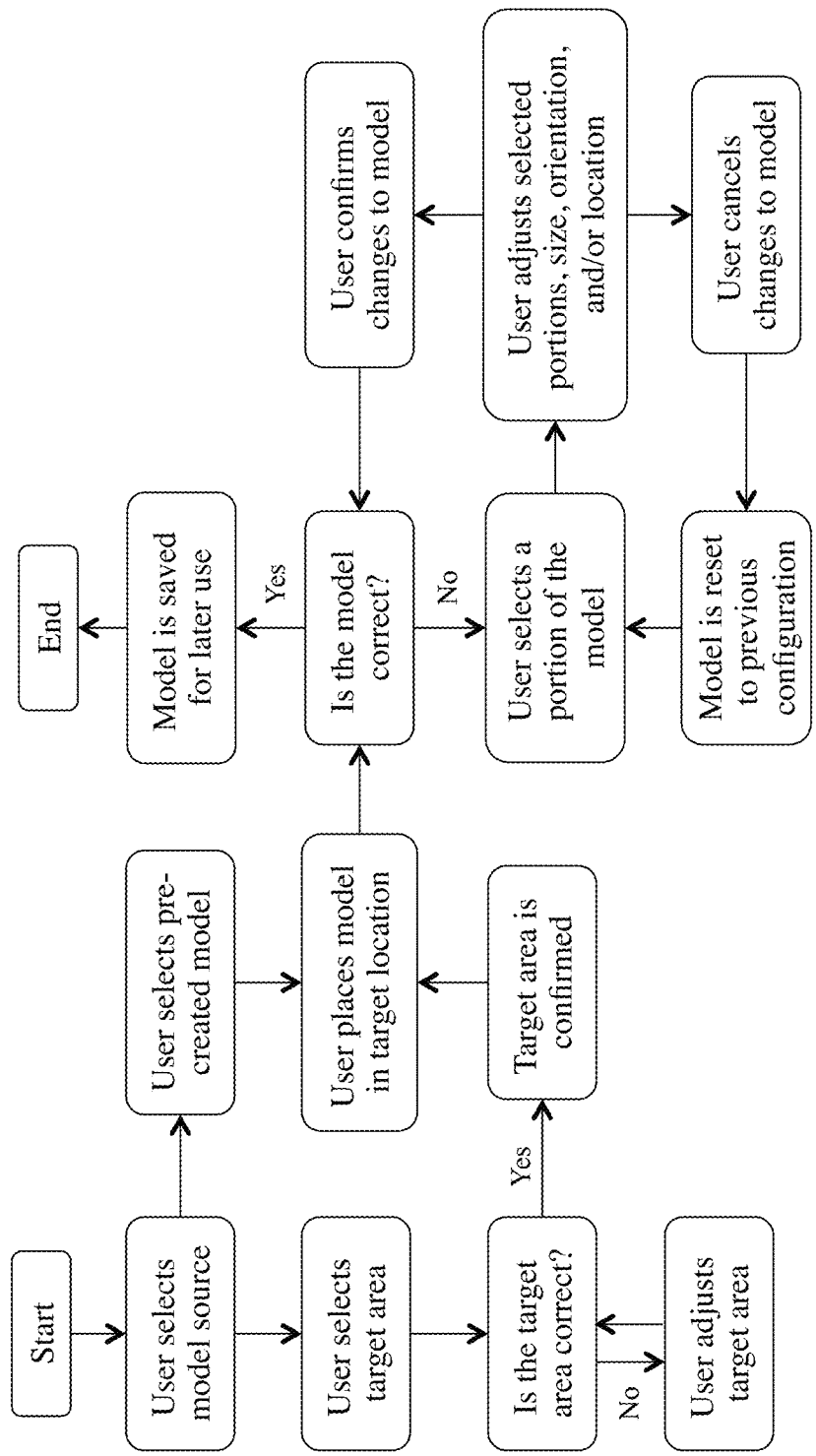
FIG. 25 illustrates exemplary control over an overlay of an anatomical feature (e.g., nose overlay controlled by surgeon) in real time.

FIG. 25 is a flow chart walking through the process of creating and adjusting a surgical overlay. The process begins at the cell labelled start. The first step is for the user to select the model source, whether it be a pre-created model from a databank or other data source, or a selection from the subject's existing anatomy. If a pre-created model is selected, the process continues from location selection. If a subject anatomy source is selected, the user selects the area to be the basis for the creation, selecting the area using a gesture or other user input command. If the target area is incorrect, the user can adjust the parameters (such as the width, height, depth and location) of the selection in order to select exactly the area desired. The user then confirms the target area, and the process continues from location selection. Next, the user performs location selection by placing the new model in the correct location on the subject's body. Once the model is placed, the user then determines if it appears correct. If the model appears incorrect, the user can select all or a portion of the model for adjustment. The user then adjusts the selected portion's size, orientation and location to the suit. The user can cancel the option if the new appearance is not satisfactory, in which case the model is reset to it's previous state and the portion selection is started again. The user can also confirm the changes to the model, at which point the user is able to decide once again whether the model is correct. This continues until the user is satisfied that the model is correct, at which point the model is saved for later use, and the sequence ends.

The model data can also be used in an immersive environment during the actual procedure, allowing a practitioner to be guided by the results. This allows for more accurate results and reduced surgical errors. The model data can also be used following the procedure in order to demonstrate to a subject that the results are as expected.

Figure 26:
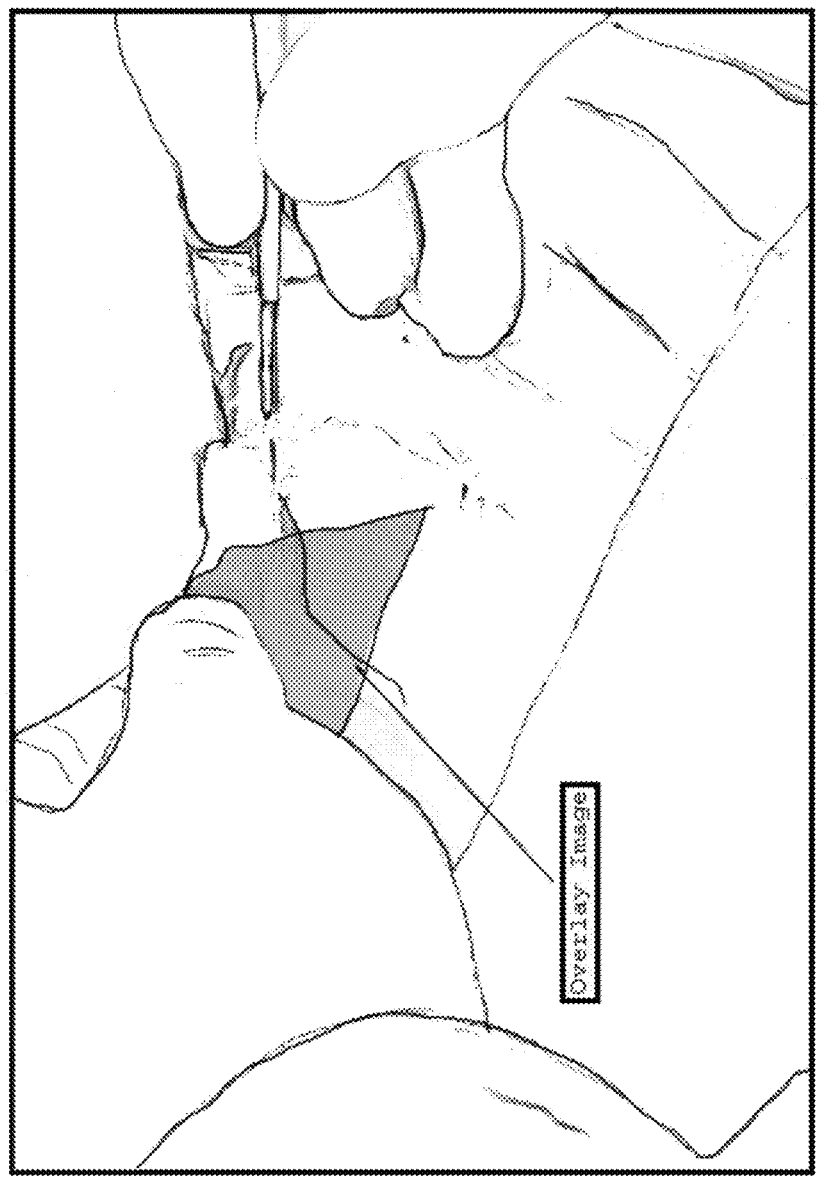
FIG. 26 illustrates an example of a surgical procedure in progress with overlay.
Figure 27:
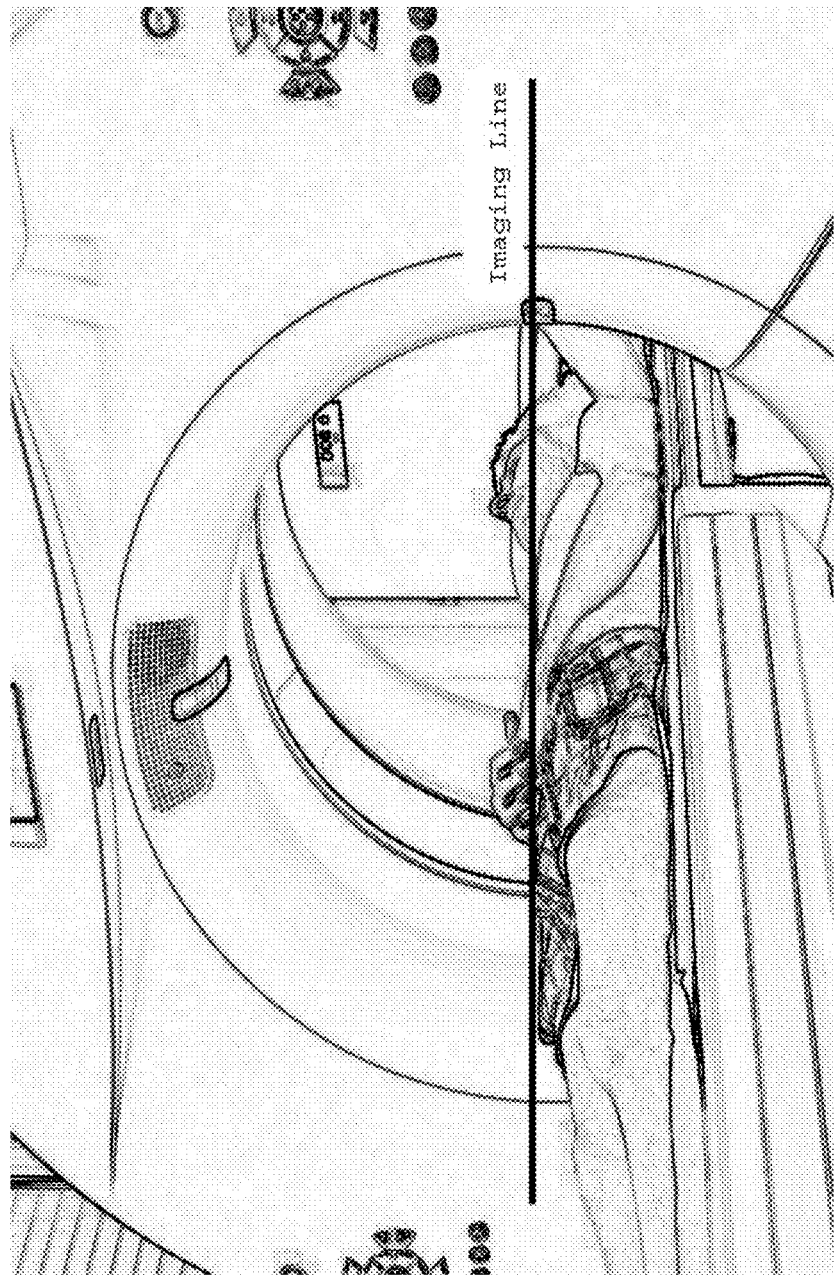
FIG. 27 illustrates an exemplary chest rise and detection/image capture thereof.

FIG. 26 shows a rhinoplasty model overlay during a cosmetic surgical procedure. The replacement nose shape and dimensions are shown in transparent grey. The model is transparent so as not to interfere with the surgeon's view of the procedure.

For example, a potential patient doing a consultation for rhinoplastic surgery could discuss options with the surgeon. The surgeon could then create a sample nose for the patient in augmented reality, and the patient could review the potential results by looking at themselves in a mirror using augmented reality.

Another embodiment relates to a method for providing an augmented or virtual reality display for orthodontic use, comprised of the ability to display previews of orthodontic work, a method for showing future tooth alignments and positions, a method of determining shapes and sizes of dental devices, and a method of generating data files of dental devices for 3D printing.

An orthodontic patient or potential patient can be measured using a three-dimensional (depth) camera or other imaging device. The patient could also be measured using traditional means, or other means of measurement. Using these measurements, a three-dimensional model of the patient can be created for use in an immersive environment. With the three-dimensional patient model, dental appliances can be created in an immersive environment. These dental appliances can then be exported from the simulation in a format suitable for three-dimensional printing or submission to a manufacturer of dental appliances. For example, a patient looking to have orthodontic work can have a virtual reality simulation of their teeth shown to them, displaying the changes in their teeth alignment over time in a simulated environment.

In some embodiments, a system comprises a rendering device, and an imaging device coupled to the rendering device and configured to provide images to the rendering device.

In some embodiments, a method comprises creating an immersive environment, and, within the immersive environment, creating a virtual model representing a result of a procedure (e.g., a cosmetic surgery procedure, a dental procedure, an orthodontic procedure, etc.) to be performed on a patient, wherein the virtual model is a three-dimensional model, and storing information representing the virtual model in memory. Creating the virtual model may comprise selecting a region of the patient to be modified and creating the virtual model using the selected region of the patient as a starting point. Alternatively or in addition, creating the virtual model may comprise selecting, from memory, a representation of a body part and creating the virtual model using the representation of the body part. Alternatively or in addition, creating the virtual model may comprise obtaining a practitioner input (e.g., a voice command, a gesture, a selection through a virtual peripheral or device, a keystroke, etc.) and creating the virtual model based at least in part on the practitioner input. In some embodiments, the virtual model comprises a plurality of points, and creating the virtual model comprises setting or modifying at least one of the plurality of points. The method may further comprise referring to the virtual model during the procedure performed on the patient. The method may further comprise manufacturing an apparatus (e.g., a dental appliance) based on the information representing the virtual model, wherein the apparatus instantiates the virtual model.

In some embodiments, a method comprises obtaining a first user input identifying a model source (e.g., a library of candidate models, the patient's body, etc.), the model source providing a model (e.g., a selected model from a library of candidate models, a three-dimensional rendering of a portion of the patient's body, etc.) for use in a procedure performed on a patient, obtaining a second user input identifying a target area, obtaining a third user input indicating a position of the model relative to the target area, obtaining a fourth user input representing an instruction to modify at least an aspect of the model (e.g., a size, dimension, volume, area, orientation, location, or placement of the model), creating a modified model based on the instruction to modify the at least an aspect of the model, and storing the modified model in memory. In some embodiments, the method further comprises obtaining a fifth user input canceling the instruction to modify the at least an aspect of the model. The method may further comprise canceling a modification to the model in response to the fifth user input. In some embodiments, the method further comprises obtaining a fifth user input confirming an accuracy of the model or the modified model. In some embodiments, the method further comprises obtaining a fifth user input comprising an instruction to save the modified model.

XVIII. Physiological/Anatomical Mapping, Modeling and Positional Marking

Another embodiment relates to a method and apparatus for scanning, mapping and analyzing human bodies.

Using a camera or other visual recording device, a subject can be scanned and mapped into a two- or three-dimensional model. This model can be used by a practitioner to identify areas of interest or concern. The model can also be used to monitor areas between visits. The model can also be analyzed, automatically or with user-interaction to determine the presence of conditions such as melanoma, rashes, psoriasis and other visible conditions.

In the case of a two-dimensional mapping, a camera is directed at the subject. The subject then turns 360 degrees, and images are recorded as the subject turns. The recorded images are first processed to remove the background by comparing identical data from one frame to the next. Identical data is discarded, leaving only the subject. Using feature detection, the images are then stitched together to form a two-dimensional model of the subject.

In the case of a three-dimensional mapping, a camera is directed at the subject. The subject then turns 360 degrees, and images are recorded as the subject turns. The recorded images are first processed to remove the background by comparing identical data from one frame to the next. Identical data is discarded, leaving only the subject. A two-dimensional model is created as explained above. A point cloud is then generated from the data, creating a three-dimensional model of the subject. The point cloud is then overlaid with the two-dimensional model ("skin"), which gives a three-dimensional model of the subject.

Once the model has been created, analysis of the two-dimensional model ("skin") is performed for known conditions. Areas of interest are marked for review by the user or users. The data is also stored for comparison upon future visits.

Another embodiment includes a method for mapping and analyzing human bodies, comprised of scanning of the body, storing of surface data, marking of important features such as melanoma, moles, rashes, other skin conditions and remarkable features (either automatically or by human interaction).

A subject or subject area can be scanned using a camera or other imaging device. The surface data can then be stored and analyzed for current and future use. By analyzing the characteristics of the surface, common conditions can be diagnosed, and efficacy of treatments can be determined. Sizes, colour and other metrics of an affected area can be measured and compared, allowing a direct comparison between previous visits and current visits. This comparison also gives a clear view of the efficacy of treatments being provided. These comparisons can be used by, but are not limited to, the practitioner as well as, for example, an insurance company to determine whether they're willing to continue reimbursing the patient for a given treatment.

For example, a visual recording of a patient is taken with augmented reality glasses is stored, complete with a visual overlay of diagnoses made either automatically or with user-interaction. This recording can then be used as a visual report for the patient file, and for review prior to appointments with the patient. The recording can also be used as part of a referral to a specialist (including all AR/VR content). The recording can also be used as part of a referral to a specialist. In a hospital setting, the visual record can be used to prevent the need to re-examine a patient at different stages of their treatment. A recording of the original exam can therefore be viewed.

In another example, a patient with eczema could be scanned at an initial consultation. As the dermatologist treats the eczema using a prescription, the scan can be compared at each visit to verify the efficacy of the treatment. Software can automatically determine whether the size and shape of the affected area has changed.

Another embodiment relates to a method and apparatus for timing the pulse sequences of MRI based on the position of the subject's body in order to ensure that images are taken at the same point in a rhythmic movement such as breathing or a beating heart.

MRI with a traditional MRI machine is subject to imaging problems related to patient movement. Blurred images and image artifacts are two common issues seen when a patient moves during an MRI exam. By monitoring the position of the patient's body, the imaging sequence can be timed such that an image is taken only when the patient is in the correct position.

For example, a sensor or camera can be used to monitor the height of a patient's chest, triggering the imaging sequence to take an image only when the chest is at the same height as the last image. Using this technique, all images of a patient's chest would be taken when the chest is in the same position.

Another embodiment includes a method and apparatus for interpreting raw MRI signal data into composite three-dimensional models.

When an MR image is taken, it is recorded as a series of signals as recorded by receivers in the MRI machine. These receivers measure the magnetic resonance of the subject at the time of recording. Using multiple receivers gives a large number of data points that need to be broken down into parts in order to generate images. By interpreting the data, a three-dimensional model of the subject can be created suitable for virtual reality, augmented reality and three-dimensional printing applications.

Another embodiment relates to a method for enhancing positional location in augmented reality using gadolinium markers.

Another embodiment relates to a method and apparatus for controlling the visualization of a three-dimensional object in virtual reality, augmented reality, or other immersive environment.

A three-dimensional object stored in a computer consists of many data points. By altering the visualization, the visual representation of the object can be changed, allowing a user or users to view the visualized object in different ways.

For example, a three-dimensional model created from MRI data contains a great deal of information that is covered by the outer layers of the model. By altering the visualization and removing the outer layers of data, the inner portions of the model (such as the brain) can be made visible.

Another embodiment relates to a method and apparatus for visualizing medical imaging data in augmented reality, virtual reality, or other immersive environment.

Medical imaging data can be converted to a format suitable for display in three-dimensional virtual space. This data can then be displayed through virtual reality, augmented reality, or another immersive environment.

Positional location in augmented reality is determined primarily through visual means, feature detection, and other methods described herein.

Another embodiment relates to a method and apparatus for constructing a three-dimensional model comprising the steps of determining image separation distance, identifying missing images, aligning source image and constructing missing image data, and merging the images to form a three-dimensional model.

Another embodiment relates to a method and apparatus for detecting and monitoring a user's hands, or another part of the user's body, in augmented reality, virtual reality, or another immersive environment.

For example, a set of one or more sensors attached to the user's hands can be used to determine the position of the user's hands relative to the virtual camera. The positions of the one or more sensors can be used to determine the positions of individual segments of the user's hands, such as, for example, the user's palm, fingers, and wrists. Data is transmitted from the sensors to the immersion device controlling the immersive environment.

Another embodiment relates to a wearable apparatus for full-body sensing and feedback. In some embodiments, a system comprises one or more of means for measuring and tracking the wearer's movement, means for simulating touch senses, means for simulating temperature senses, or a means for restricting user movement.

Another embodiment relates to a wearable apparatus for full-body sensing and feedback. In some embodiments, a system comprises one or more of means for measuring and tracking the wearer's movement, means for simulating touch senses, means for simulating temperature senses, or means for restricting user movement used for gaming in augmented or virtual reality.

Another embodiment relates to a method and apparatus for recording and replaying sensory data using sensors.

In some embodiments, a user wearing a glove or other device equipped with at least one sensor touches a surface, and the at least one sensor records characteristics of the surface detected from the touch. The characteristics may include, for example, the texture of or pressure presented by the surface. A processor coupled to at least one actuator may later use the recorded characteristics to control at least one actuator such that the at least one actuator emulates the feeling of the surface. By taking multiple recordings, either from the same surface or different surfaces of the same type, a profile can be created for a given surface. Using profiles generated in this way, surfaces can be identified through touch by comparison to existing profiles.

For example, a surgeon wearing a glove having at least one sensor can touch a human limb while the at least one sensor records, for example, the resistance presented by the human limb. The processor can then use the recorded data from the at least one sensor to control at least one actuator to emulate the feeling of touching the recorded limb.

Another embodiment relates to a method for timing imaging sequences based on position of the patient's body, for example using the height of the chest to ensure that images are taken at the same point during the breathing process to give a more stable image.

In traditional imaging sequences, movement of the patient can cause failed imaging sequences, artefacts, blurred images, and/or other undesirable anomalies. By using a sensor, for example a camera, altimeter, or other positional sensor, the imaging sequence can be timed to take images only when the patient is in the correct position.

For example, in doing an MR scan on a patient's chest, a camera can be used to monitor the height of the patient's chest from the MR platform. When the patient's chest is at a specific height, the imaging sequence is fired. When the patient's chest is no longer at the correct height, the sequence is paused awaiting the next time that the chest position is correct.

FIG. 19 shows a patient in an MRI machine. An imaging line is shown in the image, which is a line tracked by a camera or other imaging device at which images are taken. When the patient's chest is not level with the line, imaging is not taken.

Another embodiment includes a method for interpreting raw MRI signal data into composite three-dimensional models for use in virtual reality, augmented reality, and/or three-dimensional printing applications.

Raw MRI signal data can be composed in many different fashions. By interpreting the raw signal data from a MR scan, a three-dimensional representation of the target area can be created. The raw signal is first decoded into voxels using methods common in the industry. These voxels are then translated into three-dimensional coordinate space within the computer. Using this three-dimensional voxel model, a three-dimensional model can be created for applications such as an immersive environment simulation and three-dimensional printing.

Another embodiment includes a method for controlling the visualization of a three-dimensional object displayed in virtual reality, augmented reality, or other immersive environment comprising the steps of determining the requisite change in visualization, and updating the three-dimensional object. An apparatus for controlling the visualization of a three-dimensional object displayed in virtual reality, augmented reality, or other immersive environment comprising a means of determining the requisite change in visualization, and a means for updating the three-dimensional object. The process may be performed automatically by a system or may be guided interactively by an operator. Applications include, but are not limited to, virtual reality, augmented reality and three-dimensional printing.

A visualization in an immersive environment can be controlled in a variety of different ways in various embodiments. In one embodiment, the model display depth is controlled automatically or by user interaction to display parts of the model not initially visible. The model can either be densely packed (including all information) or a "hollow" model consisting of perimeter information only to a limited depth. This perimeter information can be calculated using negative space exploration. As the user indicates a portion of the model they would like to see deeper, the outer sections of the model are hidden and the underlying data is displayed.

Negative space exploration is don e by selecting an empty starting point at the edge of the model's cartesian space, frequently at (0, 0, 0) [x, y, z coordinate]. Each adjacent coordinate is added to an exploration list provided that the coordinate does not satisfy the search parameter, for example a minimum colour value threshold. When a point is met that satisfied the search parameter, it is added to the objects perimeter array, and in the case of depths greater than one coordinate the depth counter for the angle is decremented. Coordinates satisfying the search parameter are not added to the search list.

Figure 28:
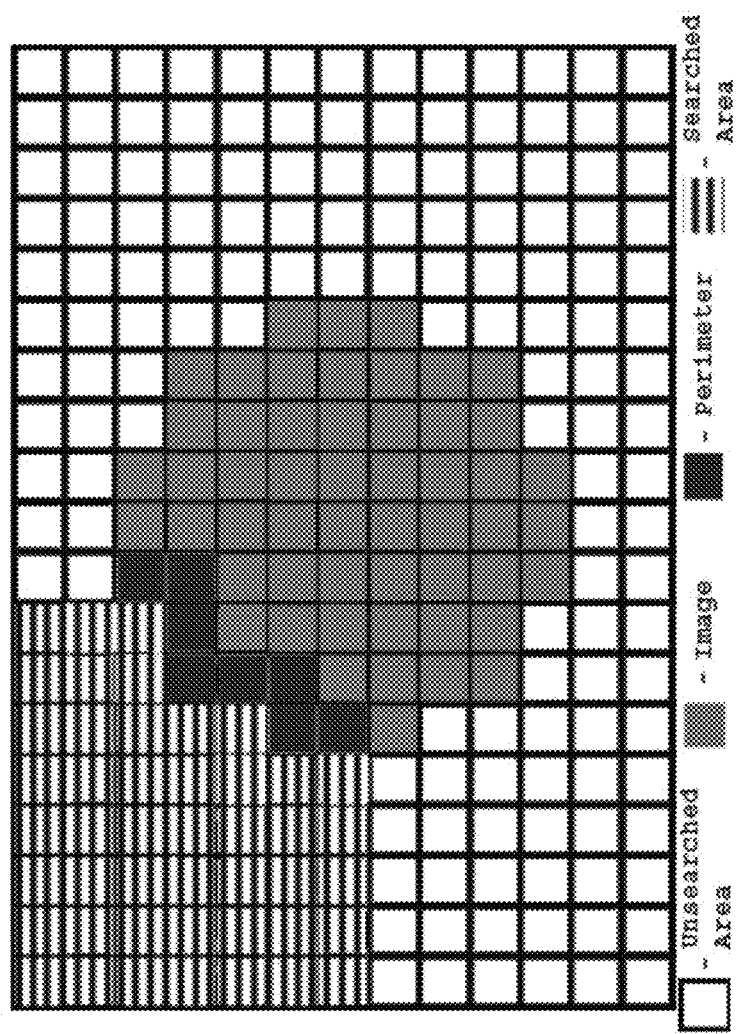
FIG. 28 illustrates an example of negative space exploration.

FIG. 28 shows an example of two-dimensional negative space exploration. The exploration started from the point (0, 0) in the top left corner. Points were added to the searched area (see legend) and adjacent points tested for non-zero (white) values. Along the top left perimeter of the circle (Image, see legend) non-zero points have been found (Perimeter, see legend). These points satisfy the non-zero search parameter and are added to the perimeter array. Therefore, as of the point in time depicted in this figure, the perimeter array contains the points: (8, 3), (8, 4), (7, 4), (6, 4), (6, 5), (6, 6), (5, 6), and (5, 7).

In the case of updating a hollow model, data from the complete model is used to determine the data to be displayed at the new depth location. For example, if the initial depth along the x-plane is 0, and the user has updated the depth to be 10, all coordinates in the existing model with an x-value less than 10 are discarded from the model. Data from the complete model is then added along the x=10 plane of the model. Additionally, data to a given depth can be added. For example, if the depth to be used for the model is 3, data in the range 10<=x<=13 would be added to the visible model.

Another embodiment includes a method for visualizing medical imaging data in augmented reality, virtual reality, or other immersive environment, comprising the steps of locating the subject, determining subject position, determining subject orientation, and rendering the medical imaging data. An apparatus for visualizing medical imaging data in augmented reality, virtual reality, or other immersive environment, comprising a means for locating the subject, a means for determining subject position, a means for determining subject orientation, and a means for rendering the medical imaging data. The process may be performed automatically by a system or may be guided interactively by an operator. Applications include, but are not limited to, visualization for the purpose of surgical procedures, visualization for the purpose of medical testing, visualization for the purpose of surgical training, visualization for the purpose of medical training, visualization for the purpose of physiotherapy, visualization for the purpose of laser surgery, and visualization for the purpose of physical diagnostics.

Locating a subject can be done in a variety of different ways. In one embodiment, features in the subject area are compared to features detected in the target. If the number of matching features is greater than a threshold, determined either automatically or through user or program specification, then the target is deemed a match to the subject and the match location is found. In another embodiment, the perimeter shape of the target can be compared to detected edges in the image. If the number of matching perimeter points exceeds a threshold, either automatically determined or specified by a user or program, then the target is deemed a match to the subject and the match location is found. This process can be applied in three dimensions using, for example, a pre-compiled set of features or perimeter data for different angles and scales of the target. Additionally, the rotation and scale of the target can be determined in real-time during feature or perimeter comparison.

Figure 29:
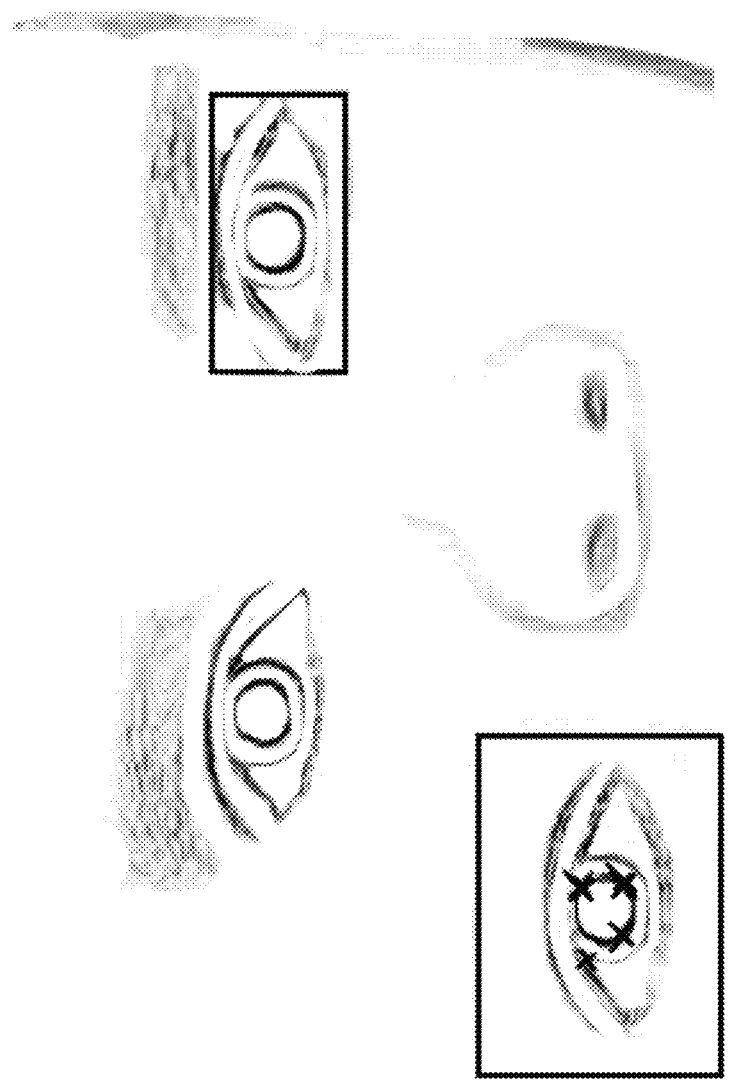
FIG. 29 illustrates an example of sequence matching based on features and/or perimeter.

FIG. 29 shows a target object (bottom left corner, white background) being located and matched in an image. The white X marks on the target object indicate features. These features are matched to features in the subject image to find a positive identification. The perimeter values of the target object are also compared to the subject image to find and/or reinforce the match. The matching area is shown with a black square surrounding it.

The search area within the subject can be further reduced in order to make detection of targets a faster process. One embodiment uses an XOR (exclusive or) method to determine points in the image that have changed, indicating movement of objects within the subject. These motion points are used to guide the search for targets in the subject, reducing the number of data points that need to be examined. These points can optionally be used as replacements for features and/or perimeter data.

In order to determine the XOR based image, the offset between frames is required. To determine the offset between frames, the current subject image is compared to the previously seen subject image. A number of points (n) is selected either automatically, by a user, or as a part of the program. These points are fixed locations in the view frame. By comparing the data in the previous image to the data in the current image, an offset can be determined. One point is selected as a starting point. An area, either predetermined, automatically determined, or selected by a user, is searched for a match to the value of the previous image. The value to be compared can be, for example, a single point value. The value can also be the summation of a Gaussian distribution or other means of calculation. If the value in the current image is found to match the value of the previous image within the given range, then the offset is recorded. Other possible offsets within the range are also recorded. If no possible offsets are found, then another point is selected until either a match is found, or a subsequent match for the offset (see below) is no longer possible.

Figure 30:
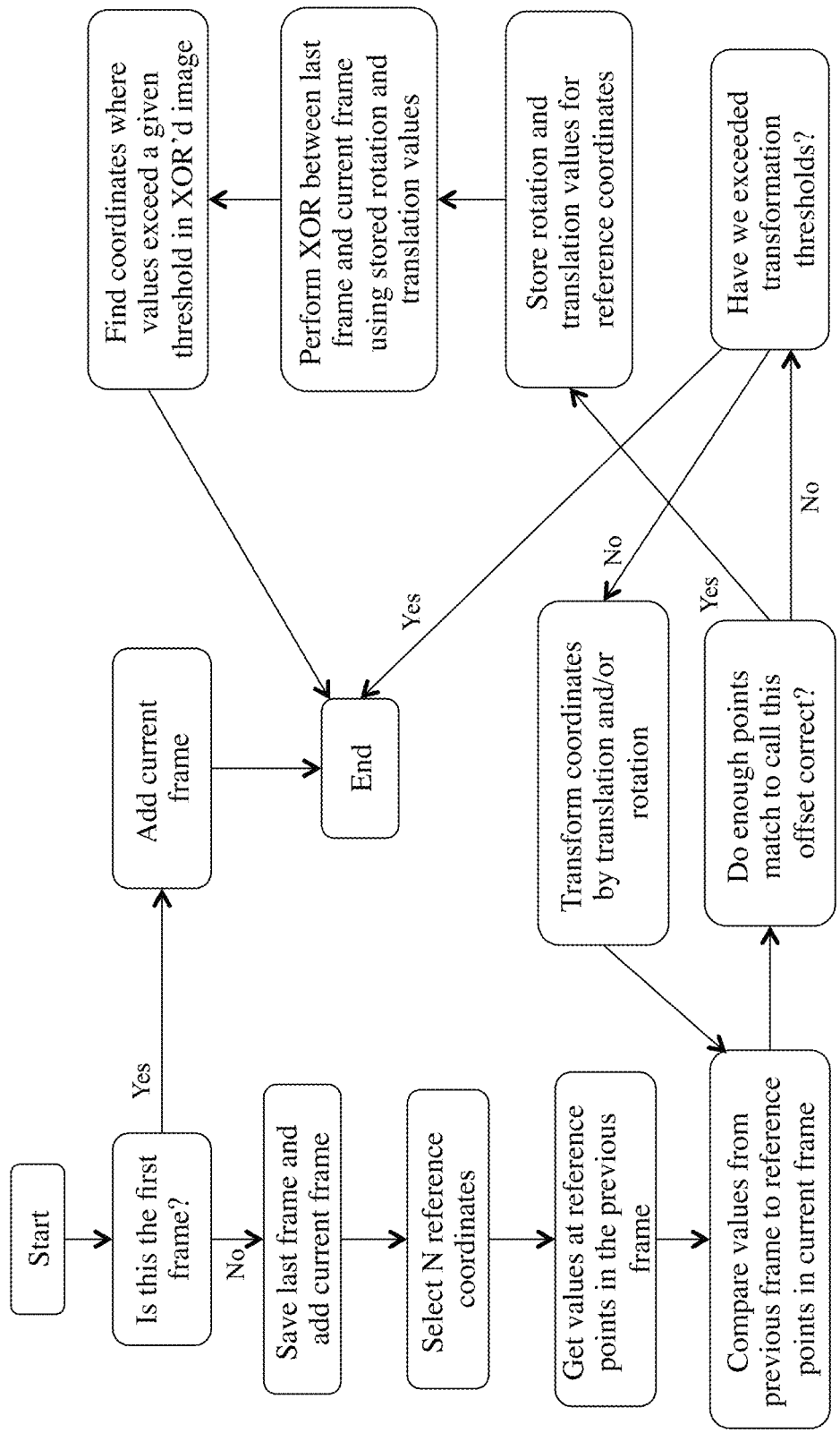
FIG. 30 illustrates an exemplary frame-offset system.

FIG. 30 shows a flow chart for frame offset calculation. The flow begins at Start in the top left corner. If this is the first frame of the sequence (e.g., First image captured from a camera), we simply save the current frame and complete the sequence. If this is any subsequent frame, we store the previous frame and add the current frame. Next, a number of reference points (N) are selected, either at predefined coordinates or by some other means of selection. These reference coordinates are used to retrieve values from the previous frame. The values are stored for later use. The values at the reference coordinates in the current frame are then compared to those taken from the previous frame. If a sufficiently high number of values do not match, then a transformation of coordinates will occur. First, the transformation values are tested to ensure they haven't exceeded thresholds. If they have, the sequence is aborted and no match is found. If they have not, then the translation and/or rotation values are adjusted in a logical fashion to test values within the threshold ranges. The cycle of comparison and adjustment is continued until either the transformation threshold is exceeded and the sequence ends without a match, or a sufficiently high number of values do match and the rotation and translation values are recorded. Using the recorded translation and rotation values, the previous frame and current frame are then combined using an XOR operation, giving a new frame of the same size as the original frames. By finding coordinates within the XOR'd frame that exceed a given threshold, the locations of objects and other moving components of the image become visible.

Once the list of possible points is completed, each of the remaining n points is compared at the same offset. These points are also rotated based on the center of the image and tested. If enough of the points match at the specified offset and rotation, a match is determined to be found. At this point, all of the pixel values in the target image are XOR'd with the subject image, modified by the determined offset and rotation. Points that do not exceed a threshold (either determined by a user, automatically, or predetermined) are removed. This composite image highlights the locations of objects and movements within the subject area.

A feature is determined to exist if a sufficient number of sequential points on a circle at a fixed distance meet a minimum threshold criteria. For example, if the minimum number of sequential points is determined to be 16 and the match requirement is a value greater than 10, then a minimum of 16 points in a row on the circle (calculated based on a variable or fixed distance) must have values greater than 10. If this condition is satisfied, then the center point of the test is deemed to be a feature.

Figure 31:
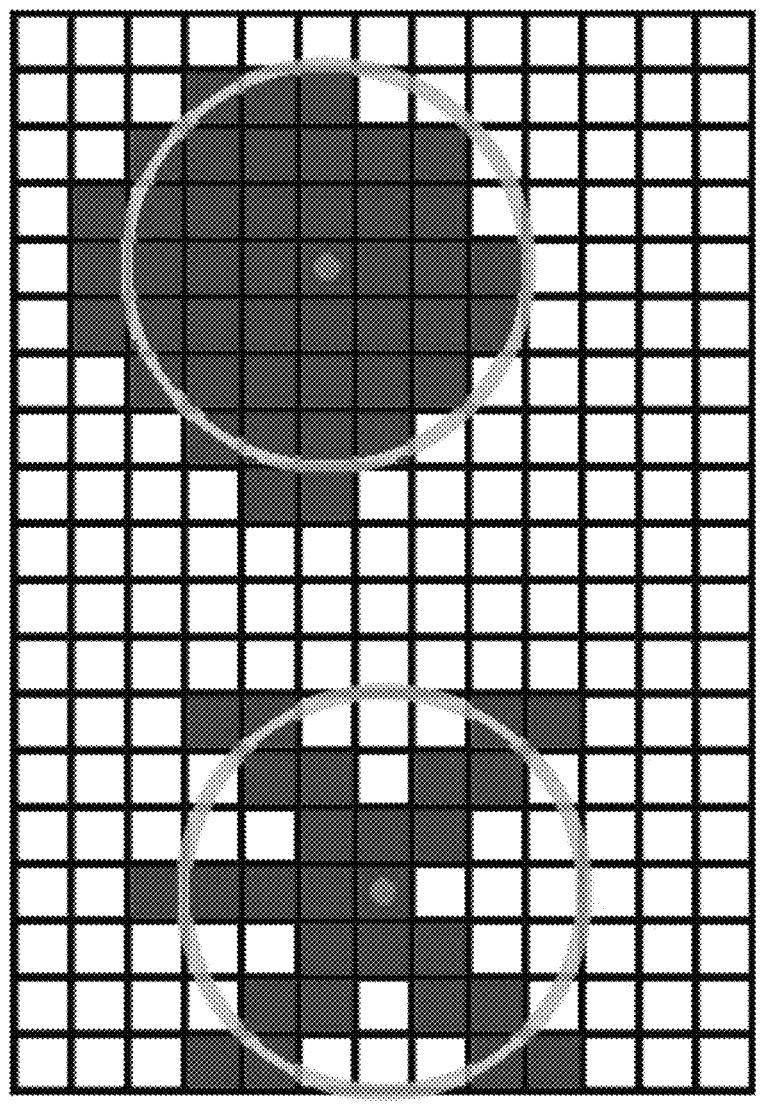
FIG. 31 illustrates an exemplary circular test for two-dimensional features.

FIG. 31 shows feature tests performed in two dimensions on two different points. Using a minimum number of sequential points of 12, the point on the left (center of the left circle) does not pass. There are fewer than 12 points sequentially on the circle that contain a non-white point. The point on the right (center of the right circle) does pass. There are 13 points that are sequentially on the circle surrounding the point.

Feature matching can be done in three dimensions using either planes or a sphere. In the case of a plane, the circle as noted above is calculated on three different planes. The X-Y plane, the X-Z plane and the Y-Z plane. If the feature meets the criteria for all planes, then a match is determined to exist.

Figure 32:
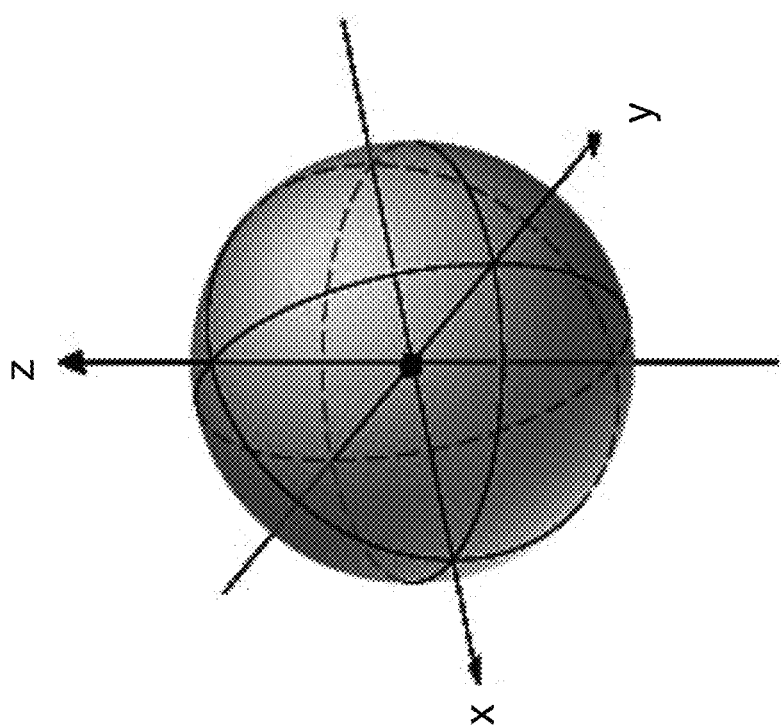
FIG. 32 illustrates an exemplary spherical test for three-dimensional features.

FIG. 32 shows a three-dimensional model of the feature test. The planar circles shown as rings around the outside of the circle represent the circle used on each axis to determine whether the feature is valid. A test is done in each plane—XY, XZ and YZ—and if the feature test is successful in all three planes, then a feature at the center—the black dot at the origin in the figure—is determined to be valid.

The location of the target is stored as both 2D coordinate data for immediate viewing, and 3D coordinate data for reference to movement. Using the matched rotation and scale of the target, the target can be accurately rendered over the matched area in the subject's view. By storing the location in three dimensions, the object can quickly be tested in subsequent frames to confirm its location as the user and target move.

Another embodiment relates to a method for enhancing positional location in augmented reality using gadolinium markers.

Gadolinium is a material commonly used to enhance contrast in MR imaging. By mixing gadolinium with a carrier, a surface can be coated prior to an MR scan. This gives a high contrast image of the coated surface suitable for use in target detection for immersive environments.

For example, a patient is having an MR scan to look for lesions in the brain. The gadolinium infused carrier is spread across the patient's face prior to the MR scan, which creates strong contrast in the patient's face. The enhanced contrast from the patient's face is used to create a digital image of the patient, allowing facial recognition to be used to identify the patient and position a three-dimensional model of the MR scan over the patient's head during a later surgery.

In another example, the gadolinium infused carrier is used as a a marker drawn on the subject, which is visible in the final MR image and can be used for calibration.

Another embodiment is a method of constructing a three-dimensional model comprising the steps of determining image separation distance, identifying missing images, aligning source image and constructing missing image data, and merging the images to form a three-dimensional model.

Images provided in DICOM format contain data indicating the separation distance between slices. This data is used to determine the number of slices required. Absent this data, the lesser of the width and height dimensions of the image are used to determine depth, creating a rectangular model. This value can also be overridden or set by user input to adjust the model to a correct depth.

Missing images are next identified. Automatic identification is done by looking at several factors, including numbering of the image files, content of the image files and validity of the image files. Image files in a sequence are often numbered sequentially. The sequence of numbers is analyzed, and any missing numbers in the sequence are flagged as missing images. The content of images is analyzed, and images missing sufficient data (e.g., An image that is almost or entirely blank) are flagged as missing images. Invalid image files are files that do not open as a valid image of the type being used. Automatic generation of the three-dimensional image treats flagged images as missing. Alternatively, or in conjunction, a user can review and change missing images, as well as flag additional images as missing.

Images are then aligned between frames where required. An image is determined to be out of alignment if the points of the perimeter are out of alignment from both adjacent images. Therefore, if three sequential images have perimeters occupying the same region of the image, adjusted for scale and changes in shape, the images are determined to be aligned. If the image in the center is out of alignment from the adjacent images, the image is adjusted to be in line by comparing features between the images and aligning them. This alignment uses the full image and not just the perimeter.

The final model is created by interpolating missing images. The final number of images required is determined, and the number of images that must be added between each existing image pair. Multiple passes are taken to add the required images. In each pass, one image is added between each existing pair by interpolating the data that exists in the images. Therefore, in a sequence containing 5 images, there will be 9 images after one pass. After a second pass, there will be 16 images. This continues until the desired number of images has been met or exceeded.

Another embodiment is a system for tracking and monitoring a position of a user's body part (e.g., the user's hands)

in augmented or virtual reality environments. In some embodiments, the system comprises a set of at least one sensor attached to a part of the user's body (e.g., the user's hand or hands), a means for reading the at least one sensor, and a means of tracking the position of the at least one sensor in two- and/or three-dimensional space. In some embodiments, the means for reading and the means for tracking comprise a processor.

For example, at least one sensor coupled to a user's hands may provide positional data from a user's hands. The at least one sensor may be included, for example, in a glove or a pair of gloves to detect the positions and/or orientations of the user's fingers, palms, wrists, etc. The at least one sensor gathers information about the position(s) of the user's hands (or portions of the user's hands). A processor is coupled to the at least one sensor, either directly or through an intervening component (e.g., an analog-to-digital converter). For example, the at least one sensor may be coupled to the processor via a wireless connection (e.g., Bluetooth, Wi-Fi, infrared, etc.). The at least one sensor provides, to the processor, information identifying the at least one sensor's location. The processor then processes the information from the at least one sensor to determine positional information associated with the user's hands (e.g., location, orientation, movement, etc. of the fingers, palms, hands, etc.).

FIG. 33 shows a hand in three different positions, with a sensor on each of the pinky finger and thumb, shown in grey. As the pinky and thumb move, the sensor locations are updated. At each frame, the locations in (X, Y, Z) coordinates are shown above.

In a specific example, a user wears a glove equipped with at least one sensor, where the at least one sensor provides position information. For example, the at least one sensor may be a gyroscopic or acceleration sensor. The at least one sensor is communicatively coupled, either directly or through an intervening component (e.g., an analog-to-digital converter) to a processor. The system also includes an immersion device that either includes or is coupled to the processor. One example of an immersion device is a set of augmented reality glasses.

In operation, the at least one sensor provides to the processor information identifying the position of the at least one sensor. The processor then processes the information from the at least one sensor and provides data or instructions to the immersion device. The immersion device renders an immersive environment that includes the position of the user's hand based on the information obtained from the at least one sensor. Thus, through the immersion device, the user is able to see the position of his or her hand (or hands) overlaid over the gloves. As the at least one sensor continues to provide positional information to the processor, the immersion device is able to render the user's movements or gestures while wearing the glove in the immersive environment. Thus, the user's movements and/or gestures made wearing the glove allow the user to interact with augmented reality objects presented by the immersion device. The augmented reality objects may include, for example, menus. Pre-determined gestures may be used to indicate selection, and the position of the hand may be used to determine which item is being selected.

In some embodiments, the immersive environment rendered by the immersion device includes a virtual keyboard, and at least one sensor coupled to a user's hand(s) provides positional information to a processor. Based on the positional information, the processor identifies at least one key on the virtual keyboard that corresponds to a position of the user's finger. The user can then select keys on the keyboard (e.g., letters, numbers, commands, etc.) using the virtual keyboard in conjunction with the at least one sensor.

In some embodiments, the immersive environment rendered by the immersion device includes a virtual computer interface used for, e.g., gaming, productivity, or media consumption, and at least one sensor coupled to a user's hand(s) (e.g., included in a glove) provides positional information to a processor. Based on the positional information, the processor identifies a selection on the virtual computer interface. The user can then interact with the virtual computer interface using the at least one sensor.

Another embodiment relates to a wearable apparatus for full body sensing and feedback comprised of a means for measuring and tracking the wearer's movement, a means for simulating touch senses, a means for sensing objects and surfaces, a means for simulating temperature senses, and a means for restricting user movement.

Sensors and/or actuators as described above can be used to line the inside and/or outside of a full or partial body suit to be worn by a user. Positional sensors as described above can be used to track key points of a user's anatomy in order to determine pose, orientation, position, and/or other metrics.

The sensors can be used to detect touches of surfaces as described above. These sensors can optionally be used to transmit real-time sensory data via the actuators. These sensors can also be used to record sensory data as described above.

The wearable device can also include temperature simulators that can transmit to the wearer recorded sensory data from previous interactions as described above.

The wearable device can also be connected to an augmented reality or virtual reality device and operate in conjunction with the device to simulate objects in that space.

The wearable device can also be connected to a hard drive or other storage medium, either embedded within the device or connected externally. The device can be used to store software, media or other information to be displayed in either an AR/VR context or via sensor replay.

Sensors embedded in the wearable device transmit a signal to a receiver, updating the computer as to the location and position of the sensor at any given time. The data is used to determine a user's position and location as well as relative locations of limbs and other key points of anatomy.

Actuators at the joints of the wearable device can also be used to restrict the movement of a user's limbs or other body parts. By using these actuators in conjunction with virtual or augmented reality, an additional level of realism can be brought to the immersive environment simulation. For example, if a user is touching a virtual table, the actuators could be used to prevent the user from moving their limb in such a way that it passes through the table. The actuators can also be used in conjunction with the movement actuators to provide feedback with increasing pressure as a user pushes against a virtual object.

Figure 34A:
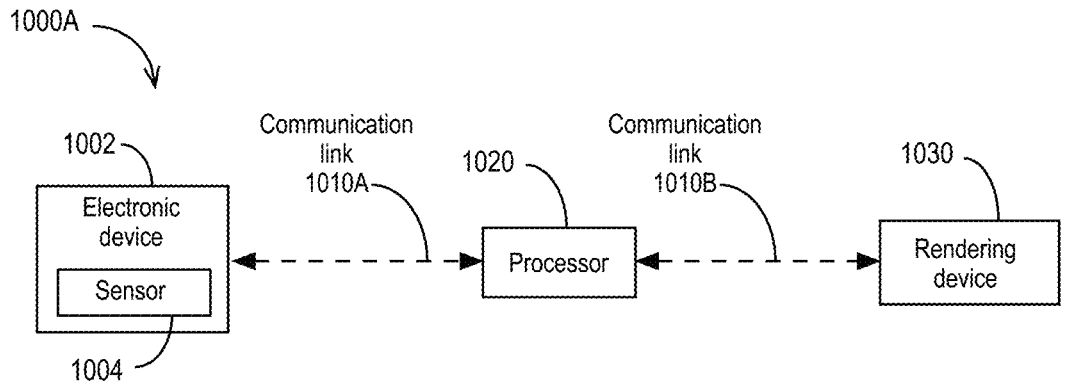
FIGS. 34A-34C illustrate exemplary systems that include at least one electronic device that is configured to be coupled to a body part of a user.
Figure 34B:
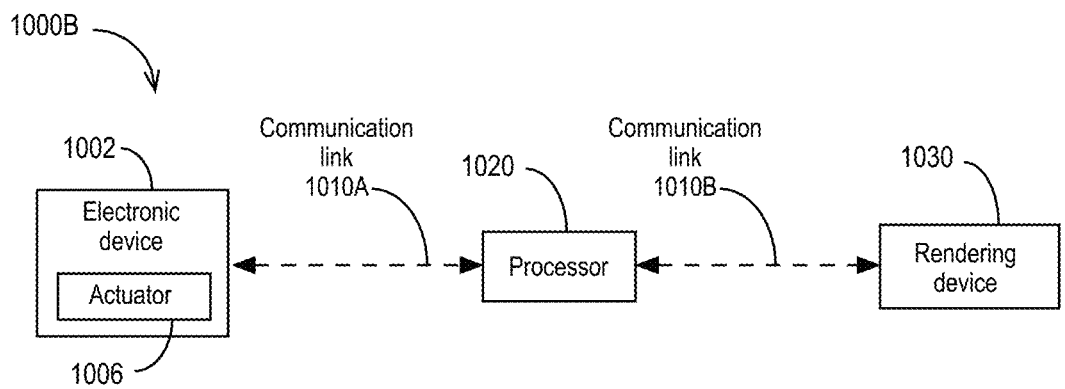
Figure 34C:
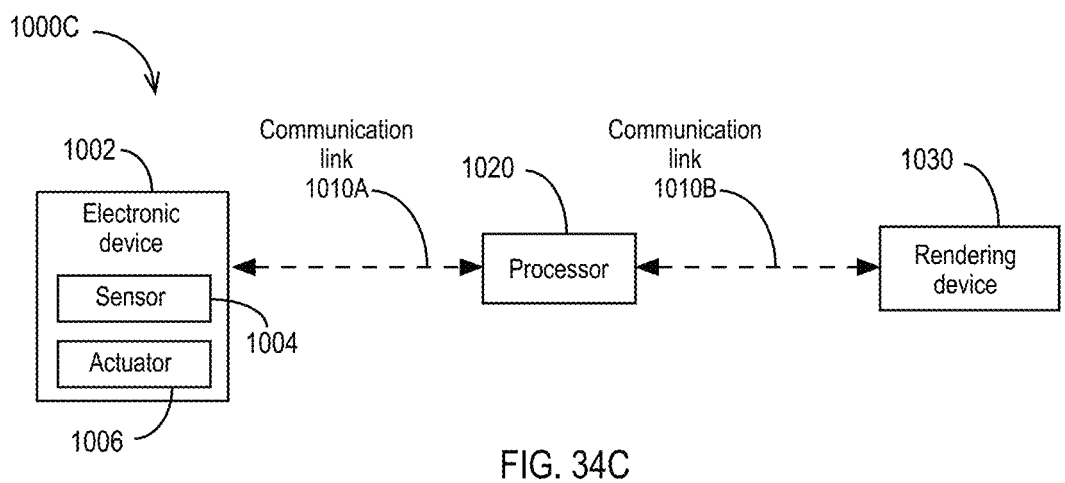

FIGS. 34A-34C illustrate systems 1000A, 1000B, and 1000C for rendering an immersive environment in accordance with some embodiments. The immersive environment may be, for example, an augmented-reality, virtual-reality, enhanced-reality, or immersive-reality environment. For example, the immersive environment may be a clinical environment (e.g., a virtual surgical environment or a therapeutic environment), a gaming environment, or a learning environment. The immersive environment may include a virtual peripheral (e.g., a keyboard, menu, mouse, etc.) to enable a user to indicate a selection or provide an input. The immersive environment may comprise a peripheral enabling the user to communicate over a network (e.g., the Internet) to, for example, read, send, or receive e-mail, conduct a chat session, place a phone call, or engage in peer-to-peer communication.

The system 1000A, 1000B, 1000C includes at least one electronic device 1002 that is configured to be coupled to a body part of a user, where the body part may be, for example, a hand, a head, a neck, an arm, a leg, a foot, an eye, a mouth, a facial feature, or a majority or all of the user's body. As illustrated in FIGS. 34A-34C, the at least one electronic device 1002 includes a sensor 1004 (FIG. 34A), an actuator 1006 (FIG. 34B), or both a sensor 1004 and an actuator 1006 (FIG. 34C). In some embodiments, the at least one electronic device 1002 is a scalpel, pair of glasses, a mask, a hat, or a headgear (e.g., helmet). In some embodiments, the at least one electronic device 1002 is an item attached to or worn by the user. For example, in some embodiments, the sensor 1004 and/or actuator 1006 is attached to or embedded within an item of clothing, such as, for example, a body suit (e.g., covering a portion, substantially all, or all of the user's body), a sleeve (e.g., for an arm or leg), a glove, or footwear. The at least one electronic device 1002 may include components in addition to the sensor 1004 and/or actuator 1006, or it may simply be the sensor 1004 and/or the actuator 1006. The term "electronic device 1002" includes apparatuses that are electronic devices solely because they include or have attached to them the sensor 1004 and/or actuator 1006. Therefore, for example, the items of clothing and apparel listed above are electronic devices 1002.

The system further includes a processor 1020 that is able to communicate over a communication link 1010A with the at least one electronic device 1002. The communication link 1010A may be a wired (e.g., USB, Ethernet, etc.) or wireless (e.g., Bluetooth, Wi-Fi, near-field communication, cellular, infrared, etc.) communication link. The communication link 1010A may be simply a bus or direct electrical connection. The processor 1020 is configured to execute machine-executable instructions that cause the processor 1020 to obtain data from the at least one electronic device 1002 (e.g., data originating from a sensor 1004) and/or provide data to the at least one electronic device 1002 (e.g., data for the actuator 1006 or for controlling the actuator 1006).

As shown in FIGS. 34A-34C, the system 1000A, 1000B, 1000C further includes a rendering device 1030 that is able to communicate over a communication link 1010B with the processor 1020. The communication link 1010B may be a wired (e.g., USB, Ethernet, etc.) or wireless (e.g., Bluetooth, Wi-Fi, near-field communication, cellular, infrared, etc.) communication link. The communication link 1010B may be simply a bus or direct electrical connection. The rendering device 1030 is configured to receive rendering information from the processor 1020 and render the immersive environment based at least in part on the rendering information received from the processor 1020. The rendering device 1030 may comprise a display (e.g., an optical projection system, a monitor, a hand-held device, a display system worn on the user's body, etc.). In embodiments in which the rendering device 1030 comprises a display, the display may be a head-mounted display (e.g., a helmet or harness) that may be coupled to the user's forehead. The rendering device may comprise a contact lens, a virtual retinal display, an eye tap, or a hand-held device. The rendering device 1030 may comprise a pair of glasses. In some embodiments in which the rendering device 1030 comprises a pair of glasses, the pair of glasses comprises a camera that is configured to capture a real-world view, at least one eye piece, and a projector that is configured to render the immersive environment by displaying an augmented or virtual version of the real-world view by projecting an image through or reflected off a surface of the at least one eye piece. In such embodiments, the augmented or virtual version of the real-world view is based at least in part on the rendering information from the processor 1020.

It is to be understood that FIGS. 34A-34C are block diagrams of the systems 1000A, 1000B, and 1000C. Although the at least one electronic device 1002, the processor 1020, and the rendering device 1030 are illustrated separately for convenience of explanation, in an implementation some or all of them may be collocated or combined. For example, the at least one electronic device 1002 and/or the rendering device 1030 may include the processor 1020. As another example, all of the at least one electronic device 1002, the rendering device 1030, and the processor 1020 may be combined in one apparatus.

Figure 35A:
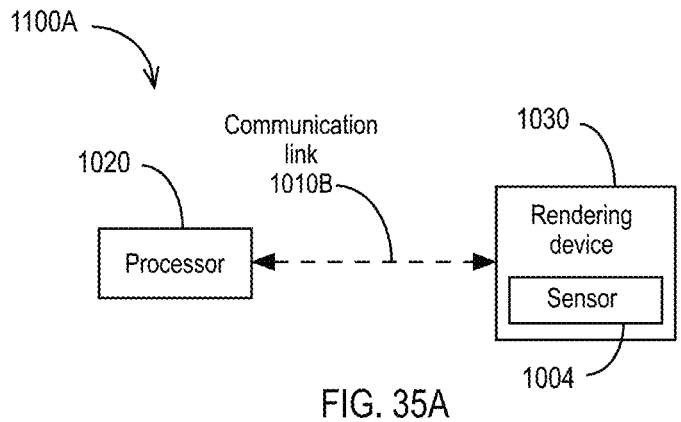
FIGS. 35A-35C illustrate exemplary systems that include a processor and a rendering device.
Figure 35B:
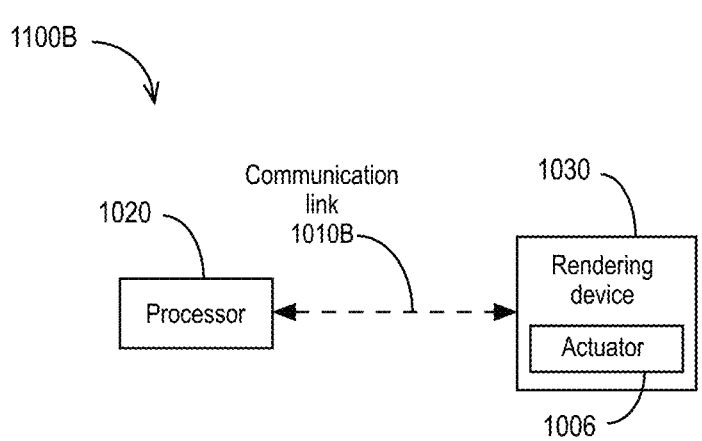
Figure 35C:
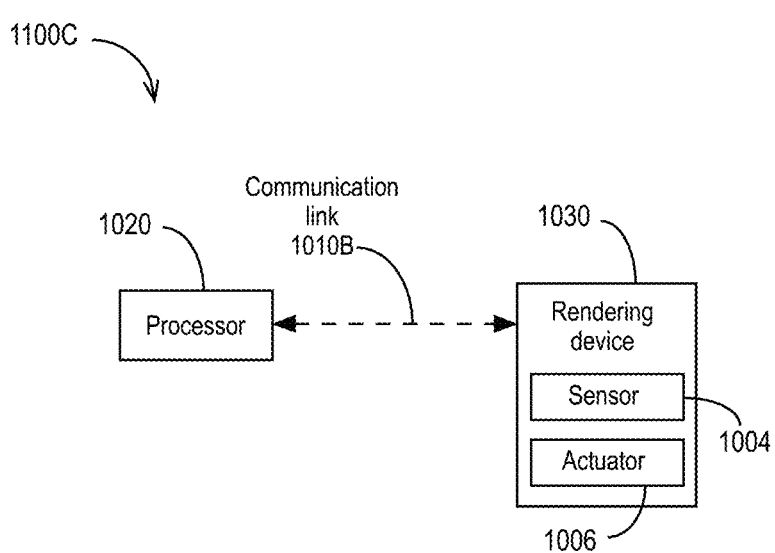

In some embodiments, the system does not include an electronic device 1002, and a rendering device 1030 includes a sensor 1004, an actuator 1006, or both a sensor 1004 and an actuator 1006. FIGS. 35A-35C illustrate systems 1100A, 1100B, and 1100C in accordance with some embodiments. As illustrated in FIGS. 35A-35C, a processor 1020 is able to communicate over a communication link 1010B with a rendering device 1030. The communication link 1010B may be a wired (e.g., USB, Ethernet, etc.) or wireless (e.g., Bluetooth, Wi-Fi, near-field communication, cellular, infrared, etc.) communication link. The communication link 1010B may be simply a bus or direct electrical connection. The processor 1020 is configured to execute machine-executable instructions that cause the processor 1020 to obtain data from the rendering device 1030 and/or provide data to the rendering device 1030 over the communication link 1010B. The rendering device 1030 is able to communicate over the communication link 1010B with the processor 1020. As explained in the context of the embodiments illustrated in FIGS. 34A-34C, the rendering device 1030 is configured to receive rendering information from the processor 1020, and render the immersive environment based at least in part on the rendering information received from the processor 1020. The rendering device 1030 may comprise a display (e.g., an optical projection system, a monitor, a hand-held device, a display system worn on the user's body, etc.). In embodiments in which the rendering device 1030 comprises a display, the display may be a head-mounted display (e.g., a helmet or harness) that may be coupled to the user's forehead. The rendering device 1030 may comprise a pair of glasses. In some embodiments in which the rendering device 1030 comprises a pair of glasses, the pair of glasses comprises a camera that is configured to capture a real-world view, at least one eye piece, and a projector that is configured to render the immersive environment by displaying an augmented or virtual version of the real-world view by projecting an image through or reflected off a surface of the at least one eye piece. The augmented or virtual version of the real-world view is based at least in part on the rendering information from the processor 1020. The rendering device may comprise a contact lens, a virtual retinal display, an eye tap, or a hand-held device.

In some embodiments, the system includes memory coupled to or within the rendering device 1030, and the rendering device 1030 is configured to obtain additional data from the memory and render the immersive environment based at least in part on the additional data. In some embodiments, the system includes an audio reception device that captures a sound (e.g., a voice command from the user, an ambient sound from the real-world environment, etc.) and provides information about the sound to the processor 1020. The rendering information provided by the processor 1020 to the rendering device 1030 is them based at least in part on the information about the sound.

In FIG. 35A, the rendering device 1030 includes a sensor 1004. In FIG. 35B, the rendering device includes an actuator 1006, and in FIG. 35C, the rendering device 1030 includes both a sensor 1004 and an actuator 1006.

It is to be understood that FIGS. 35A-35C are block diagrams of the systems 1100A, 1100B, and 1100C. Although the processor 1020 and the rendering device 1030 are illustrated separately for convenience of explanation, in an implementation they may be collocated or combined. For example, the rendering device 1030 and the processor 1020 may be combined in one apparatus.

In embodiments that include a sensor 1004 (FIGS. 34A, 34C, 35A, and 35C), the sensor 1004 may comprise any kind of sensor that can sense information about or characteristics of an environment. For example, the sensor 1004 may comprise a piezoelectric sensor, a piezoceramic sensor, a dielectric elastomer sensor, a polyvinylidene fluoride sensor, a piezoresistive sensor, a mechanical sensor, or an electrode. The sensor 1004 may comprise a heart rate sensor or a pulse sensor. The sensor 1004 may be attached to or embedded within a glove, partial or full body suit, scalpel, footwear, a pair of glasses, a mask, a headgear, or the user's face.

In some embodiments, the sensor 1004 is a positional sensor to detect a position of the body part of the user. In such embodiments, the processor 1020 obtains data from the at least one electronic device 1002, which is configured to provide the data to the processor 1020. The data represents a position of the body part of the user detected by the sensor 1004. For example, the data may represent an orientation of the body part (e.g., a hand, a finger, an eye, a head, etc.) relative to a real or virtual object (e.g., a patient's body part, an object in a game, etc.). As just a few examples, the data may represent an orientation of the body part relative to a real or virtual peripheral (e.g., a keyboard, a menu, a mouse, etc.). The real or virtual peripheral may enable the user to communicate over a network (e.g., the Internet, a broadband network (e.g., DSL, cable, fiber), or a local network (Wi-Fi, Ethernet, etc.)) for a purpose such as, for example, to access e-mail, conduct a chat session, place a phone call (POTS or VOIP), or engage in peer-to-peer communication. As another example, the data may represent an orientation of the body part relative to a virtual user interface. As another example, the data may represent an orientation of the body part relative to a physical object (e.g., a body part of a patient). As another example, the data may represent an orientation of the body part relative to a virtual object (e.g., an object in a game) in the immersive environment. The rendering information is based at least in part on the data provided by the at least one electronic device 1002 to the processor 1020, which indicates the position of the body part of the user.

In some embodiments that include a sensor 1004, the user is a patient, and the sensor 1004 is ingestible or injectable into the patient. The sensor 1004, which may be, for example, a macro-, micro-, or nano-sensor, provides the data to the processor 1020, and the rendering information comprises information representing a path of the sensor 1004 through the patient. The sensor 1004 may provide the data to the processor 1020 using a radio-frequency, Bluetooth, or Wi-Fi signal. The immersive environment rendered by the rendering device 1030 includes a three-dimensional view of the patient overlaid by a virtual image of the path of the sensor within the patient.

In some embodiments that include a sensor 1004, the user is a patient, and the sensor is configured to detect the patient's heartbeat and provide the data to the processor 1020. The processor 1020 obtains, from memory, information representing an aspect of a reference heart signal and determines the rendering information based at least in part on the patient's heartbeat and the information representing the aspect of the reference heart signal. Optionally, the processor 1020 may compare at least an aspect of the patient's heartbeat to the aspect of the reference heart signal and provide the result of the comparison to the rendering device 1030 in the rendering information. The sensor 1004 may include an indicator (e.g., a light source, a display, a speaker, etc.) to indicate a level of the patient's heartbeat. The sensor may include a microphone. The system may further comprise an electrocardiograph 1060 coupled to the processor 1020, and the processor 1020 may obtain a signal generated by the electrocardiograph 1060 and compare at least an aspect of the signal generated by the electrocardiograph to the information representing the aspect of the reference heart signal.

In other embodiments that include a sensor 1004, the sensor 1004 is a tactile sensor. In such embodiments, the processor 1020 obtains data from the at least one electronic device 1002, which is configured to provide the data to the processor 1020. The data represents a characteristic of an object in contact with the sensor 1004. For example, the characteristic may be a texture, a resistance, a temperature, a hardness, a pressure, a density, a coefficient of friction, or a viscosity of the object. The object may be, for example, a body part of a patient, such as, for example, a prostate, breast, gland, skin, lymph node, abdomen, liver, appendix, gall bladder, spleen, testicle, cervix, knee, head, or shoulder. The rendering information is based at least in part on the data provided by the at least one electronic device 1002 to the processor 1020.

In other embodiments that include a sensor 1004, the sensor 1004 is a haptic sensor. In such embodiments, the processor 1020 obtains data from the at least one electronic device 1002, which is configured to provide the data to the processor 1020. The data represents a characteristic of an object in contact with the sensor 1004. For example, the characteristic may be a texture, a resistance, a temperature, a hardness, a pressure, a density, a coefficient of friction, or a viscosity of the object. The object may be, for example, a body part of a patient, such as a prostate, breast, gland, skin, lymph node, abdomen, liver, appendix, gall bladder, spleen, testicle, cervix, knee, head, or shoulder. The rendering information is based at least in part on the data provided by the at least one electronic device 1002 to the processor 1020.

In other embodiments that include a sensor 1004, the sensor 1004 is a force sensor. In such embodiments, the processor 1020 obtains data from the at least one electronic device 1002, which is configured to provide the data to the processor 1020. The data represents a force applied to the sensor 1004 by an object in contact with the sensor 1004. The object may be, for example, a body part of a patient, such as a prostate, a hand, a foot, etc., or an object in a game. The rendering information is based at least in part on the data provided by the at least one electronic device 1002 to the processor 1020.

In other embodiments that include a sensor 1004, the sensor 1004 is a gyroscopic sensor or an acceleration-detecting sensor. In such embodiments, the processor 1020 obtains data from the at least one electronic device 1002, which is configured to provide the data to the processor 1020. The data represents a change in the position of the body part of the user detected by the sensor 1004. For example, the data may represent a change in the orientation of the body part (e.g., movement of a hand, a finger, an eye, a head, etc.) relative to a real or virtual object. As just a few examples, the data may represent a change in the orientation of the body part relative to a real or virtual peripheral (e.g., keyboard, mouse, etc.), a real or virtual menu, a real or virtual patient's body part, or a real or virtual object in a game. The rendering information is based at least in part on the data provided by the at least one electronic device 1002 to the processor 1020, which indicates the change in the position of the body part of the user.

In some embodiments that include a sensor 1004, the sensor 1004 is a temperature sensor. In some such embodiments, the at least one electronic device 1002 is an item of clothing comprising a temperature sensor 1004 for a user who has a limb without feeling. The sensor 1004 detects a temperature (e.g., of an object in contact with or near the sensor 1004), and either the sensor 1004 or another component of the at least one electronic device 1002 (e.g., a speaker, a transmitter, etc.) generates a signal to notify the user that the object may be causing damage. As a specific example, the at least one electronic device 1002 may be a glove comprising a sensor 1004, where the sensor 1004 is a temperature sensor. When the user touches the burner on a stove, the sensor 1004 or another component of the at least one electronic device 1002 generates a signal (e.g., an electronic signal, an audible signal, etc.) to indicate that the temperature of the burner exceeds a maximum temperature. The signal may be in the form of an alert to the user (e.g., an audible sound, a visual indicator, etc.), or it may be an electronic signal received by an actuator 1006 that removes the user's hand from the burner. As another example, the at least one electronic device 1002 may be footwear comprising a sensor 1004, where the sensor 1004 is a temperature sensor. If the user's feet are exposed to extreme cold, which could potentially cause frostbite, the sensor 1004 or another component of the at least one electronic device 1002 generates a signal (e.g., an electronic signal, an audible signal, etc.) to indicate that the temperature of the burner is below a minimum temperature. The signal may be in the form of an alert to the user (e.g., an audible sound, a visual indicator, etc.), or it may be an electronic signal received by an actuator 1006 that induces movement (e.g., of the user's feet).

In some embodiments that include a sensor 1004, the processor 1020 obtains data (e.g., a command from the user, a characteristic (e.g., texture, resistance, temperature, hardness, pressure, a density, coefficient of friction, viscosity, etc.) of an object (e.g., physical object (e.g., patient's body part) or virtual object (e.g., in a game)) sensed by the user's body part), from the at least one electronic device 1002, which is configured to provide the data to the processor 1020. The processor 1020 sends an instruction to the rendering device, where the instruction is based at least in part on the data provided by the at least one electronic device 1002. The rendering device 1030 renders the immersive environment based at least in part on the instruction.

In some embodiments, the system compares a characteristic of an object in contact with a sensor 1004 with stored information and optionally provides information to the system user regarding whether the object in contact with the sensor 1004 matches or is consistent with the stored information. The stored information may have been generated as a result of the same sensor 1004 having previously been in contact with the same object, or it may have been generated as a result of the same sensor 1004 having previously been in contact with a similar object, or it may have been generated as a result of a different sensor 1004 having been in contact with the same or a similar object. Alternatively, the stored information may have been generated in a manner that is not based on data from any sensor 1004. In some embodiments, the at least one electronic device 1002 includes a first sensor 1004, and the at least one electronic device 1002 is configured to provide data representing a characteristic of a first object that is in contact with the first sensor 1004 to the processor 1020. The object may be, for example, a body part of a patient (e.g., a prostate, a breast, a gland, skin, a lymph node, an abdomen, a liver, an appendix, a gall bladder, a spleen, a testicle, a cervix, a knee, a head, or a shoulder). The characteristic may comprise, for example, a texture, a resistance, a temperature, a hardness, a pressure, a density, a coefficient of friction, or a viscosity. The processor 1020 then obtains, from memory, information representing an aspect of a second object previously in contact with the first sensor 1004 or a second sensor 1004 and compares the first object to the second object based on the data provided by the at least one electronic device 1002 and the information representing the aspect of the second object previously in contact with the first sensor 1004 or the second sensor 1004. In some embodiments, the processor 1020 provides to the rendering device 1030, as the rendering information, information about a result of the comparison.

In embodiments that include an actuator 1006 (FIGS. 34B, 34C, 35B, and 35C), the actuator 1006 may comprise any kind of component that is responsible for moving or controlling a mechanism or portion of the at least one electronic device 1002. The actuator 1006 may be attached to or embedded within a glove, partial or full body suit, scalpel, footwear, a pair of glasses, a mask, a headgear, or the user's face. In some embodiments, the actuator 1006 is embedded in or attached to an article worn by a user (e.g., a glove, a sleeve, a body suit, footwear, etc.), and the actuator 1006 restricts or induces (causes) movement of the user, or it causes the user to experience a sensation. For example, the actuator 1006 may comprise a hydraulic actuator, a pneumatic actuator, an electric actuator, a thermal actuator, a magnetic actuator, a mechanical actuator, a piezoelectric actuator, a piezoceramic actuator, a dielectric elastomer actuator, a polyvinylidene fluoride actuator, an electrostatic actuator, a microelectromechanical (MEMS) actuator, or a magnetorheological actuator. As another example, the actuator 1006 may comprise a pneumatic channel (e.g., tubing, an inflatable segment, etc.) that can be filled with air (or another gas or fluid) to restrict or induce movement, or to cause the user to experience heat or cold, or to cool down the user. As another example, the actuator 1006 may comprise wires (e.g., loose wires or using a wire guides) that restrict or induce gross motor movements (e.g., based on locations of objects in an immersive environment, based on a program or other instruction source, etc.). Such embodiments may be particularly useful when the at least one electronic device 1002 comprises an item worn by the user (e.g., a glove, a sleeve, a body suit, footwear, an exoskeleton, etc.), or the at least one electronic device 1002 is used for resistance training, to assist a user in moving (e.g., walking), etc.

In some embodiments that include in actuator 1006, the at least one electronic device 1002 is configured to receive data from the processor 1020, the processor 1020 is configured to provide the data to the at least one electronic device 1002, and the actuator 1006 is configured to take an action based on the data. For example, the actuator 1006 may restrict or cause movement of the user's body part based at least in part on the data. As another example, the actuator 1006 may emulate a sensation in the user's body part based at least in part on the data. As another example, the actuator 1006 may emulate an aspect of an object (e.g., another person's body, a fluid, a malleable object, an object from a game, etc.) touched by the user's body part based at least in part on the data. The aspect of the object may include, for example, a texture, a resistance, a hardness, a pressure, a density, a coefficient of friction, or a viscosity.

In some embodiments, the at least one electronic device 1002 comprises both a sensor 1004 and an actuator 1006 (see, e.g., FIGS. 34C and 35C). The sensor 1004 detects something, and the at least one electronic device 1002 (or, in the case of FIG. 35C, the rendering device 1030) provides information about what was detected as first data to the processor 1020. For example, as described above, the sensor 1004 may detect a position, location, or orientation of the user or a portion of the user (e.g., relative to a real or virtual object), or it may detect a change in the position, location, or orientation of the user or a portion of the user (e.g., relative to a real or virtual object), or it may detect a characteristic (e.g., a texture, resistance, temperature, hardness, pressure, density, coefficient of friction, viscosity, etc.) of or force applied by an object (e.g., a physical object (e.g., a body part of a patient), a virtual object (e.g., a virtual object in an immersive environment such as a game), another person (e.g., patient), a fluid, etc.) in contact with the sensor 1004. The processor 1020 obtains the first data from the sensor 1004 and provides second data to the actuator 1006. The actuator 1006 is configured to (a) cause or restrict movement of the user's body part based at least in part on the second data, (b) emulate a sensation in the user's body part based at least in part on the second data, or (c) emulate an aspect of the object in contact with the sensor based at least in part on the second data. The rendering device 1030 then renders the immersive environment using the rendering information provided by the processor 1020, where the rendering information is based at least in part on the first data, the second data, or both.

As an example of a system 1000C in which the at least one electronic device 1002 includes both a sensor 1004 and an actuator 1006, or a system 1100C in which the rendering device 1030 includes both a sensor 1004 and an actuator 1006, the sensor 1004 and actuator 1006 may be attached to or embedded in an article (e.g., glove, sleeve, partial or full body suit, footwear, mask, helmet, headgear, pair of glasses, etc.) that is used, for example, in a gaming environment. Assume that the game involves the user walking or wading through a virtual stream, and the sensor 1004 is a positional sensor. The rendering device 1030 renders an immersive environment that is based in part on the user's position relative to the virtual stream, rendering the perceived position of the stream based at least in part on the user's movement. The sensor 1004 detects the user's position and sends, to the processor 1020, as the first data, information about the user's position. As the user approaches the virtual stream, the rendering device 1030 reflects the user's progress toward the virtual stream based at least in part on the rendering information received from the processor 1020. Using the first data provided by the sensor 1004, the processor 1020 monitors the user's position, and, when the user's position coincides with the user "entering" the virtual stream, the processor 1020 provides the second data to the actuator 1006, which then acts to move or restrict the user's movement based on the fact that the user's position coincides with the user entering the virtual stream. For example, the actuator 1006 may be embedded in or attached to a sleeve, sock, or portion of a body suit around the user's leg. The actuator 1006 then causes or restricts movement of the user's legs (for example), and/or emulates the sensation of water flowing over or around the user's legs (for example), and/or emulates the sensation of (for example) the user stepping on a rock or coming in contact with a plant or fish in the virtual stream, and/or causes the user to feel a sensation of (for example) warm or cold to emulate the temperature of the stream.

In some embodiments, the at least one electronic device 1002 comprises an article (e.g., glove, sleeve, full or partial body suit, footwear, etc.) worn by the user, and the sensor 1004 and/or actuator 1006 is attached to or embedded within the article. For example, the article may be a body suit that it a medical/therapeutic suit, a gaming suit (e.g., for use in game playing), or a workout suit (e.g., for use in exercise). In some embodiments including a body suit, the body suit comprises elements (e.g., rods, panels, etc.) to give the body suit a more rigid form. For example, the body suit may comprise an exoskeleton (e.g., a wearable mobile machine that is powered by a system of electric motors, pneumatics, levers, hydraulics, or a combination of technologies that allow for or restrict limb movement). Such embodiments may be particularly useful to assist the user in lifting heavy objects, for strength training, to assist in walking, etc.

In some embodiments in which the at least one electronic device 1002 comprises an article (e.g., glove, sleeve, footwear, suit, etc.) worn by a user, the article comprises a mesh that is selectively used to flatten areas of the suit. Such mesh may comprise, for example, woven piezoelectric fibers, pneumatic tubing, hydraulic tubing, or any other material that becomes rigid and flattens when desired. Such embodiments may be particularly useful, for example, to allow sensing of a flat surface with a consistent depth. In embodiments in which an article worn by a user comprises a mesh, an actuator 1006 may optionally be held in the mesh to maintain relative positioning and allow for an even surface feel.

In some embodiments in which the at least one electronic device 1002 comprises an article worn by a user, the article comprises pneumatic tubing capable of providing cooling within the article worn by the user. Such embodiments allow the user to experience cold sensations from objects in an immersive environment and provide cooling if the user becomes too warm while wearing the article or heating if the user becomes too cold while wearing the article.

Multiple applications exist for embodiments that include articles worn by the user. One such use, for example, is in massage therapy. By recording the sensations of a massage, the massage could then be played back at a later time allowing the user to receive a massage using only the program and wearable device. Another application is using electrical impulses and timing neurological responses for screening out faked injuries as well as timing neural pathways. Another application is in mobility for paraplegic persons. The article worn by the user could, for example, stimulate the spinal nerves using electric impulses allowing a person to walk. Alternately, using voice or another means of control, the wearable device could use actuators and sensors to move the limbs of a person, in effect walking for them.

As another example, the device combined with a display such as virtual or augmented reality, can be used as a personal computer, including but not limited to uses for gaming, productivity and media.

In another example, the device can be used in training students in surgical procedures. The device transmits the resistance and other sensations present during a surgical procedure in conjunction with a virtual or augmented reality environment to give the student a realistic experience of performing the procedure.

In another example, the device can be used in training students to perform a physical examination of a patient. A virtual patient is seen in either virtual or augmented reality, and the sensations of touching the patient are transmitted through the device. This allows for the student to be trained in the methodology of performing a physical examination, including diagnosis of conditions that can be determined through sensory feedback.

In another example, training of coordination and muscle strengthening for patients with conditions such as dysgraphia is done by combining augmented reality with the apparatus. A ball is shown in augmented reality, and the sensations of the ball are transmitted to the user through the apparatus. Resistance is felt through the actuators, allowing the user to practice movement and build muscle strength and control.

In another example, an augmented reality gym is displayed to the user. The actuators simulate the feeling of exercise apparatus and resistance for different weights. This allows the user to do virtual weight exercises without the risk of being injured by the exercise equipment.

In another example, patients with multiple sclerosis, arthritis or other permanent disabilities can be assisted and trained in day to day activities, either through augmented reality or performance of real tasks, with muscular and motor control assistance from the apparatus. The amount of assistance provided can be varied and reduced to allow the user to learn to adjust to their disability without assistance.

In another example, an amputee patient can be assisted by the device in performing day to day tasks, with the assistance being gradually reduced over time to allow the patient to learn to perform their day to day activities without assistance. This can be done either in real world interactions, or in an immersive environment.

In another example, the wearable device can be used for rehabilitative functions, such as assisting paraplegic patients in walking to avoid blood clotting, atrophy and other forms of damage due to inactivity.

Another embodiment is an augmented reality and virtual reality game, in conjunction with the above device, used for assistance in learning to function with dyspraxia. A variety of different activities designed to improve fine motor skills, gross motor skills and motor planning comprise the game. Gross motor skills can be improved, for example, with a simulation of crawling through virtual tunnels. Fine motor skills can be improved, for example, by completing a virtual puzzle with progressively smaller pieces that must be manipulated by hand into the correct positions. Motor planning can be improved by combining motor tasks with mental tasks, such as walking while counting by two's, or catching virtual butterflies while counting them out loud.

Muscle strength can also be trained using the game in conjunction with the disclosed device for actuation and sensing. By creating virtual activities such as rolling a progressively heavier ball up a hill, with actuarial simulation of the resistance of both climbing the hill and pushing the ball, muscle strength can be increased over time.

Another embodiment relates to a method of using sensors to record and replay sensory data to simulate the feel of real world objects. The sensors can be, but are not limited to, haptic sensors, piezoelectric sensors, piezoceramic sensors, dielectric elastomer sensors, polyvinylidene fluoride, and/or piezoresistive sensors. For example, a surgeon could touch a human limb while the sensors record the resistance. The sensor readings can then later be replayed to emulate the feeling of touching the recorded limb. A variety of readings on the same type of subject matter can be used to develop a profile for particular subjects. The profile can then be used to determine whether a surface touched matches an existing profile. This allows for identification of the surface.

The sensors take a reading based on pressure applied. The methods for taking these readings are commonly known among those skilled in the art. Grouping many sensors together in a surface, such as the surface of a glove, allows for a large area to be sensed at once time. By reading the results of these sensors, a profile can be generated for a surface touched by the sensors. Using multiple readings as the sensors move across the surface can give enhanced readings. Differences in pressure between neighbouring sensors assists in determining texture of the surface. Measuring the difference in pressure between sensors assists in determining the surface tension of the surface being touched. Additionally, temperature readings can be taken from the surface and recorded to enhance the recording accuracy.

FIG. 36 shows a series of haptic sensors near/touching a surface. Some of the haptic sensors are touching the surface, and therefore receiving non-baseline readings. The readings from all non-baseline sensors are recorded.

Using recorded surface data, actuators touching a user can be used to replicate the feel of the original surface. The actuators can be, but are not limited to, magnetic actuators, pneumatic actuators, piezoelectric actuators, piezoceramic actuators, dielectric elastomer actuators, polyvinylidene fluoride actuators, electrostatic actuators, and/or magnetorheological actuator. The actuators exert pressure in the pattern recognized in the recording, and adjust as a user moves their hands over a virtual surface. This transmits both texture and surface tension data, allowing for a realistic feel. Temperature can also be replayed from the recording, allowing for a more realistic feeling.

FIG. 37 shows a series of actuators being touched by a user's finger. The actuators being touched are partially actuated to simulate a previously recorded surface sensation.

The sensors can also be used to identify a surface based on a database of recordings. A surface touched is compared to existing recordings to determine whether the profile matches, and if a sufficiently strong match is encountered, the surface can be deemed to be a match.

For example, during an examination of a patient, the sensor device records the feeling of the patient's abdomen. In a subsequent examination, the results of previous sensor readings can be compared to determine if a change has occurred. If a change has occurred, it can then be analyzed and either a diagnosis can be attempted, or the user can be notified that a change has occurred.

Another embodiment relates to a method for using recorded sensory data for training for home and professional diagnostic medicine. For example, a sensory recording of a normal vs. inflamed prostate could be used to teach a doctor to identify the difference in a training environment.

Using sensory data recorded with the aforementioned sensor data, a user can be trained to identify the difference between different types of surfaces in an immersive environment.

For example, a doctor could be trained to identify a prostate with issues by examining a patient in virtual reality using sensor replay feedback.

XIX. Diagnostic/Injury Analysis and Confirmation

Another embodiment relates to a method and apparatus for analyzing injuries and other medical conditions for the purpose of insurance adjusting. Insurance adjusters are often tasked with determining whether a claimant's injury is real or exaggerated. By analyzing a patient using machine-learning algorithms, it can be determined whether a claimant's response to an injury remains the same or varies over time. For example, if a claimant says that they have a knee injury, monitoring their gait as they walk can reveal whether the alteration in their walk is consistent, giving the adjuster a better idea as to the validity of the claim.

Another embodiment relates to a method and apparatus for performing optometric exams using augmented reality, virtual reality or other immersive environments. Optometrists diagnose and determine eye conditions and prescription requirements using a series of tests with A-B comparisons. These tests can be administered in an immersive environment by displaying the tests to the user, and accepting verbal, gesture or other user input responses to make a diagnosis.

Another embodiment relates to a method for analyzing injuries and other such medical conditions for the purpose of insurance adjusting, by comparing symptoms for consistency to ensure validity of claims. When a subject is examined for a subjective injury, the decision as to whether or not an injury is real is made primarily subjectively. By using artificial intelligence (for example machine learning) to analyze video, a subject can be analyzed to determine if differences in the responses to injury amount to a real injury or not. For example, if a subject is claiming compensation for an injured knee, the software is able to determine whether the subject's gait is consistent. While an uninjured patient may be able to convince a person that the injury is real, the software can analyze the motions involved and determine whether they are consistent. Inconsistencies in the response to the injury are a strong indicator that the injury is exaggerated or fake.

Figure 38:
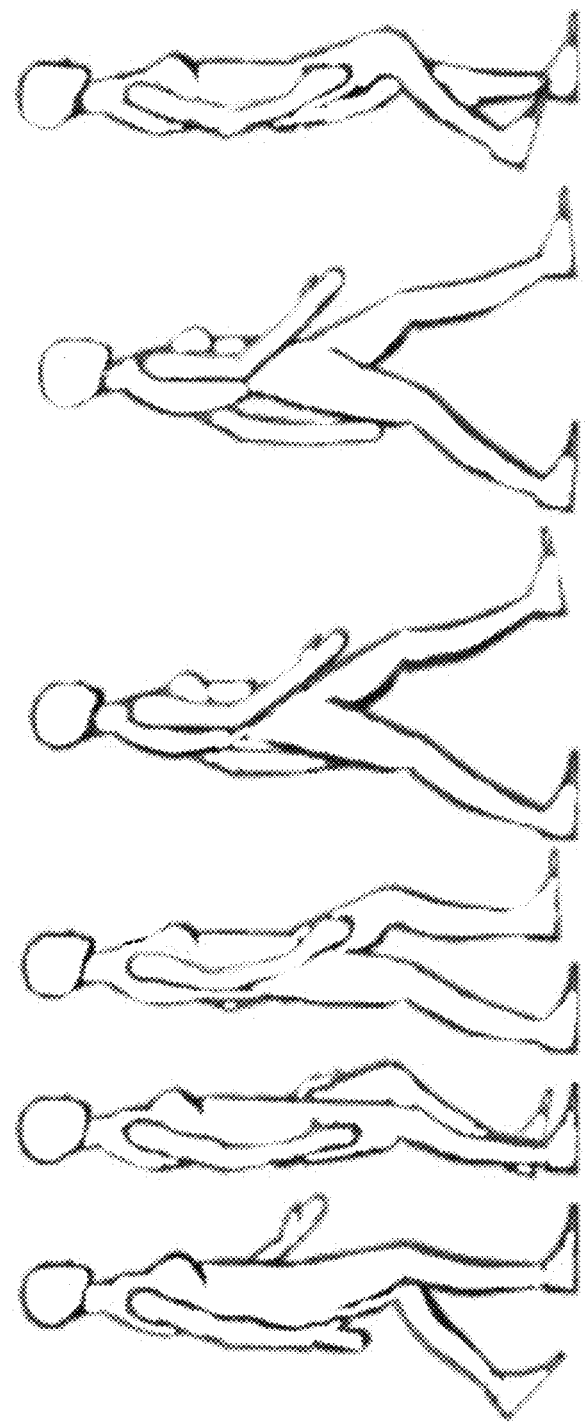
FIG. 38 illustrates an exemplary analysis of a limp and difference between frames to enable detection of a fake limp.

FIG. 38 shows a sequence of a subject walking. By analyzing the angles of the body, such as the knees, hips and ankles, a profile of the subject's walk can be established. By comparing this profile to a subsequently viewed or recorded walk, analysis can be performed to determine if the gait matches the original recording.

Another embodiment relates to a method for doing optometric exams using augmented or virtual reality. Optometric exams are done by asking the patient a series of questions to identify which view is better for the patient. By using an immersive environment to emulate the effects of different prescriptions, a user can interactively select which prescriptions are better for their vision. By responding to different sets of prescriptions, optimal vision can be provided and a prescription determined for the user.

Figure 39A:
FIGS. 39A and 39B illustrate selection between alternative images based, for example, on image blurriness.
Figure 39B:
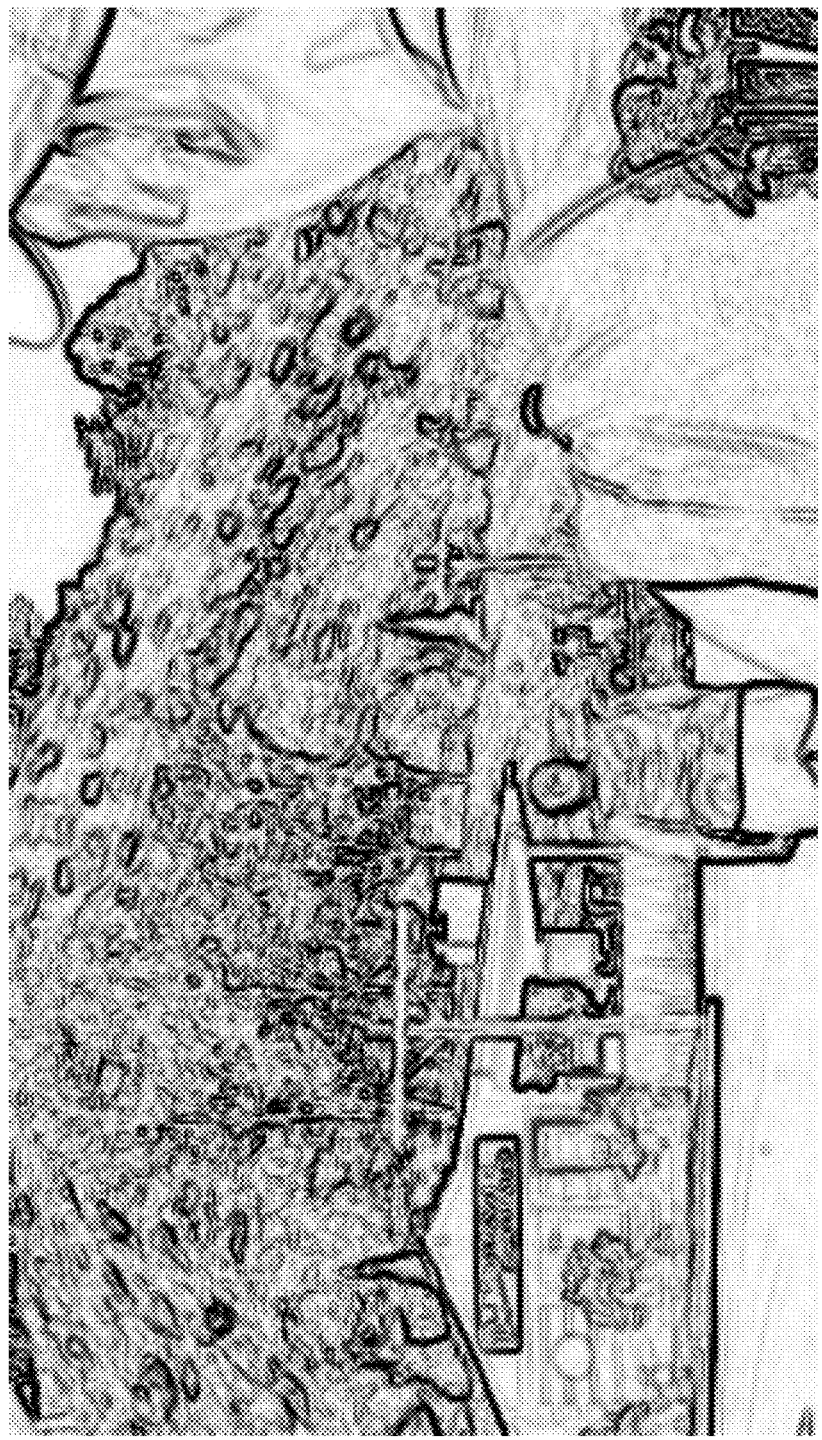

FIG. 39A shows an image that is blurry, the first of two images shown to a user when determining what prescription is better for them. FIG. 39B shows the same image, but not blurry. In this case, the user should select FIG. 39B to indicate that this gives a clearer image.

For example, a user wearing a set of augmented reality glasses can begin an optometric exam in augmented reality. The exam begins by asking the user to read a standard optometric chart. The chart is presented in augmented reality at a standard distance in an immersive environment. The user reads the letters from the requested line of the chart, and the responses are analyzed for accuracy. If the user is unable to correctly read the letters of the chart, then comparison testing is initiated. Emulations of different lens strengths are shown to the user in pairs, with the response to each pair being used to narrow the prescription of the user. When the optimal prescription strength has been determined, the user is presented the chart again, this time filtered by the determined prescription. If the user passes the eye exam at this point, the prescription is determined to be valid and can be presented to the user. The prescription could also be printed or saved.

XX. Surgical Procedure Recording/Playback

Another embodiment relates to a method for recording of medical, dental, or surgical procedures or clinical visits for later playback. Such recordings may be useful, for example, for purposes such as teaching, patient comfort (e.g., being able to view his or her own surgery after the fact to verify that nothing unexpected happened while the patient was under anaesthetic), distance learning/observation, problem tracking (e.g., to determine whether anything occurred during a procedure or visit that could explain an unexpected ailment or pain), etc. The recording creates a record of a procedure or visit and may be of interest to insurance companies, patients, doctors/clinicians/dentists giving a second opinion, students, etc.

Recording of a medical, dental, or surgical procedure or clinical visit using a wearable device including virtual components allows for later playback. This recording can be used for, but is not limited to, evidence in legal actions (e.g., malpractice or wrongful death lawsuits), training of students, review of procedures, and/or audits.

The recording is done by conventional video recording, coupled with a recording of the virtual objects and their positions during the course of the recording. Audio recording may also be performed. Playback is accomplished by simultaneously playing the video recording with an augmented overlay showing the virtual objects and positions.

VIII. AR/VR Facilities

Another embodiment relates to a method for sharing data between devices in an immersive environment in a group environment.

Another embodiment relates to a method for conferencing between practitioners and/or users in an immersive environment.

Another embodiment also a method for identifying inflammation and other hot spots in an immersive environment.

Another embodiment also a method and apparatus for displaying full field-of-view images in an augmented reality environment.

Another embodiment also a device for displaying an augmented reality environment.

Another embodiment also a method for sharing data between devices in an immersive environment in a group environment.

Another embodiment relates to a method for sharing the display of an augmented reality environment comprising the steps of encoding data from a camera or other imaging device into a transmissible format, transmission of augmented reality object data, transmission of augmented reality target locations, scales and orientations, synchronization of video and augmented reality target data and display of a combined video and augmented reality image. For example, live streaming an augmented reality view from one user or location to a virtual reality receiver at another location.

Encoding data from a camera or other imaging device can be accomplished in a variety of ways by those skilled in the art. In one such example, the MPEG system of compressing video is used. MPEG allows for minimal data transmission by encoding only the differences between camera frames.

Augmented and virtual reality objects can be composed in a variety of different ways by those skilled in the art. There exist several standardized formats for storing three-dimensional models, such as, but not limited to, the 3DO (Three-dimensional object) file. By converting virtual objects into a format such as 3DO and optionally compressing the data using common compression methods, the model data can be quickly transmitted to other clients connected to the simulation. Textures used to cover the three-dimensional models are also transmitted in a compressed image format. An example of one such format is the PNG, or portable network graphic, format whose algorithm is commonly known.

The transmission of augmented reality data can be accomplished by sending a video frame encoded to include unique identification numbers informing the client computer which objects are present in the present scene, their locations, orientations scales. These locations, orientations and scales are all normalized to allow for accurate reproduction in the client display. This normalization accounts for differences in resolution, aspect ratio and other aspects of the display device. Synchronization is handled between the objects and the image by providing the object data with each frame, such that a missed or skipped frame does not cause an error in the visualization. If an object that is not known to the client is encountered, the client initiates a request to the host for the object data. The object is omitted until the data is received by the client, which happens asynchronously over the connection.

When the client receives an image frame, with or without the three-dimensional object data, the display is shown to the client as a composite image. The image data is displayed on the display device with the augmented reality objects added in their respective locations. Missing objects are skipped and requests are sent to the host for the missing objects data files. If the files are unavailable, the client is informed such that repeated requests for invalid objects are not made.

The client can also interact with the objects in augmented or virtual reality, allowing for a shared simulation environment. Interactions are sent over the network from host to clients or from clients to host. In the case of conflicting movements, the host is deemed to have priority and the client interactions will be ignored.

In another embodiment, clients and hosts can have the same objects with different locations, orientations and scales, allowing a client to interact differently with objects than the host. In these cases, the objects that are out of synchronization are noted by the client and the requests from the host that affect that object are ignored. Optionally, the host or client can have the option to force synchronization of one or multiple objects, which will bring back into alignment the locations, orientations and sizes of the objects. This is particularly useful, for example, in a learning environment where a teacher is showing a particular virtual object to a class. Each student can then interact on their own with the object to examine it, and when the teacher wishes to continue the lesson they can force resynchronization of the virtual object.

Data can be shared between devices and displayed in an immersive environment to users in separate locations. This data is transmitted via a network or other means of wireless or wired communication. The data can then be used to share interactions between different locations and users.

For example, a group of doctors could do a virtual consultation of a patient where one device is present with the subject, and each doctor or group of doctors have a device for viewing the immersive environment. Communication and interaction is possible by each user involved in the environment.

Another embodiment is a method for conferencing between practitioners in an immersive environment.

Live conferencing can be accomplished between devices by transmitting video as well as virtual object definitions and positions. When the connection is first established, definitions for virtual objects existing in the scene are transmitted. Once these definitions have been transmitted, the objects can be identified with unique identification numbers. These identification numbers can be provided combined with positional, scalar and orientation information to allow for display of the object.

Multiple clients can connect to the conferenced immersive environment, and can optionally communicate via audio, text or other known means of communication available over a network. These conferences can be used, for example (but not limited to), live viewing of procedures, assistance from another client during a complicated procedure, and teaching by example.

Another embodiment relates to a method for identifying inflammation and other hot spots in an immersive environment.

By monitoring infrared information, inflammation of joints, soft tissue injuries and other such injuries can be detected. This information can also be used to gather data such as heart rate.

For example, using infrared viewing technology, a physiotherapist can look at a patient and determine where soft tissue injuries exist that may need relief or avoidance during treatment.

As another example, a chiropractor could examine a patient using the infrared view to determine where injuries are and to assist in pain relief and adjustment of spinal alignment.

Another embodiment relates to a method and apparatus for displaying full field-of-view images in an augmented reality environment. Augmented reality images can be displayed across the entire field-of-view (FOV) of the user's eye. By displaying an augmented reality image across the full FOV of the user's eye, a more immersive and believable augmented reality environment can be created. One method for displaying such an immersive augmented reality environment is to use a transparent LCD or LED display module, curved to fill the user's FOV. Another method for providing such an environment is to use retinal projection. By using a photon source, such as (but not limited to) a laser diode, images are projected directly onto the retina of the user. Optionally, by tracking the position of the pupil, the photon source can be maneuvered to remain coplanar to the pupil, and therefore to the retina.

The required resolution to display can also be reduced by using properties of the human eye. In the human eye, a small area called the fovea exists wherein the eye has only receptor cones, and no rods. This area of the eye is responsible for providing fine detail to the center of vision. By ensuring that the fovea receives high-resolution imagery, the remaining area of the eye can be provided with lower resolution information that will be undetectable to the eye, but will allow for much faster rendering of the subject image. The human eye has an approximate FOV of 160 degrees in width and 135 degrees in height. The fovea accounts for approximately 1-2 degrees in width and height at the center of the eye. This region is capable of seeing much greater resolution than the surrounding eye, with acuity being reduced the further from the fovea the image is presented.

Augmented reality can also be presented using curved lenses. By adhering or affixing in place one or more curved panes, a display can be presented on while still allowing viewing through the panes. Layers can be stacked with each layer representing a set of points. Transparent prisms or other transparent means of changing the angle of light passing through the medium are used to alter the path of light projected into the layer. The prisms or other means of changing the angle of light are staggered such that one can be targeted without passing through any other.

Figure 40:
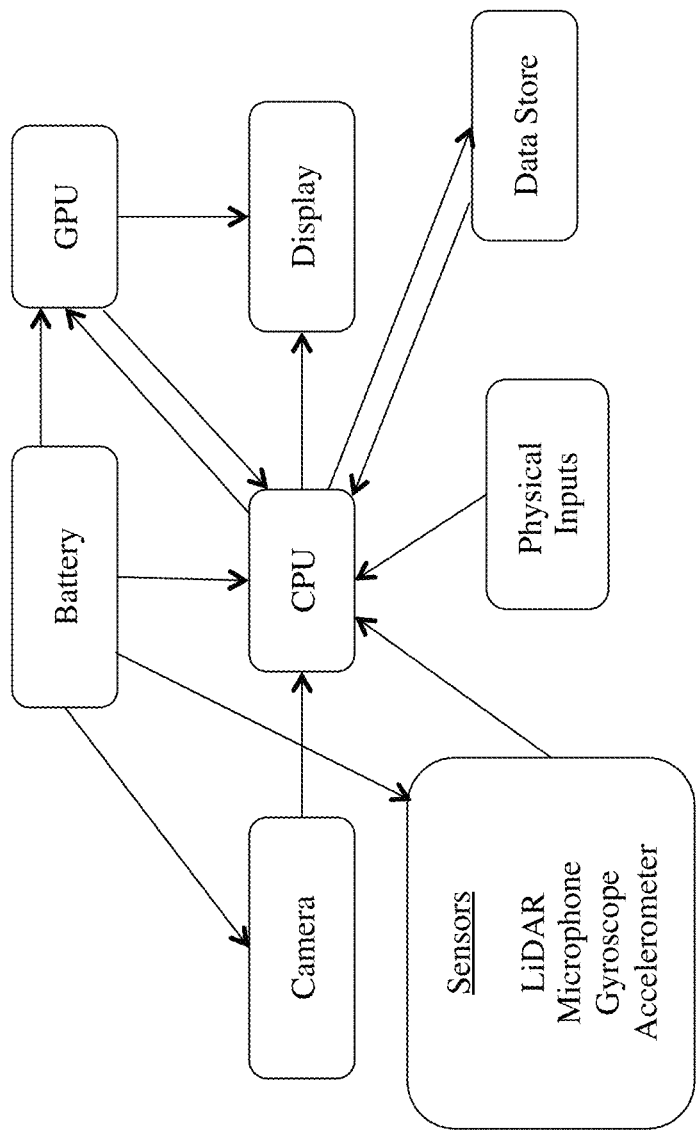
FIG. 40 illustrates an exemplary device for an augmented reality display.

Another embodiment (FIG. 40) relates to a device for an augmented reality display. The augmented reality device is composed of a display device, such as outlined above, an audio capture device, a monaural or stereo audio output device, a CPU, a GPU, and one or more high definition cameras. The embodiment can also optionally include a LiDAR system. The embodiment can also optionally include infrared sensors, including but not limited to FLIR.

In one embodiment, the device uses a single high definition camera to capture the environment.

In another embodiment, the device uses two high definition cameras. One faces the user to track their eye movements and positions, while the other is used to capture the environment.

In another embodiment, the device uses two high definition cameras to capture the environment in a binocular fashion.

In another embodiment, the device uses three high definition cameras, with one camera facing the user to track eye movements and positions, while the other two cameras are used to capture the environment in a binocular fashion.

In another embodiment, the device uses three high definition cameras, with two cameras facing the user, and one camera used to capture the environment. The cameras facing the user are each used to track eye movements and positions of a single eye.

In another embodiment, the device uses four high definition cameras, with two cameras facing the user and two cameras used to capture the environment in a binocular fashion. The two cameras facing the user are each used to track eye movements and positions of a single eye. The cameras facing externally and internally are synchronize to ensure that the view is consistent.

Any of the various methodologies disclosed herein and/or user interfaces for configuring and managing the disclosed apparatuses and systems may be implemented by machine execution of one or more sequences of instructions (including related data necessary for proper instruction execution). Such instructions may be recorded on one or more computer-readable media for later retrieval and execution within one or more processors of a special purpose or general-purpose computer system or consumer electronic device or appliance, such as the various system components, devices and appliances described above (e.g., programmed processor(s) 1020 as shown in several of the drawings herein). Computer-readable media in which such instructions and data may be embodied include, but are not limited to, non-volatile storage media in various non-transitory forms (e.g., optical, magnetic or semiconductor storage media) and carrier waves that may be used to transfer such instructions and data through wireless, optical, or wired signalling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, numbers of components (cameras, projections, sensors, etc.), component circuits or devices and the like can be different from those described above in alternative embodiments. Additionally, links or other interconnection between system components or functional blocks may be shown as buses or as single signal lines. Each of the buses can alternatively be a single signal line, and each of the single signal lines can alternatively be buses. Signals and signalling links, however shown or described, can be single-ended or differential. The term "coupled" is used herein to express a direct connection as well as a connection through one or more intervening circuits or structures. Device "programming" can include, for example and without limitation, loading a control value into a register or other storage circuit within the device or system component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

It should be noted that the various circuits disclosed herein may be described using computer aided design tools and expressed (or represented), as data and/or instructions embodied in various computer-readable media, in terms of their behavioural, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, numbers of components (cameras, projections, sensors, etc.), voltages, pixel array sizes, signal path widths, signaling or operating frequencies, component circuits or devices and the like can be different from those described above in alternative embodiments. Additionally, links or other interconnection between system components, functional blocks, integrated circuit devices, or internal circuit elements or blocks may be shown as buses or as single signal lines. Each of the buses can alternatively be a single signal line, and each of the single signal lines can alternatively be buses. Signals and signalling links, however shown or described, can be single-ended or differential. The term "coupled" is used herein to express a direct connection as well as a connection through one or more intervening circuits or structures. Device "programming" can include, for example and without limitation, loading a control value into a register or other storage circuit within the device or system component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, phrases of the form "A or B" are to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The drawings are not necessarily to scale, and the dimensions, shapes, and sizes of the features may differ substantially from how they are depicted in the drawings.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

The following non-exhaustive methods, systems and system components are disclosed herein:

A method for providing an augmented or virtual reality surgical overlay, comprised of elements including, but not limited to, heads-up-display (HUD), medical imaging display, vital statistics display, patient information display, procedural information and other data.

A method for displaying surgical targets and other pertinent medical and/or anatomical data in an augmented or virtual reality surgical environment.

A method for providing an augmented or virtual reality surgical overlay for laparoscopic procedures, comprised of elements including, but not limited to, mapping of laparoscopic device path, display of laparoscopic device position, display of laparoscopic imaging data, and system for taking notes generally and related to specific points.

A method for providing an augmented or virtual reality anatomical display, comprised of elements including, but not limited to, anatomical diagramming and labelling, veterinary anatomy, and dissection simulations.

A method for combining gross anatomy with problem based learning (PBL).

A method for providing an augmented or virtual reality medical simulation, comprised of elements including, but not limited to, diagnostic simulations, surgical simulations, procedural simulations, previewing surgeries based on patient imaging, and group simulations for purposes such as teaching.

A method for providing an augmented or virtual reality view for cosmetic surgical usage, comprised of elements including, but not limited to, patient previews, verification of results, and assistance during surgery.

A method for displaying a heads-up display (HUD) in augmented or virtual reality composed of two or three-dimensional images superimposed on or integrated into the environment being viewed.

A method for providing an augmented or virtual reality display for orthodontic use, comprised of the ability to display previews of orthodontic work, a method for showing future tooth alignments and positions, a method of determining shapes and sizes of dental devices, and a method of generating data files of dental devices for 3D printing.

A method for mapping and analyzing human bodies, comprised of scanning of the body, storing of surface data, marking of important features such as melanoma, moles, rashes, other skin conditions and remarkable features (either automatically or by human interaction).

A method for timing MR imaging based on position of the patient's body, for example using the height of the chest to ensure that images are taken at the same point during the breathing process to give a more stable image.

A method for analyzing injuries and other such medical conditions for the purpose of insurance adjusting, by comparing symptoms for consistency to ensure validity of claims.

A method of using augmented or virtual reality combined with artificial intelligence for the purpose of testing and teaching materials to students.

A method of using sensors to record and replay sensory data to simulate the feel of real world objects. For example, a surgeon could touch a human limb while the sensors record the resistance. The sensor readings can then later be replayed to emulate the feeling of touching the recorded limb. A variety of readings on the same type of subject matter can be used to develop a profile for particular subjects. The profile can then be used to determine whether a surface touched matches an existing profile. This allows for identification of the surface.

A method for using recorded sensory data for training for home and professional diagnostic medicine. For example, a sensory recording of a normal vs. inflamed prostate could be used to teach a doctor to identify the difference in a training environment.

A method for doing optometric exams using augmented or virtual reality.

A method for using augmented reality in laser eye resurfacing (LASIK) surgery.

A method for using augmented or virtual reality for psychological desensitization of phobias, for example fear of spiders could use monitoring of vital signs to determine the user's level of stress and either increase or decrease exposure to spiders in an immersive environment to help a user get over a specific phobia.

A method and apparatus for psychological treatment using a virtual person.

A method for augmented or virtual reality simulation for the purpose of training a user in first aid.

A method for doing intelligence quotient testing using augmented or virtual reality.

A method for assisting psychiatric and psychological patients using a reactive augmented or virtual reality.

A method for determining psychosis and phobias in patients using vital signs tracking combined with augmented or virtual reality stimuli.

A method for diagnosing trauma victims using augmented or virtual reality combined with vital signs measurements in order to determine sources of potential past or current traumas. For example, if a child is abused, using simulated images that may mimic situations similar to those experienced by the child and monitoring their vital signs can help to determine whether trauma is present, particularly in cases where the patient is unaware or unwilling to discuss the events.

A method for diagnosing epilepsy using EEG or MEG and vitals sensing, light events and other such stimuli in virtual or augmented reality to monitor responses.

A method for using pupil dilation, eye movement and pupil location for determination of response to stimuli, detecting fabrication in stories, and other such vital signs detection.

A method for interpreting raw MRI signal data into composite three-dimensional models for use in virtual reality, augmented reality, and 3d printing applications.

A method for controlling the visualization of a three-dimensional object displayed in virtual reality, augmented reality, or other immersive environment comprising the steps of determining the requisite change in visualization, and updating the three-dimensional object. An apparatus for controlling the visualization of a three-dimensional object displayed in virtual reality, augmented reality, or other immersive environment comprising a means of determining the requisite change in visualization, and a means for updating the three-dimensional object. The process may be performed automatically by a system or may be guided interactively by an operator. Applications include, but are not limited to, virtual reality, augmented reality and three-dimensional printing.

A method for visualizing medical imaging data in augmented reality, virtual reality, or other immersive environment, comprising the steps of locating the subject, determining subject position, determining subject orientation, and rendering the medical imaging data. An apparatus for visualizing medical imaging data in augmented reality, virtual reality, or other immersive environment, comprising a means for locating the subject, a means for determining subject position, a means for determining subject orientation, and a means for rendering the medical imaging data. The process may be performed automatically by a system or may be guided interactively by an operator. Applications include, but are not limited to, visualization for the purpose of surgical procedures, visualization for the purpose of medical testing, visualization for the purpose of surgical training, visualization for the purpose of medical training, visualization for the purpose of physiotherapy, visualization for the purpose of laser surgery, and visualization for the purpose of physical diagnostics.

A method for enhancing positional location in augmented reality using gadolinium markers.

A method and apparatus for constructing a three-dimensional model comprising the steps of determining image separation distance, identifying missing images, aligning source image and constructing missing image data, and merging the images to form a three-dimensional model.

An apparatus for tracking and monitoring positions of users' hands in augmented or virtual reality environments, comprised of a set of sensors attached to the user's hands, a means for reading the sensors, and a means of tracking the positions of the sensors in two and/or three-dimensional space.

A wearable apparatus for full body sensing and feedback comprised of a means for measuring and tracking the wearer's movement, a means for simulating touch senses, a means for sensing objects and surfaces, a means for simulating temperature senses, and a means for restricting user movement.

A method for sharing data between devices in an immersive environment in a group environment.

A method for recording of surgical procedures for later playback.

A method for conferencing between practitioners in an immersive environment.

A method for teaching students using augmented or virtual reality combined with artificial intelligence.

A method and apparatus for displaying full field-of-view images in an augmented reality environment.

An apparatus for an augmented reality display.

A method of sensing and displaying liposuction data, including but not limited to, volume of material removed from the patient, and mock-ups of post-surgical results.

A method and apparatus for detecting fluid using a hygrometer attached to a cannula.

A method for tracking a positional sensor ingested by a patient and tracked via augmented or virtual reality overlay.

A method and apparatus for adaptive radiation shielding for radiation therapy using augmented reality to direct the location and size of the exposure aperture.

A method and apparatus for adaptive radiation shielding comprising a membrane or other container filled with a lead suspension solution. Additional membranes can be added to the apparatus containing solutions such as a ferromagnetic solution.

A method for creation and printing of three-dimensional models for prosthetics.

A method and apparatus for magnetic resonance imaging comprised of a standard MRI machine with the RF frequency coil replaced by multiple coils operated independently or in a synchronized fashion in order to generate an improved MR image.

A method for using customized RF coils in MR imaging in order to create images with higher signal to noise ratios and higher contrast.

A method for analyzing MR images with a moving patient for diagnostic purposes.

A method for interacting with an immersive environment using cerebral activity monitoring.

A method for magneto-stabilization of patient anatomy.

A method for separating healthy tissue from cancerous tissue.

A method for identifying microscopic skin conditions using a high definition camera.

An apparatus for auditory cardiographic analysis.

An apparatus for rapid tracing and interpretation of cardiographic rhythm anomalies.

A method for identifying inflammation and other hot spots in an immersive environment.

A method and apparatus for performing automated or user-diagnostic procedures.

A method for voice recognition used to translate speech between patients and practitioners in order to facilitate communication.

A method for analyzing speech in a practitioner and patient environment to assist in diagnosis and verify plausibility of identified diagnoses.

We claim:

1. A system for rendering an immersive environment, the system comprising:
   an item of clothing worn by a user, comprising:
      a mesh having a selective rigidity, the selective rigidity allowing the mesh to transition from being in a malleable state to being in a rigid state, and
      at least a sensor and an actuator, wherein the actuator is situated in the mesh;
   a processor capable of being communicatively coupled to the sensor and to the actuator; and
   a rendering device capable of being communicatively coupled to the processor, wherein:
   the processor is configured to execute machine-executable instructions that, when executed by the processor, cause the processor to:
      obtain first data from the sensor, the first data at least identifying a position or orientation of at least one body part under the item of clothing, and
      provide second data to the actuator, and
   the rendering device is configured to:
      receive rendering information from the processor, the rendering information identifying the position or orientation of the at least one body part under the item of clothing, and
      render the immersive environment based at least in part on the rendering information from the processor.

2. The system of claim 1, wherein the mesh comprises woven piezoelectric fibers.

3. The system of claim 1, wherein the mesh comprises pneumatic tubing.

4. The system of claim 1, wherein the mesh comprises hydraulic tubing.

5. The system of claim 1, wherein, in the rigid state, the mesh is flat.

6. The system of claim 1, wherein the immersive environment is an augmented-reality, virtual-reality, enhanced-reality, or immersive-reality environment.

7. The system of claim 1, wherein the immersive environment comprises a virtual peripheral or a surgical instrument.

8. The system of claim 7, wherein the virtual peripheral comprises a keyboard, a menu, or a mouse, or the surgical instrument comprises a scalpel.

9. The system of claim 1, wherein the item of clothing comprises a body suit, a sleeve, a glove, or footwear.

10. The system of claim 1, wherein the at least one body part is a hand, a foot, an arm, a leg, a head, or a neck.

11. The system of claim 1, wherein:
   the first data further represents a detected characteristic of an object in contact with the sensor, the object being different from the at least one body part, and
   the rendering information is based at least in part on the detected characteristic.

12. The system of claim 11, wherein the detected characteristic comprises a texture, a resistance, a temperature, a hardness, a pressure, a density, a coefficient of friction, or a viscosity.

13. The system of claim 1, wherein the first data further represents a detected characteristic of an object in contact with the sensor, the object being different from the at least one body part, and wherein, when executed by the processor, the machine-executable instructions further cause the processor to:
   obtain, from memory, information representing the detected characteristic at a prior time at which the object was previously in contact with the sensor, and
   identify a change in the object between the prior time and a present time.

14. The system of claim 13, wherein the object is a body part of a patient.

15. The system of claim 1, wherein the actuator is a hydraulic actuator, a pneumatic actuator, an electric actuator, a thermal actuator, a magnetic actuator, or a mechanical actuator.

16. The system of claim 1, wherein the actuator comprises a piezoelectric actuator, a piezoceramic actuator, a dielectric elastomer actuator, a polyvinylidene fluoride actuator, an electrostatic actuator, a microelectromechanical (MEMS) actuator, or a magnetorheological actuator.

17. The system of claim 1, wherein:
   the actuator is configured to restrict movement of the body part based at least in part on the second data.

18. The system of claim 1, wherein:
   the actuator is configured to cause movement of the body part based at least in part on the second data.

19. The system of claim 1, wherein:
the actuator is configured to emulate a sensation in the body part based at least in part on the second data.

20. The system of claim 1, wherein the sensor is a gyroscopic sensor or an acceleration-detecting sensor.

* * * * *